US009203244B2

(12) United States Patent
Abe

(10) Patent No.: US 9,203,244 B2
(45) Date of Patent: Dec. 1, 2015

(54) CONTACTLESS POWER SUPPLY SYSTEM

(75) Inventor: Hideaki Abe, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 737 days.

(21) Appl. No.: 13/637,062

(22) PCT Filed: Mar. 16, 2011

(86) PCT No.: PCT/JP2011/056256
§ 371 (c)(1),
(2), (4) Date: Sep. 25, 2012

(87) PCT Pub. No.: WO2011/122348
PCT Pub. Date: Oct. 6, 2011

(65) Prior Publication Data
US 2013/0015705 A1 Jan. 17, 2013

(30) Foreign Application Priority Data

Mar. 30, 2010 (JP) ................. 2010-079725

(51) Int. Cl.
H01F 27/42 (2006.01)
H02J 5/00 (2006.01)

(52) U.S. Cl.
CPC ............. H02J 5/005 (2013.01); Y10T 307/391 (2015.04); Y10T 307/696 (2015.04)

(58) Field of Classification Search
CPC ........... H02J 5/005; H02J 17/00; H02J 7/025; H02J 3/01; Y10T 307/696; Y10T 307/391; H01F 38/14; B60L 11/182; B60L 11/1829; B60L 11/1831; Y02T 90/122; H04B 5/0037
See application file for complete search history.

(56) References Cited

U.S. PATENT DOCUMENTS

| 2007/0139000 A1 | 6/2007 | Kozuma et al. |
| 2009/0015197 A1 | 1/2009 | Sogabe et al. |

(Continued)

FOREIGN PATENT DOCUMENTS

| CN | 101345437 A | 1/2009 |
| JP | 2000-325442 A | 11/2000 |

(Continued)

OTHER PUBLICATIONS

International Preliminary Report on Patentability for corresponding International Application No. PCT/JP2011/056256 dated Nov. 13, 2012 (English translation).

(Continued)

Primary Examiner — Daniel Cavallari
(74) Attorney, Agent, or Firm — Renner, Otto, Boisselle & Sklar, LLP

(57) ABSTRACT

A contactless power supply system includes a device and a power supply apparatus that supplies power contactlessly to the device. The power supply apparatus includes a plurality of primary coils provided in a planar or linear manner, a plurality of power supply modules respectively corresponding to the plurality of primary coils, each of the power supply modules configured to receive an excitation request signal for requesting excitation of the primary coil and excite the primary coil based on the excitation request signal, and a system control section configured to integratedly control the plurality of power supply modules. The device includes a secondary coil and a transmitter circuit that sends the excitation request signal to the power supply apparatus. When the device is mounted on the power supply apparatus, the contactless power supply system excites primary coils corresponding to one or more power supply modules, generates secondary power in the secondary coil of the device by electromagnetic induction, and supplies the secondary power to a load of the device. When the excitation request signal from the device mounted on the power supply apparatus is received at the one or more power supply modules, the system control section sends an enable signal for exciting the primary coils to the one or more power supply modules that received the excitation request signal.

27 Claims, 32 Drawing Sheets

(56) References Cited

U.S. PATENT DOCUMENTS

| | | | |
|---|---|---|---|
| 2009/0224723 A1* | 9/2009 | Tanabe | H02J 7/025 320/108 |
| 2010/0219183 A1 | 9/2010 | Azancot et al. | |
| 2010/0219693 A1 | 9/2010 | Azancot et al. | |
| 2010/0225172 A1 | 9/2010 | Kozuma et al. | |
| 2010/0244584 A1 | 9/2010 | Azancot et al. | |
| 2010/0259401 A1 | 10/2010 | Azancot et al. | |
| 2011/0127952 A1* | 6/2011 | Walley | G06K 7/10207 320/108 |
| 2012/0001485 A1* | 1/2012 | Uchida | H02J 5/005 307/11 |

FOREIGN PATENT DOCUMENTS

| | | |
|---|---|---|
| JP | 2003-224937 A | 8/2003 |
| JP | 2006-060909 A | 3/2006 |
| JP | 2006-081249 A | 3/2006 |
| JP | 2006-230032 A | 8/2006 |
| JP | 2006-246633 A | 9/2006 |
| JP | 2009-219177 A | 9/2009 |
| TW | I 271911 | 1/2007 |
| WO | WO 2008/137996 A1 | 11/2008 |
| WO | WO 2009/037380 A1 | 3/2009 |
| WO | 2009/047768 A2 | 4/2009 |
| WO | WO 2009/122355 A2 | 10/2009 |

OTHER PUBLICATIONS

Taiwanese Office Action for corresponding Taiwanese Application No. TW 100109723, dated Dec. 3, 2013 and English translation.
Extended European Search Report for corresponding European Application No. 11762586.3 dated Oct. 28, 2013.
International Search Report for corresponding International Application No. PCT/JP2011/056256 mailed Jun. 21, 2011.
Hashiguchi et al., "Passive extender for wireless power transfer using magnetic resonances", Proceedings of the IEICE General Conference, Mar. 2, 2011, vol. 1 of 2010, p. 25 and English translation.
Chinese Office Action for corresponding Chinese Application No. 201180016335.7 dated Jun. 4, 2014 and English translation.

* cited by examiner

Fig.19
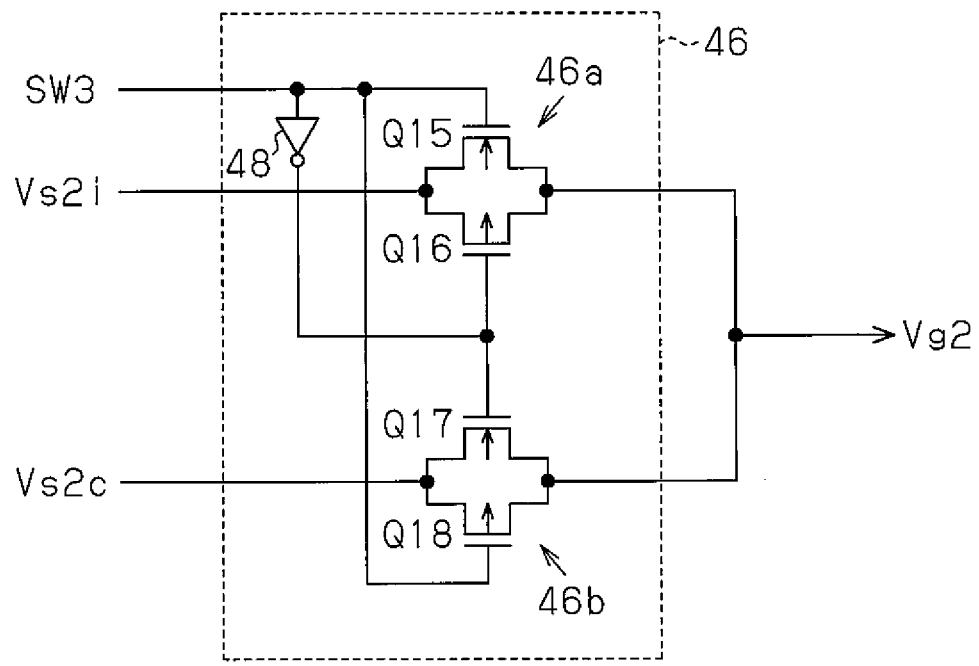
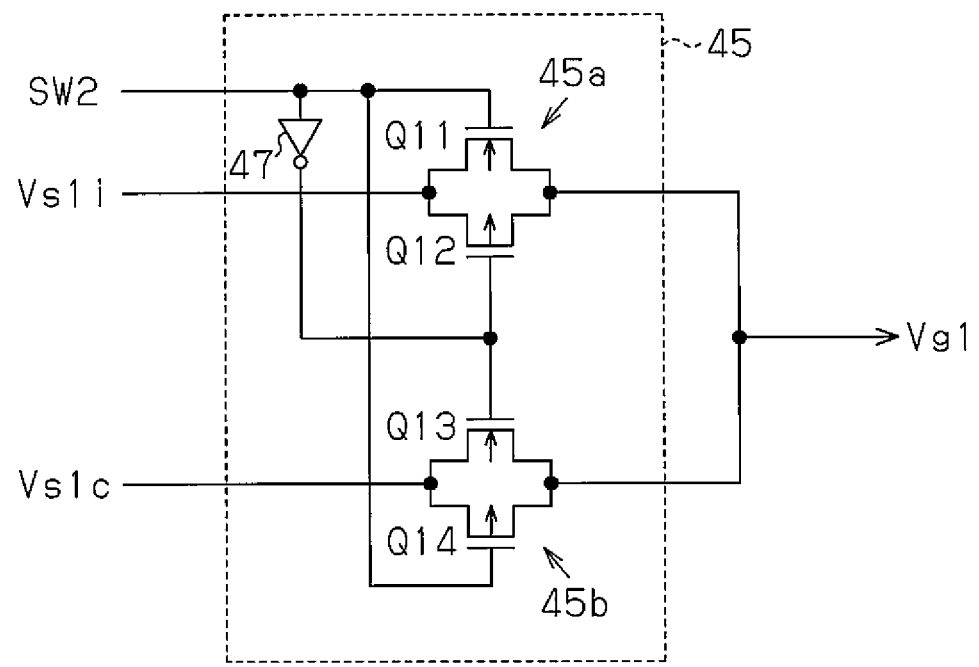

CONTACTLESS POWER SUPPLY SYSTEM

TECHNICAL FIELD

The present invention relates to a contactless power supply system.

BACKGROUND ART

Conventionally, in viewing an AV appliances and the like, a number of cords are connected to the device for signal transmission. Because of the numbers of cords, there had been problems such as the freedom of placing of the device is narrowed, aesthetic appeal thereof is deteriorated, dust tends to attach thereto, causing a difficulty in cleaning. However, in recent years, a wireless configuration is being widespread in signal transmissions, and it is becoming possible to eliminate the cords for signal transmission by using a wireless configuration.

However, even if the cords for the signal transmission are eliminated by a wireless configuration, a cord for transmitting and receiving electric power still exists; thus, many of the problems related to the thick and long cord remained.

For example, in devices such as a cellular phone, a personal computer, a mobile device and the like that can easily be carried around without any cords, battery-charging is required, so the charging is performed by using an AC adapter to be plugged into a receptacle. Due to this, since a charger cord of the AC adapter extends to the receptacle, aesthetic appeal around the receptacle is deteriorated, and the cord is easily tripped over by a human foot.

Especially in a household, there may be cases in which a large number of cellular phones are charged at one time; in such a case, the number of adapters is increased, and further, aesthetic appeal around the receptacle upon charging is deteriorated, the cords that are intricately tangled are easily tripped over by a human foot, and extra time and effort is needed to untangle the intricately tangled cords.

Further, since an AC adapter is an accessory for the cellular phone, it must be attached to each cellular phone. Due to this, there arise problems that the cost of the cellular phone is increased for the AC adapter, and resources such as copper and the like included in the cord of the AC adapter in a large quantity are exhausted.

In view of such a background, a technique to eliminate a power cord, and to perform contactless, non-contact power supply has been proposed. Especially, in a method using electromagnetic induction (for example, Japanese Patent Application Publication Laid Open (JP-A) No. 2000-325442), its actual implementations as chargers for electric toothbrushes and electric shavers (commercially available since 1998), and cellular phones has started. Further, in the Patent Document 1, a device authentication technique by a signal transmission for authenticating the device to supply power and the like is employed, and the contactless power supply can be provided only to a specific device.

Further, in order to reduce standby power during when a device is not placed, a method to intermittently perform excitation from a primary coil of a power supply apparatus to a secondary coil of the device has also been employed. In some cases, a device may not have an internal power source. Power supply must be periodically performed to confirm that the power source is attached to a device power supply surface, and such a confirmation is performed by using an intermittent oscillation and the like.

However, such a power supply apparatus can only supply power to one device, and cannot supply power simultaneously to other devices, or charge a plurality of devices at one time. Due to this, a plurality of power supply apparatuses is required, whereby cords for the power supply apparatuses are increased, so problems as in the conventional cases rise likewise.

It is an object of the present invention to provide a contactless power supply system capable of simultaneously providing contactless power supply to a plurality of devices, or to different devices.

SUMMARY OF THE INVENTION

One aspect of the present invention is a contactless power supply system including a device and a power supply apparatus that supplies power contactlessly to the device. The power supply apparatus includes a plurality of primary coils provided in a planar or linear manner, a plurality of power supply modules respectively corresponding to the plurality of primary coils, each of the power supply modules configured to receive an excitation request signal for requesting excitation of the primary coil and excite the primary coil based on the excitation request signal, and a system control section configured to integratedly control the plurality of power supply modules. The device includes a secondary coil and a transmitter circuit that sends the excitation request signal to the power supply apparatus. When the device is mounted on the power supply apparatus, the contactless power supply system excites primary coils corresponding to one or more power supply modules, generates secondary power in the secondary coil of the device by electromagnetic induction, and supplies the secondary power to a load of the device. when the excitation request signal from the device mounted on the power supply apparatus is received at the one or more power supply modules, the system control section sends an enable signal for exciting the primary coils to the one or more power supply modules that received the excitation request signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 19 is an electrical circuitry diagram explaining a switching circuit of the fourth embodiment;

DETAILED DESCRIPTION OF THE PREFERRED EMBODIMENTS (First Embodiment)

Hereinbelow, a power supply apparatus of the first embodiment that realizes a contactless power supply system of the present invention will be described with reference to the drawings.

Figure 1:
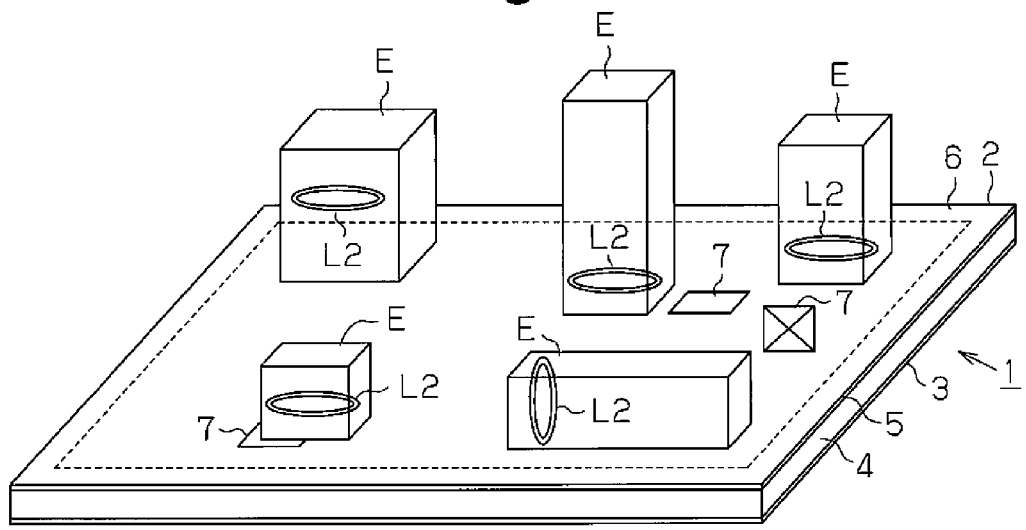
FIG. 1 is an overall perspective diagram of a power supply apparatus showing a state in which respective devices are mounted.

FIG. 1 shows an overall perspective diagram of a power supply apparatus 1, and devices E to which power is supplied contactlessly from the power supply apparatus 1. A casing 2 of the power supply apparatus 1 includes a bottom plate 3 formed in a square shape. Side plates 4 are formed so as to be formed extending upward from four sides of the bottom plate 3. An opening section that opens upward by the respective side plates 4 is formed by being closed by a top plate 5 formed of a tempered glass. Further, a top surface of the top plate 5 becomes a mounting surface 6, onto which the devices E are to be mounted. Further, as shown in FIG. 2, in a space (inside the casing 2) formed by the bottom plate 3, the respective side plates 4, and the top plate 5, a plurality of power supply modules M for providing the contactless power supply to the respective devices E mounted on the mounting surface 6 of the top plate 5 is embedded.

Each of the power supply modules M provided in the casing 2 is connected to a corresponding primary coil L1. As shown in FIG. 2, there are 48 pieces of primary coils L1 in the present embodiment, where 6 pieces of the primary coils L1 are arranged to align along an X direction parallelly to the mounting surface 6 of the top plate 5, and 8 pieces of the primary coils L1 are arranged to align along a Y direction parallelly to the mounting surface 6 of the top plate 5. Accordingly, there are 48 pieces of power supply modules M.

The respective primary coils L1 arranged in the casing 2 are arranged and fixed at positions within the casing 2 that are proximal enough to make contact with a lower surface of the top plate 5. At the bottom plate 3 at a lower position of each of the primary coils L1, the power supply module M for performing excitation drive control of the primary coil L1 is implemented respectively. Further, each primary coil L1 is driven by being excited solely or in cooperation with other primary coils L1, and supplies power contactlessly to the device E mounted on the mounting surface 6.

Figure 2:
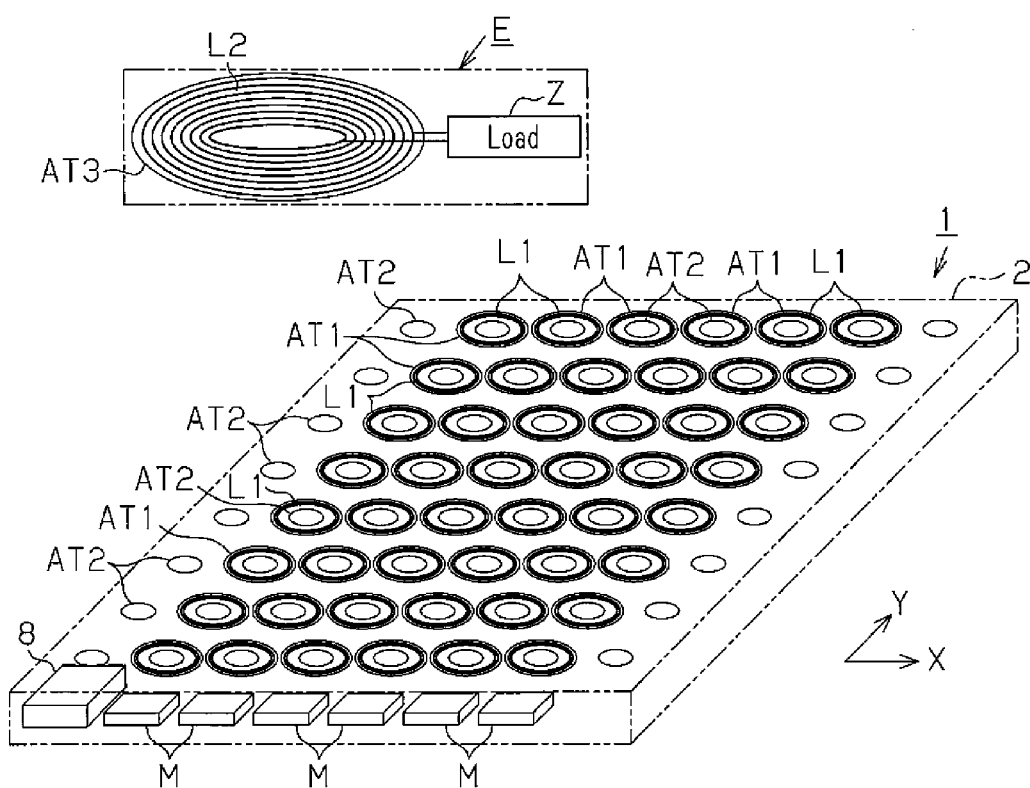
FIG. 2 is an explanatory diagram showing an arrangement condition of primary coils.

Further, as shown in FIG. 2, a signal receiver antenna AT1 is arranged and fixed outside of each primary coil L1 so as to surround the primary coil L1. Further, data or information is transferred by a wireless communication between the device E mounted on the mounting surface 6 and the corresponding power supply modules M via the signal receiver antennas AT1, respectively.

Further, as shown in FIG. 2, a metal detection antenna AT2 is arranged and fixed inside of each primary coil L1, respectively. Further, a metal piece 7 arranged between the device E mounted on the mounting surface 6 and the primary coils L1

(the primary coils L1 including the metal detection antennas AT2) is detected by the metal detection antennas AT2. Further, metal detection antennas AT2 are respectively arranged and fixed in the vicinity on the outer side of the primary coils L1 on both outer sides in the X direction of the respective primary coils L1. Further, a metal piece 7 arranged between the device E mounted on the mounting surface 6 and the primary coils L1 (primary coils L1 that are positioned in the vicinity of the metal detection antennas AT2) is detected by the metal detection antennas AT2.

Further, in the casing 2, a system control section 8 composed of a microcomputer that integratedly controls the respective power supply modules M for driving the respective primary coils L1 to be excited is implemented. Further, the data or information received by the respective signal receiver antennas AT1 is sent to the system control section 8 via the corresponding power supply modules M. Further, metal detection signals ST indicating whether the metal pieces 7 are detected by the respective metal detection antennas AT2 are sent to the system control section 8 via the corresponding power supply modules M.

The devices E mounted on the mounting surface 6 of the power supply apparatus 1 include secondary coils L2. As shown in FIG. 2, excitation power supply is given to the secondary coil L2 of each device E via an excitation of the primary coils L1 of the power supply apparatus 1. The secondary coil L2 of each device E supplies the secondary power as supplied to a load Z of the device E.

Further, as shown in FIG. 2, at outside of the secondary coil L2 of the device E, a transceiver antenna AT3 is wound so as to surround the secondary coil L2. Further, when the device E is mounted on the mounting surface 6 of the power supply apparatus 1, the device E transfers data or information by a wireless communication with the power supply modules M that perform the excitation drive control of the primary coils L1 via the signal receiver antennas AT1 surrounding the primary coils L1 positioned directly below the device E.

Here, a size of the primary coils L1 is set such that one or more primary coils L1 positioned directly below the secondary coil L2 of the device E are included by a region of the secondary coil L2 when the device E is mounted on the mounting surface 6.

Next, electrical configurations of the power supply apparatus 1 and the device E will be described with reference to FIG. 3.

Figure 3:
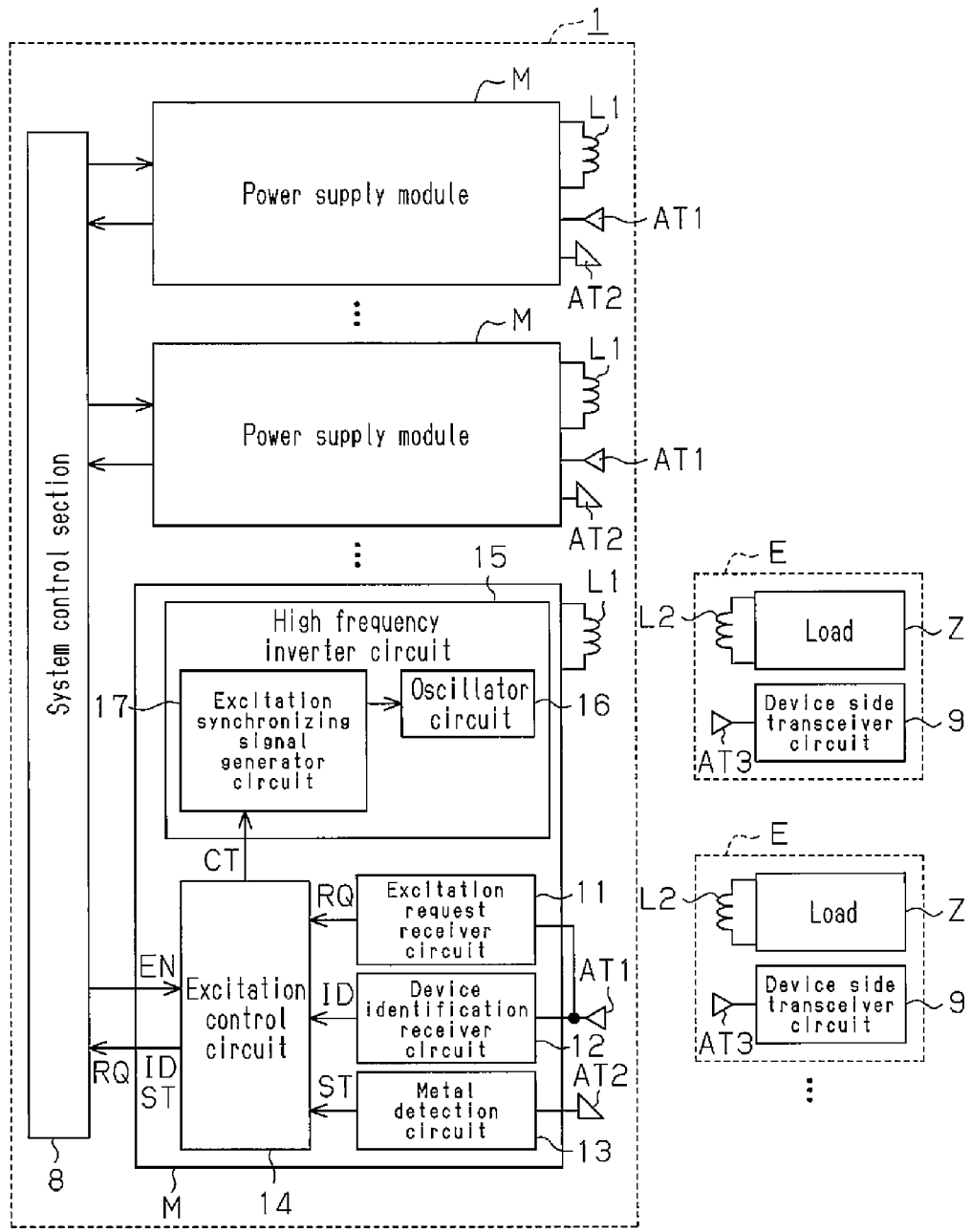
FIG. 3 is an electrical block circuitry diagram showing an electrical configuration of a power supply apparatus.

In FIG. 3, the device E is provided with a device side transceiver circuit 9 as a transmitter circuit.

The device side transceiver circuit 9 is connected to the transceiver antenna AT3. The device side transceiver circuit 9 creates a device identification signal ID that indicates that the device E is capable of receiving the power supply from the power supply apparatus 1, and an excitation request signal RQ that requests power supply to the power supply apparatus 1. Further, the device side transceiver circuit 9 sends the created device identification signal ID and excitation request signal RQ to the power supply apparatus 1 via the transceiver antenna AT3.

Here, the device E will suffice so long as it is a device driven by the secondary power generated in the secondary coil L2, and capable of creating the device identification signal ID and the excitation request signal RQ, and sending the same to the power supply apparatus 1. Accordingly, the device E may rectify the secondary power generated in the secondary coil L2 by a rectifier circuit, and drive the device E on the mounting surface 6 by using rectified DC power, or may drive the device E on the mounting surface 6 by using the secondary power directly as an AC power. Further, the device E may rectify the secondary power generated in the secondary coil L2 by the rectifier circuit, and charge a built-in rechargeable battery (secondary battery) by using the rectified DC power source.

Note that, in a device E such as a cellular phone and a laptop computer and the like for charging the built-in rechargeable battery (secondary battery), the device side transceiver circuit 9 may be provided with a function to eliminate the excitation request signal RQ upon a completion of charging the secondary battery among the device identification signal ID and the excitation request signal RQ that had been sent until when the charge is completed, and cause only the device identification signal ID to be sent.

Further, in a device E including a timer, the device side transceiver circuit 9 may be provided with a function to drive over a time set by the timer in response to receiving the power supply, eliminate the excitation request signal RQ when the set time elapsed among the device identification signal ID and the excitation request signal RQ that had been sent until when the time elapses, and cause only the device identification signal ID to be sent.

In FIG. 3, each of the power supply modules M, which is provided for the respective primary coils L1, includes an excitation request receiver circuit 11, a device identification receiver circuit 12, a metal detection circuit 13, an excitation control circuit 14, and a high frequency inverter circuit 15.

The excitation request receiver circuit 11 is connected to the signal receiver antenna AT1 of the power supply module M. The excitation request receiver circuit 11 receives a sending signal sent from the device E mounted on the mounting surface 6 directly above the power supply module M via the signal receiver antenna AT1. The excitation request receiver circuit 11 extracts the excitation request signal RQ that requests the power supply from the received sending signal. Then, when the excitation request signal RQ is extracted from the sending signal, the excitation request receiver circuit 11 sends the excitation request signal RQ to the excitation control circuit 14.

The device identification receiver circuit 12 is connected to the signal receiver antenna AT1 of the power supply module M. The device identification receiver circuit 12 receives the sending signal sent from the device E mounted on the mounting surface 6 directly above the power supply module M via the signal receiver antenna AT1. The device identification receiver circuit 12 extracts the device identification signal ID that indicates that the device E is capable of being power supplied from the received sending signal. Then, when the device identification signal ID is extracted from the sending signal, the device identification receiver circuit 12 sends the device identification signal ID to the excitation control circuit 14.

The metal detection circuit 13 is connected to the metal detection antennas AT2 arranged inside of and in the vicinity of the primary coil L1 of the power supply module M. The metal detection circuit 13 detects whether a metal piece 7 is mounted on the mounting surface 6 directly above or in the vicinity of the power supply module M via the metal detection antennas AT2. Then, when the metal detection circuit 13 detects the metal piece 7 being mounted on the mounting surface 6, the metal detection circuit 13 sends the metal detection signal ST to the excitation control circuit 14.

The excitation control circuit 14 receives the excitation request signal RQ from the excitation request receiver circuit 11, the device identification signal ID from the device identification receiver circuit 12, and the metal detection signal ST from the metal detection circuit 13. Further, the excitation control circuit 14 sends the excitation request signal RQ, the device identification signal ID, and the metal detection signal ST to the system control section 8 by appending a module identification signal that identifies its power supply module M.

The excitation control circuit 14 sends the excitation request signal RQ, the device identification signal ID, and the metal detection signal ST to the system control section 8, and waits for an enable signal EN from the system control section 8.

The system control section 8 sends the enable signal EN to the excitation control circuit 14 for driving the primary coil L1, which is connected to the power supply module M, to be excited so as to supply power in cases where (1) the excitation request signal RQ is received, and (2) the device identification signal ID is received. Then, when the enable signal EN from the system control section 8 is received, the excitation control circuit 14 sends a drive control signal CT for driving the primary coil L1 to be excited for supplying power to the high frequency inverter circuit 15.

Note that, even if the above conditions (1) and (2) are met, the system control section 8 does not send the enable signal EN if the metal detection signal ST is received from the excitation control circuit 14. In this case, the excitation control circuit 14 does not send the drive control signal CT for driving the primary coil L1 to be excited for supplying power to the high frequency inverter circuit 15.

Further, when reception of at least one of the excitation request signal RQ and the device identification signal ID from the excitation control circuit 14 stops during when the enable signal EN is being sent, the system control section 8 ends sending of the enable signal EN. Accordingly, in this case also, the excitation control circuit 14 does not send the drive control signal CT to the high frequency inverter circuit 15.

The high frequency inverter circuit 15 is connected to the primary coil L1 of the power supply module M. Further, the high frequency inverter circuit 15 drives the primary coil L1 to be excited based on the drive control signal CT.

To describe in more detail, when the drive control signal CT for driving the primary coil L1 to be excited is received from the excitation control circuit 14, the high frequency inverter circuit 15 drives the primary coil L1 to be excited for supplying power.

Accordingly, in the case where the device E to which power can be supplied by the power supply apparatus 1 is mounted on the mounting surface 6 directly above the power supply module M, the device identification signal ID and the excitation request signal RQ are sent from this device E, and no metal piece is present in the vicinity of this device E, the primary coil L1 is driven to be excited by the high frequency inverter circuit 15. That is, in this case, the primary coil L1 is driven to be excited so as to supply the secondary power to the device E by a contactless power supply.

As shown in FIG. 3, the high frequency inverter circuit 15 includes an oscillator circuit 16 and an excitation synchronizing signal generator circuit 17. The oscillator circuit 16 is connected to the primary coil L1, and drives this primary coil L1 to be excited.

Figure 4:
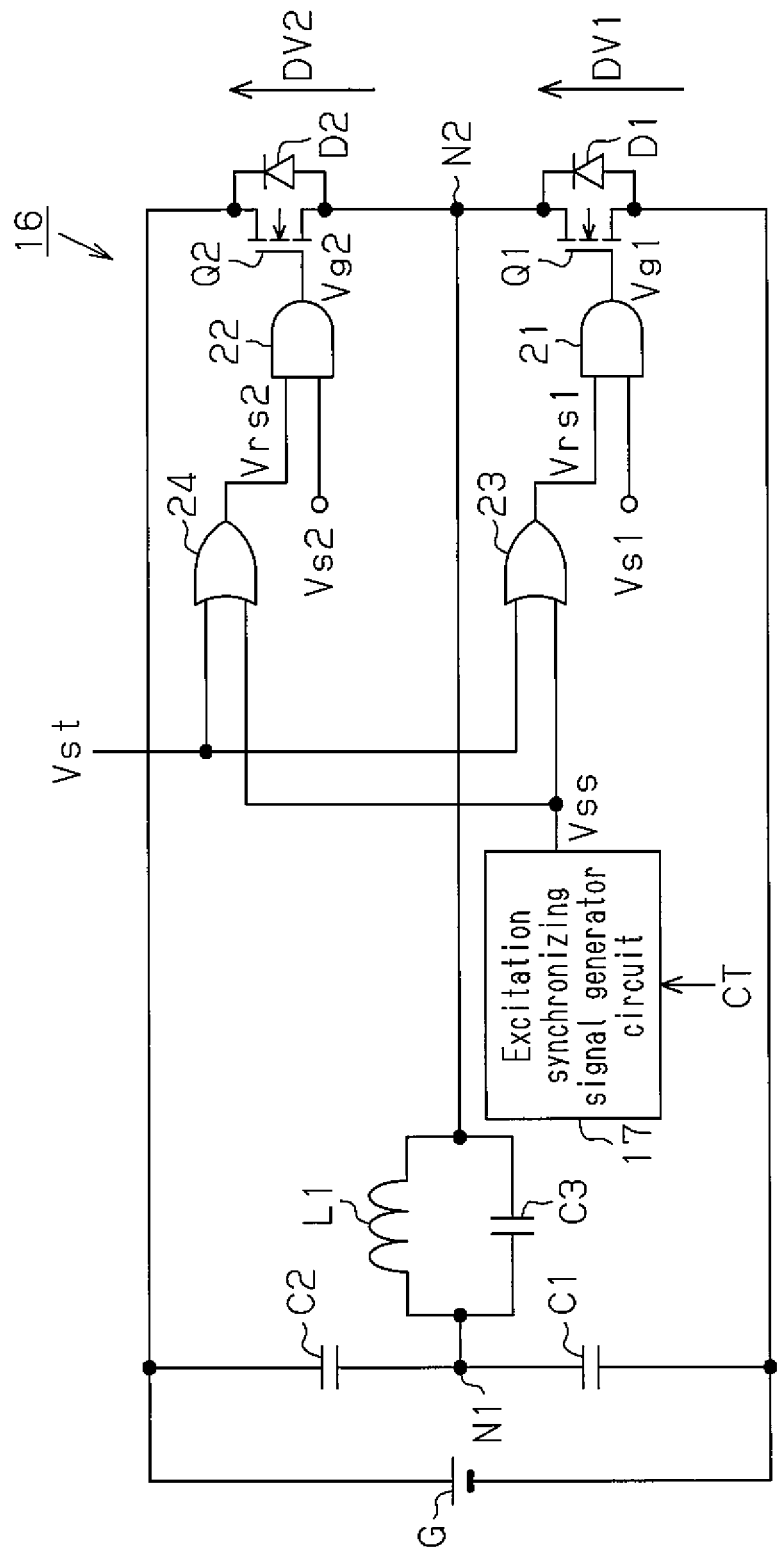
FIG. 4 is a diagram of a high frequency inverter circuit.

FIG. 4 shows a circuit configuration of the oscillator circuit 16.

The oscillator circuit 16 is a half bridge type partial resonance circuit. In the oscillator circuit 16, a voltage divider circuit composed of a first capacitor C1 and a second capacitor C2 that are connected in series is provided between a power voltage G and the ground provided in the power supply apparatus 1. This driver circuit is connected in parallel to this voltage divider circuit. The driver circuit is a serial circuit composed of a first power transistor Q1 and a second power transistor Q2 that are connected serially to each other. Further, the first power transistor Q1 and the second power transistor Q2 are composed of MOSFETS in the present embodiment, and diodes D1, D2 for flywheeling are connected between respective source and drain of the first power transistor Q1 and the second power transistor Q2.

Further, the primary coil L1 is connected between a connecting point (node N1) of the first capacitor C1 and the second capacitor C2 and a connecting point (node N2) of the first power transistor Q1 and the second power transistor Q2. Note that, a capacitor C3 is connected in parallel to the primary coil L1.

The first power transistor Q1 and the second power transistor Q2 in the present embodiment are composed of N-channel MOSFETS. A first AND circuit 21 is connected to a gate terminal of the first power transistor Q1 as a control terminal, and a second AND circuit 22 is connected to a gate terminal of the second power transistor Q2 as a control terminal.

The first AND circuit 21 is an AND circuit having two input terminals. A first excitation synchronizing signal Vs1 that is a logic signal is received at a first input terminal of the first AND circuit 21.

Figure 5:
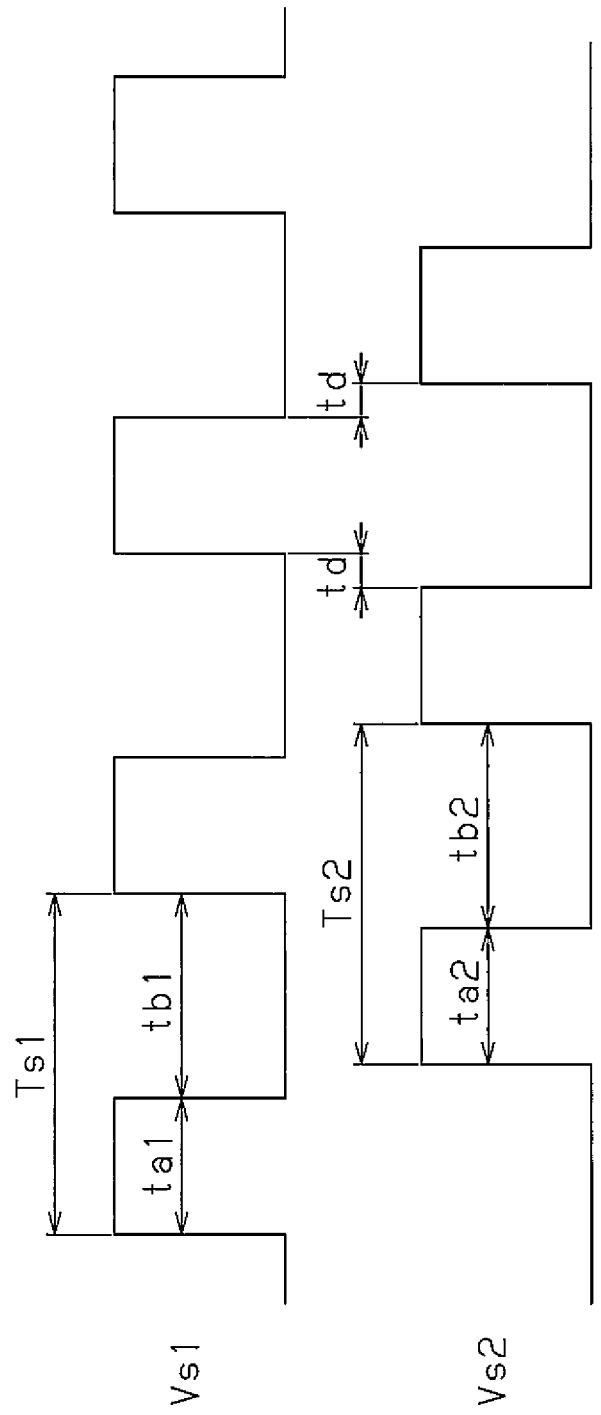
FIG. 5 is an output waveform chart of a first excitation synchronizing signal and a second excitation synchronizing signal.

To describe more in detail, the first excitation synchronizing signal Vs1 is a logic signal including a predetermined cycle Ts1. As shown in FIG. 5, in the first excitation synchronizing signal Vs1, a high level time ta1 is set shorter than a low level time tb1. Further, in the present embodiment, this first excitation synchronizing signal Vs1 is sent from a signal generator circuit (not shown) included in the system control section 8.

Further, a first output signal Vrs1 from a first OR circuit 23 is received at a second input terminal of the first AND circuit 21.

The first OR circuit 23 is an OR circuit having two input terminals. An intermittent high signal Vst that becomes high level intermittently as shown in FIG. 6 is received at a first input terminal of the first OR circuit 23.

Figure 6:
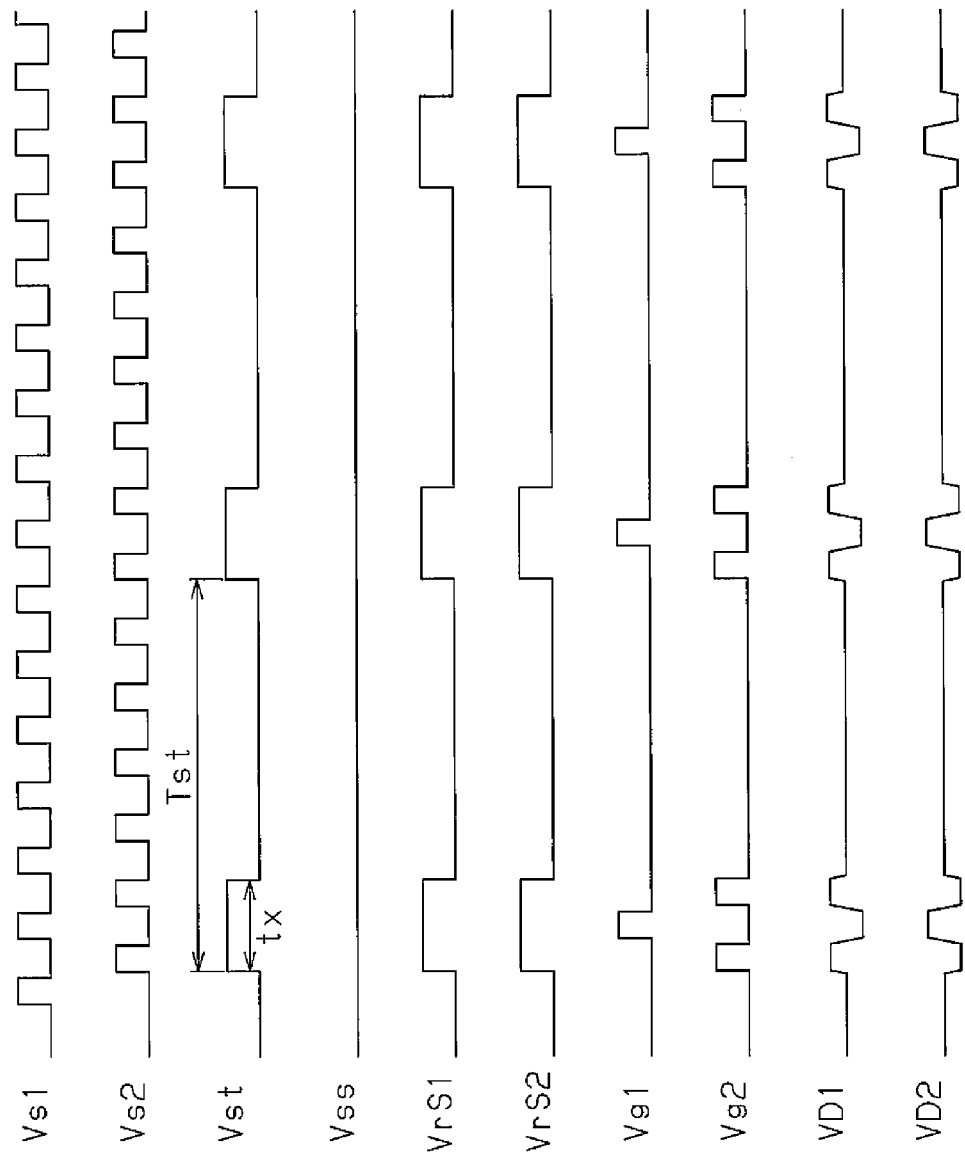
FIG. 6 is an output waveform chart of a high frequency inverter circuit.

To describe in more detail, in the present embodiment, as shown in FIG. 6, the intermittent high signal Vst has a cycle Tst that is six times longer than the cycle Ts1 of the first excitation synchronizing signal Vs1 (=6Ts1). After the first excitation synchronizing signal Vs1 falls from high to low, the intermittent high signal Vst rises to high, and after having risen to high as aforementioned, falls to low just before when a second piece of first excitation synchronizing signal Vs1 rises. Then, after when a fifth piece of first excitation synchronizing signal Vs1, which is sent after when the intermittent high signal Vst had fallen to low, falls to low, a subsequent intermittent high signal Vst rises to high. Here, time during which the intermittent high signal Vst is at the high level will be termed high level time tx.

Further, in the present embodiment, this intermittent high signal Vst is sent from the signal generator circuit (not shown) included in the system control section 8.

Figure 7:
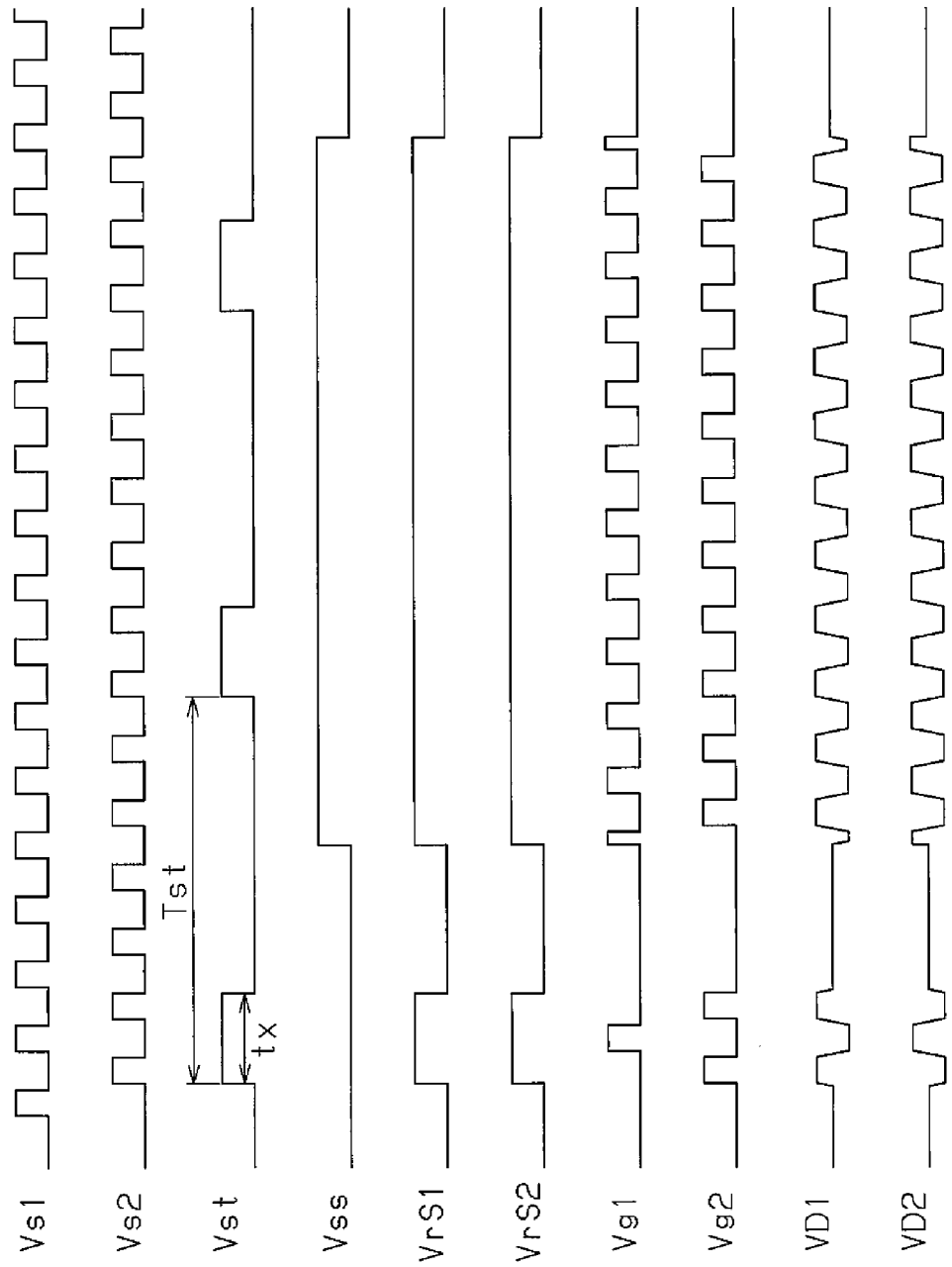
FIG. 7 is an output waveform chart of a high frequency inverter circuit

Further, an inverter control signal Vss as shown in FIG. 7 from an excitation synchronizing signal generator circuit 17 is received at a second input terminal of the first OR circuit 23.

The excitation synchronizing signal generator circuit 17 sends a high level inverter control signal Vss for driving the primary coil L1 to be excited for supplying power to the first OR circuit 23 during when the drive control signal CT from the excitation control circuit 14 is being received.

Note that, when the drive control signal CT is not received from the excitation control circuit 14, the excitation synchronizing signal generator circuit 17 does not send the high level inverter control signal Vss.

For example, when the device E is not mounted on the mounting surface 6 (when the excitation request signal RQ and the device identification signal ID are not received), the excitation synchronizing signal generator circuit 17 does not send the high level inverter control signal Vss to the first OR circuit 23. In this case, the intermittent high signal Vst that becomes high level over the high level time tx for each cycle Tst is received at the first input terminal of the first OR circuit 23, and the first OR circuit 23 sends a first output signal Vrs1 having a same logic value as the logic value of the intermittent high signal Vst to the first AND circuit 21 on a lower side.

Accordingly, as shown in FIG. 6, when the intermittent high signal Vst that becomes high level over the high level time tx for each cycle Tst is being sent, the first AND circuit 21 sends a first on/off signal Vg1 having a same logic value as the logic value of the first excitation synchronizing signal Vs1 to a gate of the first power transistor Q1. As a result, the first power transistor Q1 turns on intermittently in response to the first on/off signal Vg1 (first excitation synchronizing signal Vs1) only during when this intermittent high signal Vst that becomes the high level is being sent.

Incidentally, in the case where the metal piece 7 is mounted and the above-described conditions (1) and (2) are met, the excitation synchronizing signal generator circuit 17 receives the drive control signal CT, and the excitation synchronizing signal generator circuit 17 sends the high level inverter control signal Vss to the first OR circuit 23. Further, the first OR circuit 23 receives this high level inverter control signal Vss, and the first OR circuit 23 sends the first output signal Vrs1 having a same logic value as the logic value of the inverter control signal Vss to the first AND circuit 21 on the lower side.

Accordingly, as shown in FIG. 7, during when the high level inverter control signal Vss is being sent, the first excitation synchronizing signal Vs1, which is sent in the predetermined cycle Ts1, is received at the first AND circuit 21, and the first AND circuit 21 sends the first on/off signal Vg1 having a same logic value as the logic value of the first excitation synchronizing signal Vs1 to the gate of the first power transistor Q1. As a result, the first power transistor Q1 turns on and off at the cycle Ts1 determined by the first excitation synchronizing signal Vs1.

On the other hand, the second AND circuit 22 is connected to a gate terminal of the second power transistor Q2. The second AND circuit 22 is an AND circuit having two input terminals. A second excitation synchronizing signal Vs2, which is a logic signal, is received at a first input terminal of the second AND circuit 22.

To describe in more detail, the second excitation synchronizing signal Vs2 is a logic signal having a predetermined cycle Ts2 (=Ts1). As shown in FIG. 5, the second excitation synchronizing signal Vs2 has the same cycle as the cycle Ts1 of the first excitation synchronizing signal Vs1. Further, similar to the first excitation synchronizing signal Vs1, the second excitation synchronizing signal Vs2 has a high level time ta2 (=ta1) that is set shorter than a low level time tb2 (=tb1), and has an inverted relationship as that of the first excitation synchronizing signal Vs1.

That is, the second excitation synchronizing signal Vs2 is low when the first excitation synchronizing signal Vs1 is high, and the second excitation synchronizing signal Vs2 is high when the first excitation synchronizing signal Vs1 is low.

Further, here, each of the first and second excitation synchronizing signals Vs1, Vs2 have the high level times ta1, ta2 set shorter than the low level time tb1 tb2. Accordingly, during when the first excitation synchronizing signal Vs1 falls from high to low and the second excitation synchronizing signal Vs2 rises from low to high, and during when the second excitation synchronizing signal Vs2 falls from high to low and the first excitation synchronizing signal Vs1 rises from low to high, each of the first and second excitation synchronizing signals Vs1, Vs2 is set with a dead time td during which both of these signals are at the low level. By providing the dead time td, soft switching of the first power transistor Q1 and the second power transistor Q2 becomes possible.

Note that, in the present embodiment, this second excitation synchronizing signal Vs2 is sent from the signal generator circuit (not shown) included in the system control section 8.

Further, a second output signal Vrs2 from a second OR circuit 24 is received at a second input terminal of the second AND circuit 22.

The second OR circuit 24 is an OR circuit having two input terminals. The intermittent high signal Vst is received at a first input terminal of the second OR circuit 24. Further, similarly, the inverter control signal Vss from the excitation synchronizing signal generator circuit 17 is received at a second input terminal of the second OR circuit 24.

Accordingly, the high level inverter control signal Vss is received at the second OR circuit 24 when the excitation synchronizing signal generator circuit 17 is receiving the drive control signal CT from the excitation control circuit 14 (when the above described conditions (1) and (2) are met).

Further, the high level inverter control signal Vss is not received at the second OR circuit 24 when the excitation synchronizing signal generator circuit 17 is not receiving the drive control signal CT from the excitation control circuit 14 (when the above described conditions (1) and (2) are not met).

Further, the intermittent high signal Vst that becomes high level over the high level time tx for each cycle Tst is received at the first input terminal of the second OR circuit 24, and the second OR circuit 24 sends the second output signal Vrs2 having a same logic value as the logic value of the intermittent high signal Vst to the second AND circuit 22 on a lower side.

Accordingly, as shown in FIG. 6, when the intermittent high signal Vst that becomes high level over the high level time tx for each cycle Tst is received, the second AND circuit 22 sends a second on/off signal Vg2 having a same logic value as the logic value of the second excitation synchronizing signal Vs2 to a gate of the second power transistor Q2. As a result, the second power transistor Q2 turns on intermittently in response to the second on/off signal Vg2 (second excitation synchronizing signal Vs2) during the high level time tx during which the intermittent high signal Vst is at the high level at the interval of the cycle Tst.

According to this, for example, when the device E is not mounted on the mounting surface 6 (when the excitation request signal RQ and the device identification signal ID are not received), the first power transistor Q1 of the high frequency inverter circuit 15 turns on and off in response to the first excitation synchronizing signal Vs1 determined by the intermittent high signal Vst, and the second power transistor Q2 turns on and off in response to the second excitation synchronizing signal Vs2 determined by the intermittent high signal Vst.

That is, since a waveform of the first excitation synchronizing signal Vs1 and a waveform of the second excitation synchronizing signal Vs2 are in a relationship of being inverted of each other, the first power transistor Q1 and the second power transistor Q2 turn on and off alternately and intermittently. Further, by this alternate and intermittent on/off of the first power transistor Q1 and the second power transistor Q2, the primary coil L1 is driven by being intermittently excited.

Accordingly, in a standby state in which no device E is mounted on the mounting surface 6, the respective primary coils L1 of the power supply apparatus 1 are not excited continuously, but are driven to be excited intermittently.

Notably, in the case where no metal piece 7 is mounted and the above described conditions (1) and (2) are met, the excitation synchronizing signal generator circuit 17 sends the high level inverter control signal Vss to the second OR circuit 24. Then, this high level inverter control signal Vss is received at the second OR circuit 24, and the second OR circuit 24 sends the high level second output signal Vrs2 to the second AND circuit 22 on the lower side.

Accordingly, as shown in FIG. 7, when the high level inverter control signal Vss is being sent, the second AND circuit 22 sends the second on/off signal Vg2 having the same logic value as the logic value of the second excitation synchronizing signal Vs2 of the predetermined cycle Ts2 to the gate of the second power transistor Q2. As a result, the second power transistor Q2 turns on and off at a cycle determined by the second excitation synchronizing signal Vs2.

According to this, in the case where no metal piece 7 is mounted and the above described conditions (1) and (2) are met, when the high level inverter control signal Vss is being sent, the first power transistor Q1 turns on and off in response to the first excitation synchronizing signal Vs1, and the second power transistor Q2 turns on and off in response to the second excitation synchronizing signal Vs2.

That is, during when the above described conditions (1) and (2) are met, waveforms of the first and second excitation synchronizing signals Vs1, Vs2 having a same logic values as the logic values of the first and second on/off signals Vg1, Vg2 have a relationship of being inverted of each other. Due to this, the first power transistor Q1 and the second power transistor Q2 of the high frequency inverter circuits 15 turn on and off alternately during when the above described conditions (1) and (2) are met.

Further, excitation voltages VD1, VD2 are generated between the respective source and drain of the first power transistor Q1 and the second power transistor Q2.

Accordingly, when the device E is mounted on the mounting surface 6 for power supply, the primary coils L1 at the position in the power supply apparatus 1 where the device E is mounted are continuously driven to be excited.

The system control section 8 that integratedly controls the respective power supply modules M includes a microcomputer, and is electrically connected with all of the power supply modules M. The excitation request signal RQ, the device identification signal ID, and the metal detection signal ST, to which the module identification signal of the corresponding excitation control circuit 14 is appended, from the excitation control circuit 14 of each power supply module M are received at the system control section 8.

The system control section 8 determines whether the device E, to which the power can be supplied and which requests the power supply, is mounted directly above the aforementioned power supply module M based on the excitation request signal RQ and the device identification signal ID from the excitation control circuit 14 of the aforementioned power supply module M.

Then, when the excitation request signal RQ and the device identification signal ID are received from the excitation control circuit 14 of the power supply module M, the system control section 8 sends the enable signal EN to the excitation control circuit 14 of the aforementioned power supply module M. That is, the system control section 8 determines that the device E, to which the power can be supplied and which requests the power supply, has been mounted directly above the aforementioned power supply module M, and sends the enable signal EN to the excitation control circuit 14 of the aforementioned power supply module M.

Figure 8:
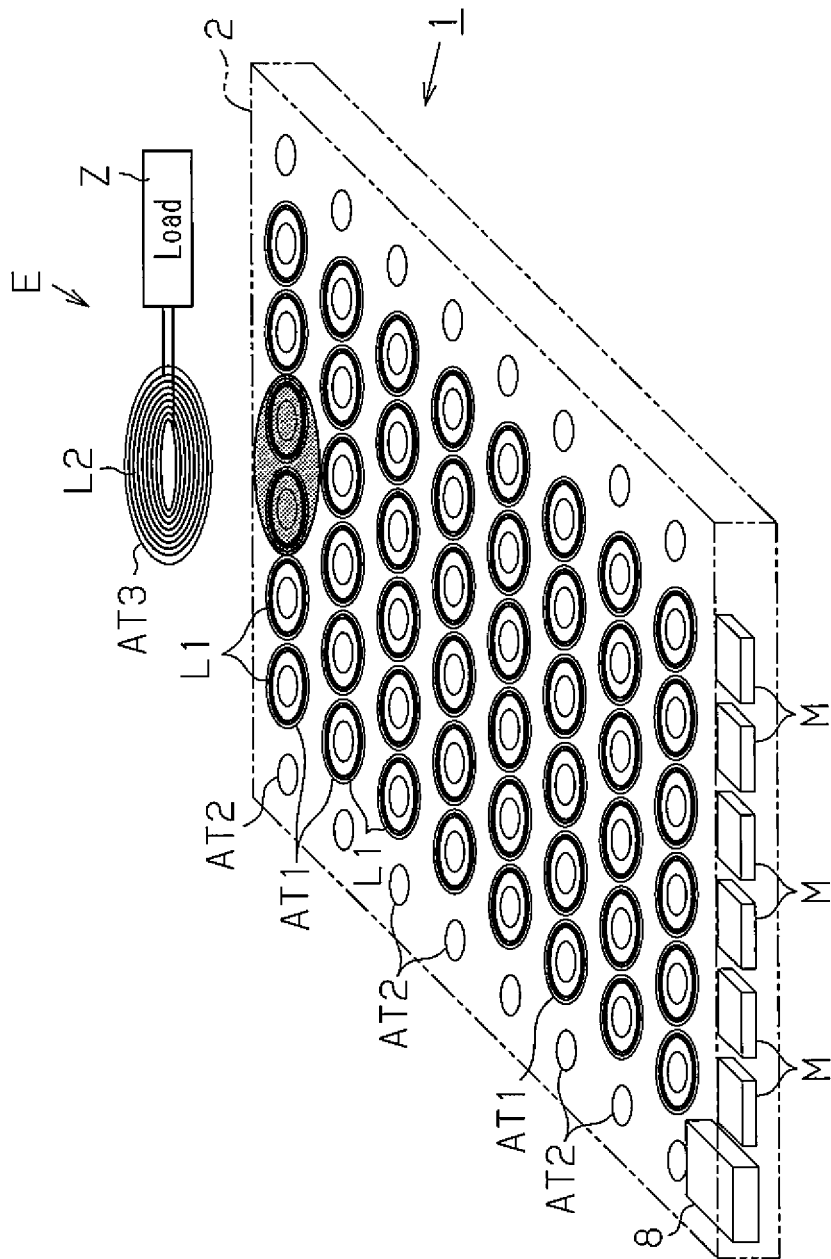
FIG. 8 is an explanatory perspective diagram explaining a state in which one device is mounted on a plurality of primary coils.

Note that, as shown in FIG. 8, when the size of the device E, to which the power can be supplied and which requests the power supply, is large, and when the device E is mounted on the mounting surface 6 of the power supply apparatus 1, there are cases in which two or more primary coils L1 are positioned directly below the device E.

Figure 9:
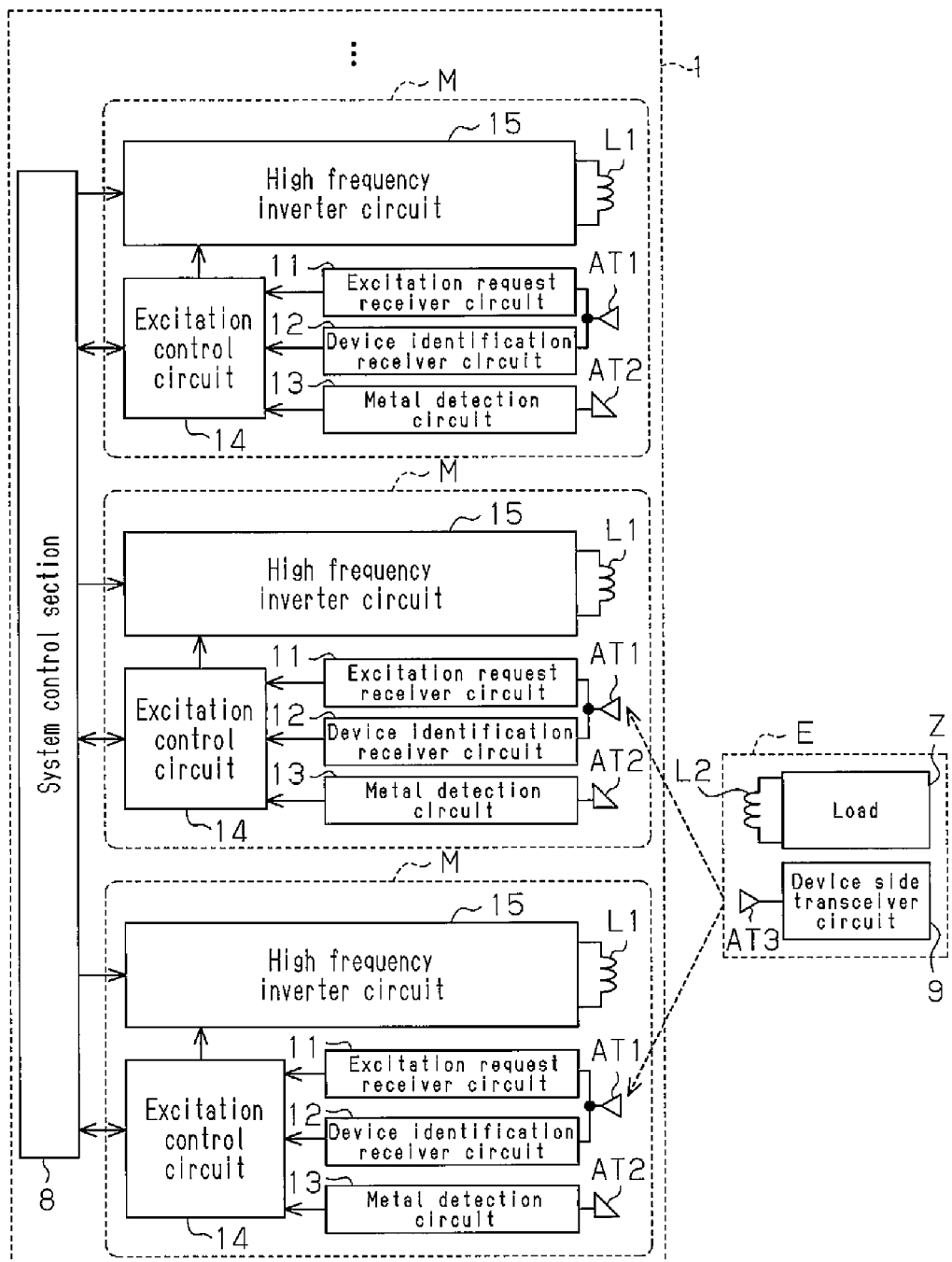
FIG. 9 is an explanatory perspective diagram explaining a state in which one device transmits data to a plurality of power supply modules.

In this case, as shown in FIG. 9, each of the power supply modules M corresponding to each of the primary coils L1 positioned directly below the device E respectively receives the excitation request signal RQ and the device identification signal ID of the device E, and sends the same to the system control section 8.

The system control section 8 determines whether the device E mounted directly above the respective power supply modules M is the same device based on the excitation request signal RQ and the device identification signal ID, to which the module identification signals are appended, from the respective power supply modules M.

At this occasion, if the size of the device E is large, the system control section 8 can determine from an aggregate of power supply modules M being adjacent without being spaced apart based on the module identification signal and the device identification signal ID of each module M.

Then, the system control section 8 sends the enable signal EN simultaneously to each of the power supply modules M positioned directly below the mounted device E and that had sent the excitation request signal RQ and the device identification signal ID.

Accordingly, by exciting a plurality of primary coils L1 by a cooperation of a plurality of power supply modules M, the power supply to one device E with a large size is performed.

Further, there are cases in which two or more devices E requesting the power supply are mounted on the mounting surface 6 of the power supply apparatus 1.

In such a case, each of the power supply modules M corresponding to the primary coils L1 positioned directly below the respective devices E receives the excitation request signal RQ and the device identification signal ID of its corresponding device, and sends the received excitation request signal RQ and device identification signal ID to the system control section 8.

The system control section 8 determines whether there are not one but two or more devices E being mounted directly above the respective power supply modules M based on the excitation request signal RQ and the device identification signal ID, to which the module identification signal is appended, from each of the power supply modules M.

At this occasion, if there are two or more devices E, the system control section 8 can determine that the respective devices E are at positions distant from each other based on the module identification signals of the respective power supply modules M and the device identification signal ID.

Further, the system control section 8 sends the enable signal EN to each of the power supply modules M positioned directly below the two or more devices E as mounted and that had sent the excitation request signal RQ and the device identification signal ID. Accordingly, the power supply modules M corresponding to each of the devices E respectively excite the primary coils L1, and perform the power supply to the respective devices E.

Further, the system control section 8 determines that a metal piece 7 is mounted directly above the aforementioned power supply modules M based on the metal detection signals ST from the excitation control circuits 14 of the aforementioned power supply modules M. When the metal detection signals ST are received from the excitation control circuits 14 of the power supply modules, the system control section 8 does not send the enable signal EN to the excitation control circuits 14 of the aforementioned power supply modules. That is, the system control section 8 determines that the metal piece 7 is mounted directly above the aforementioned power supply modules M, and does not send the enable signal EN to the excitation control circuits 14 of the aforementioned power supply modules.

Accordingly, even if a device E, to which power can be supplied and which requests the power supply, is mounted on the mounting surface 6 of the power supply apparatus 1, when a metal piece 7 is sandwiched between the device E and the mounting surface 6, the system control section 8 does not send the enable signal EN.

This is to prevent the metal piece 7 from being heated by induction.

Notably, there are cases in which the large-sized device E, to which the power is supplied by using two or more primary coils L1 as described above, is mounted, and the metal detection signal ST is sent from at least one of the power supply modules M, which is provided corresponding to the primary coils L1, to the system control section 8. In this case, the system control section 8 does not send the enable signal EN to all of the corresponding power supply modules M. Accordingly, the large-sized device E as mounted will not be supplied with power.

Further, in the case where two or more devices E are to be mounted, by respectively determining the two or more devices E, the enable signal EN is not sent to the power supply module M that supplies power to the device E with which the metal piece 7 has been detected. That is, the excitation of only the device E, with which the metal piece 7 is sandwiched, is stopped, and the power supply to the device E, with which the metal piece 7 is not sandwiched, is continued.

The system control section 8 includes the signal generator circuit not shown that generates the above described first excitation synchronizing signal Vs1, second excitation synchronizing signal Vs2, and intermittent high signal Vst. When a power switch (not shown) of the power supply apparatus 1 is turned on, the system control section 8 drives the signal generator circuit, and generates the first excitation synchronizing signal Vs1, the second excitation synchronizing signal Vs2, and the intermittent high signal Vst. Then, the system control section 8 sends the first excitation synchronizing signal Vs1, the second excitation synchronizing signal Vs2, and the intermittent high signal Vst to the high frequency inverter circuits 15 of all of the power supply modules M.

Accordingly, under a state in which all of the power supply modules M is not receiving the enable signal EN (for example, the standby state), the high frequency inverter circuits 15 of all of the power supply modules M keep receiving the first excitation synchronizing signal Vs1, the second excitation synchronizing signal Vs2, and the intermittent high signal Vst. Due to this, the respective primary coils L1 of the power supply apparatus 1 are not excited continuously, but are driven to be excited intermittently.

Figure 10:
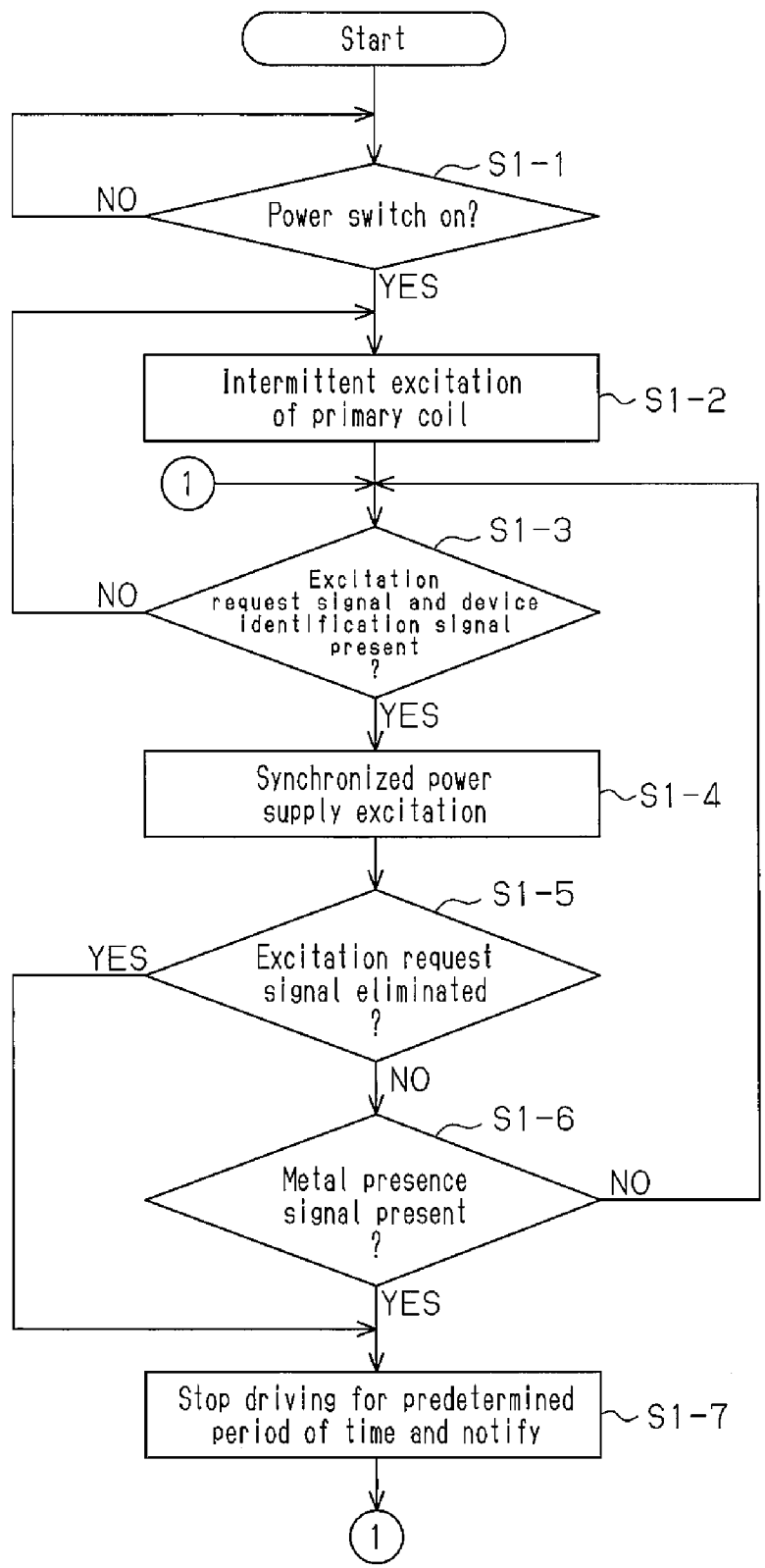
FIG. 10 is a flow chart showing a processing operation of a system control section.

Next, operations of the power supply apparatus 1 configured as above will be described with reference to a flowchart showing a processing operation of the system control section 8 composed of the microcomputer shown in FIG. 10.

When the power switch not shown is turned on and power is started to be supplied to the power supply apparatus 1 (YES to step S1-1), the primary coils L1 are driven to be excited intermittently. That is, the system control section 8 sends the first excitation synchronizing signal Vs1, the second excitation synchronizing signal Vs2, and the intermittent high signal Vst for driving the primary coils L1 to be excited intermittently to the high frequency inverter circuit 15 of all of the power supply modules M (step S1-2).

According to this, the high frequency inverter circuits 15 of all of the power supply modules M excite the primary coils L1 intermittently. Then, the system control section 8 waits for the excitation request signal RQ and the device identification signal ID from each of the power supply modules M (step S1-3). The system control section 8 repeats step S1-2 and step S1-3 until the excitation request signal RQ and the device identification signal ID from a power supply module M are received, and continues the intermittent excitation of the respective primary coils L1. That is, the power supply modules M goes into the standby state.

Meanwhile, when the device E is placed, the device E obtains small secondary supply of power by the intermittent excitation of the primary coils L1 of the power supply apparatus 1, and causes a device side transceiver circuit 9 to operate. Specifically, the device E sends the device identification signal ID and excitation request signal RQ of the device E generated by the device side transceiver circuit 9 to the signal receiver antenna AT1 of the power supply module M positioned directly below the device E via the transceiver antenna AT3.

Then, the signal receiver antenna AT1 receives the device identification signal ID and the excitation request signal RQ from the device E. The excitation request signal RQ is extracted at the excitation request receiver circuit 11, and the device identification signal ID is extracted at the device identification receiver circuit 12. The excitation request signal RQ and the device identification signal ID are received at the system control section 8 via the excitation control circuit 14.

The system control section 8 determines that a device E, to which power can be supplied and which requests the power supply, has been mounted directly above the aforementioned power supply module M based on the excitation request signal RQ and the device identification signal ID from the excitation control circuit 14, and sends the enable signal EN to the excitation control circuit 14 of the aforementioned power supply module M (step S1-4).

That is, the excitation control circuit 14 sends the drive control signal CT to the high frequency inverter circuit 15 (excitation synchronizing signal generator circuit 17) in response to the enable signal EN. According to this, the inverter control signal Vss is sent from the excitation synchronizing signal generator circuit 17, and continuous excitation is started with the primary coil L1 positioned where the device E is mounted.

Next, the system control section 8 determines whether the excitation request signal RQ has eliminated, and determines whether the metal detection signal ST has been sent (steps S1-5, S1-6). In a case where the excitation request signal RQ is not eliminated (NO to step S1-5) and the metal detection signal ST is not sent (NO to step S1-6), the system control section 8 returns to step S1-3, and continues the continuous excitation of the primary coil L1 (step S1-3 to step S1-6). That is, the power supply to the device E is continued. Accordingly, the device E receives contactless power supply from the power supply apparatus 1, and drives the load Z by the supplied power.

Here, in step S1-5, when the device E is dismounted from the mounting surface 6, or when the excitation request signal RQ is eliminated, the system control section 8 determines that the excitation request signal RQ is eliminated (YES to step S1-5), proceeds to step S1-7, notifies a user of the elimination by driving a notification lamp or a notification buzzer not shown over a predetermined period of time, stops sending the enable signal EN to the power supply module M, and proceeds to step S1-3.

After proceeding to step S1-3, the system control section 8 waits for new excitation request signal RQ and device identification signal ID from the aforementioned power supply module M. The system control section 8 repeats step S1-2 and step S1-3 until the excitation request signal RQ and the device identification signal ID from a power supply module M are received, and continues the intermittent excitation of the respective primary coils L1.

Thus, in the case where the device E is moved away from the power supply apparatus 1, with the system control section 8 going into the standby mode, the primary coils L1 shifts to the intermittent excitation state, thus a standby power can be suppressed.

Further, in step S1-6, when the metal detection signal ST is received from a power supply module M, the system control section 8 proceeds to step S1-7 in response to the metal detection signal ST being sent from the aforementioned power supply module M (YES to step S1-6).

Accordingly, in the case where the metal detection signal ST is sent, the system control section 8 notifies the user of the reception by driving the notification lamp or the notification buzzer not shown over a predetermined period of time, stops sending the enable signal EN to the power supply module M, and returns to step S1-3. Thereafter, the system control section 8 keeps driving the notification lamp or the notification buzzer by repeating the processes of step S1-3 to step S1-7 until when the metal detection signal ST is eliminated. Upon repeating the processes of step S1-3 to step S1-7, due to the processing time for the continuous excitation in step S1-4 being much shorter than the enable signal EN output stop time in step S1-7, the system control section 8 performs intermittent excitation of the primary coil L1 of the aforementioned supply module M.

Accordingly, in a case where the state in which the presence of the metal piece 7 is affirmatively determined is continued, the system control section 8 continues the intermittent excitation, and can prevent the metal piece 7 from being heated by the induction.

By configuring as above, the present embodiment achieves the following advantages.

(1) In the present embodiment, the plurality of primary coils L1 is arranged on a single plane on a lower side of the top plate 5 having the mounting surface 6 in the power supply apparatus 1, and the respective power supply modules M provided for each of the primary coils L1 and that excitingly drive the same, and the system control section 8 that integrates the respective power supply modules M are provided.

Further, each of the power supply modules M receives the device identification signal ID and the excitation request signal RQ from the device E via the signal receiver antenna AT1 provided at the position adjacent to the corresponding primary coil L1, and sends those device identification signal ID and excitation request signal RQ to the system control section 8.

Then, the system control section 8 sends the enable signal EN, which permits the continuous excitation of the primary coil L1, to the power supply module M, which had sent the device identification signal ID and the excitation request signal RQ, among the respective power supply modules M.

Accordingly, when the device E is mounted on the mounting surface 6 of the power supply apparatus 1, not all of the primary coils L1 arranged on the same plane are continuously excited, but instead only the primary coil L1 positioned directly below the device E is continuously excited for supplying power regardless of magnitude of the size; thus, the power consumption upon the power supply can be reduced, and highly efficient power supply can be performed.

(2) Further, since only the primary coil L1 positioned directly below the device E can be continuously excited for supplying power, power can be supplied simultaneously to two or more devices E mounted on the mounting surface 6 of the power supply apparatus 1.

(3) Further, since the first power transistors Q1 and the second power transistors Q2 provided in the high frequency inverter circuits 15 for driving the respective primary coils L1 to be excited are turned on and off by the first excitation synchronizing signal Vs1 and the second excitation synchronizing signal Vs2 supplied to the high frequency inverter circuits 15 of all of the power supply modules M, the respective primary coils L1 are excited with the waveform of the same phase.

Accordingly, in exciting a plurality of primary coils L1 simultaneously for one device E mounted on the mounting surface 6 so as to supply power to the device E in cooperation, due to the excitation waveforms of these primary coils L1 being matched, stable and highly efficient power supply can be performed.

(4) Further, since the continuous excitation of the primary coils L1 is performed when the device identification signal ID and the excitation request signal RQ are received from the device E mounted on the mounting surface 6, in cases where a device that is not an object of power supply or a device E that has stopped requesting the power supply is mounted on the mounting surface 6, unnecessary excitation is prevented, and safety can be improved.

(5) In the present embodiment, since all of the primary coils L1 are in the intermittent excitation state when nothing is mounted on the mounting surface 6 of the power supply apparatus 1, the power consumption during standby can be suppressed.

(6) Further, the intermittent excitation of the primary coils L1 is made capable of generating small secondary power with respect to the secondary coil L2 of the device E mounted on the mounting surface 6.

Accordingly, in a case where a device E such as a cellular phone that operates by a secondary battery is mounted on the mounting surface 6, the device E is charged gradually by this small secondary power. That is, at the time of having just been mounted, the secondary battery is not charged, a case in which the device side transceiver circuit 9 of the device E that operates by the secondary battery does not operate occurs. In this case, the device side transceiver circuit 9 of the device E can be enabled to generate and send the device identification signal ID and the excitation request signal RQ by the gradual charging of the secondary battery.

(7) The power supply to the device E is stopped by switching the excitation of the primary coils L1 from the continuous excitation to the intermittent excitation when the elimination of the excitation request signal RQ for requesting to stop the power supply takes place in the mounted device E. Due to this, the power supply to the device E can be performed at high accuracy and safely, and the reduction in the power consumption is achieved.

(8) In the present embodiment, the metal detection antennas AT2 that detect the metal piece 7 mounted on the mounting surface 6 of the power supply apparatus 1 are provided, and the power supply to the device E is stopped by switching the excitation of the primary coils L1 from the continuous excitation to the intermittent excitation when the metal detection antennas AT2 detect a metal piece 7. Due to this, the metal piece 7 mounted on the mounting surface 6 is prevented from being heated by induction.

(9) Further, since the dead time td during which the first and second excitation synchronizing signals Vs1, Vs2 for turning the first power transistor Q1 and the second power transistor Q2 on and off are both in the low level is set, the soft switching is performed automatically during the dead time td.

Accordingly, since the first power transistor Q1 and the second power transistor Q2 can be turned on after the voltage between each source and drain becomes zero volts, a turn-on loss in each of the first power transistor Q1 and the second power transistor Q2 can be eliminated. Further, since a higher harmonic wave component in the current waveform flowing in the primary coils L1 upon the turn-on and turn-off can be made smaller, and thereby noise can be reduced.

(10) Further, the size of the respective primary coils L1 is set such that one or more primary coils L1 positioned directly below the secondary coil L2 of the device E are included within the area of the secondary coil L2 when the device E is mounted on the mounting surface 6.

Accordingly, the device to which power is supplied can be excited by a minimum group of primary coils L1 corresponding to the area of the secondary coil L2 provided to the device E, thus can be driven highly efficiently.

Notably, in the present embodiment, the first OR circuit 23 and the second OR circuit 24 respectively receive the same inverter control signal Vss and intermittent high signal Vst. Accordingly, since the first output signal Vrs1 of the first OR circuit 23 and the second output signal Vrs2 of the second OR circuit 24 have the same output waveform, one of the first OR circuit 23 and the second OR circuit 24 may be omitted. Further, for example, the remained first OR circuit 23 may send the first output signal Vrs1 to the first AND circuit 21, and send the second output signal Vrs2 to the second AND circuit 22.

According to this, a circuit scale of the high frequency inverter circuit 15 can be reduced.

Further, in the present embodiment, the device identification signal ID and the excitation request signal RQ are received from the device E, however, only one of the device identification signal ID and the excitation request signal RQ may be received, such that only the device identification signal ID may be received, or alternatively, only the excitation request signal RQ may be received. Due to this, component-saving and cheap configuration can be made.

Moreover, in the present embodiment, no specific details are given regarding radio frequency of the excitation request signal RQ from the device E. However, a wireless signal having a frequency different from the excitation frequency of the primary coils L1 is generated by using the power of the device E or an auxiliary power on the device E side obtained by the electromagnetic induction from the primary coils L1, and this wireless signal of the different frequency is modulated by the excitation request signal, and is sent to the power supply module M directly below the device E. Further, this modulated wireless signal is detected by the signal receiver antenna AT1, and the excitation request receiver circuit 11 may demodulate the excitation signal from the detected wireless signal.

Due to this, the modulated wireless signal having the independent frequency different from the excitation frequency of the primary coils L1 is detected by the signal receiver antenna AT1, and the excitation request receiver circuit 11 demodulates the excitation request signal from the detected wireless signal to obtain the excitation synchronizing signal; thus, reliability of the system is improved.

Further, in the present embodiment, the system control section 8 generated and sent the first excitation synchronizing signal Vs1, the second excitation synchronizing signal Vs2, and the intermittent high signal Vst, however, the excitation control circuit 14 or the high frequency inverter circuit 15 may generate the first excitation synchronizing signal Vs1, the second excitation synchronizing signal Vs2, and the intermittent high signal Vst.

Further, in the present embodiment, the size of the primary coils L1 is set such that one or more primary coils L1 positioned directly below the secondary coil L2 of the device E are included in the area of the secondary coil L2 when the device E is mounted on the mounting surface 6. However, no limitation is made hereof, and an area of one primary coil L1 that comes directly below may be larger than the area of one secondary coil L2. Although efficiency may be lowered, briefly, various configurations are applicable so long as supplied power is generated at the secondary coil L2 by the electromagnetic induction performed between the primary coil L1 and the secondary coil L2.

(Second Embodiment)

Next, a power supply apparatus 1 of the second embodiment will be described with reference to FIG. 11.

The power supply apparatus 1 of the first embodiment excited all of the primary coils L1 intermittently in the standby state, however, on the other hand, the present embodiment is characterized in that all or a part of primary coils L1 are excited intermittently for the first time when an object 30 including a device E is mounted on a mounting surface 6.

Note that, for the sake of description, parts that are common between the present embodiment and the first embodiment will be given the same reference signs as the first embodiment, and detailed descriptions thereof will be omitted.

Figure 11:
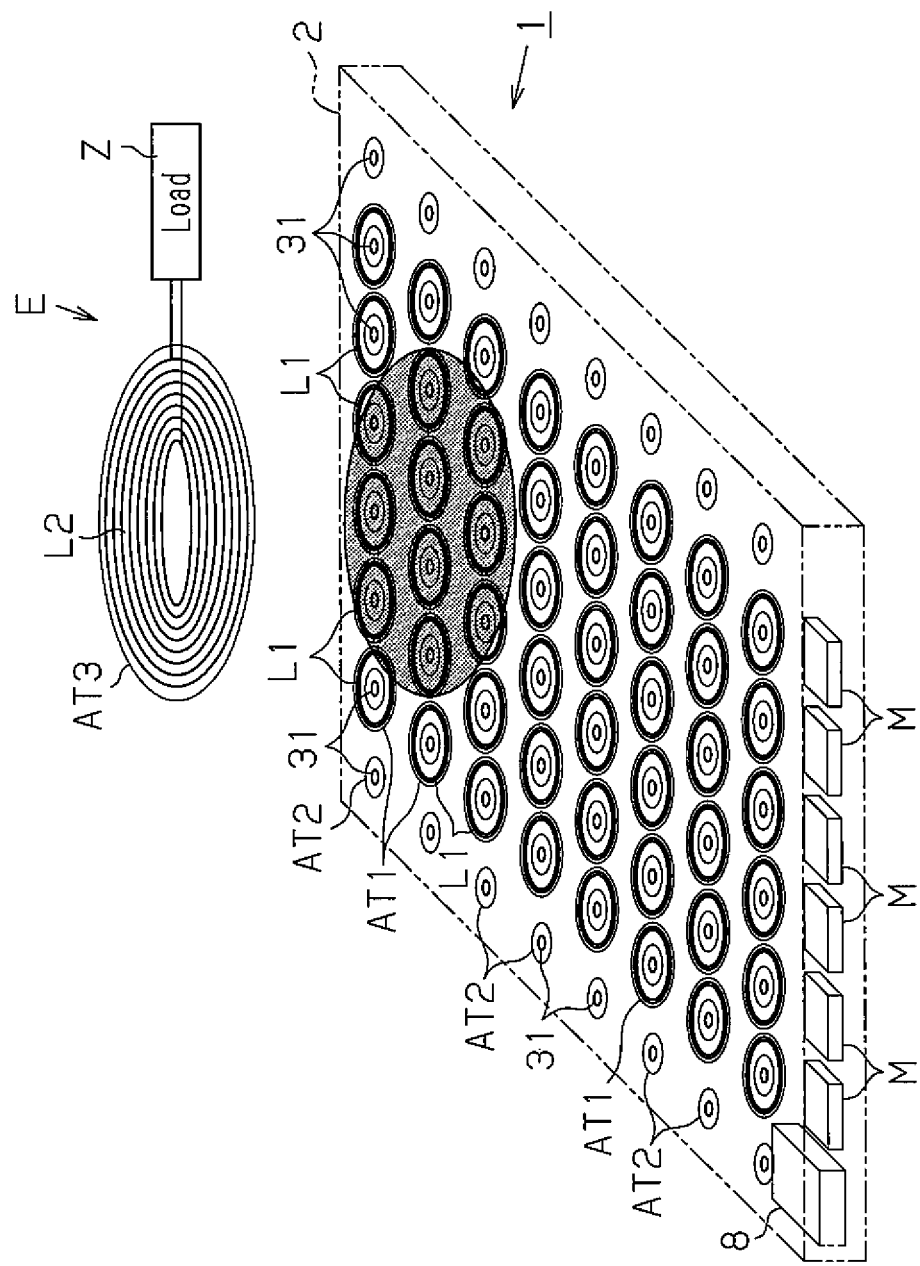
FIG. 11 is an overall perspective diagram of a power supply apparatus of the second embodiment in which an object detection sensor is provided.

As shown in FIG. 11, at a top surface (mounting surface 6) of a top plate 5 of the power supply apparatus 1, and at each of arranged positions of respective metal detection antennas AT2, an object detection sensor 31 is provided. Accordingly, the respective object detection sensors 31 are arranged evenly within an entirety of the mounting surface 6.

In the present embodiment, each object detection sensor 31 is an optical reflection sensor composed of a light emitting element and a light receiving element. When the object 30 (see FIG. 12) is placed directly above, each object detection sensor 31 detects the object 30 when light that the light emitting element emitted upright is reflected by the object 30, and reflected light thereof is received by the light receiving element, and sends an object detection signal MT. Accordingly, when the object 30 is not arranged directly above the respective object detection sensors 31, the light emitted by the light emitting elements does not turn into the reflected light, whereby the light receiving elements cannot receive light, and the object detection signals MT are not sent.

Notably, in the present embodiment, the object detection sensor 31 is the optical reflection sensor composed of the light emitting element and the light receiving element, however, it may be implemented by a pressure detecting element that detects weight of the object 30. Briefly, the object detection sensor is acceptable so long as it does not set a limitation on detectable materials and is capable of detecting an object 30 made of any materials such as metal, plastic, wood, and the like.

Each object detection sensor 31 is connected to a power supply module M to which a metal detection antenna AT2 arranged opposing the same is connected. When the object 30 is detected, respective object detection sensors 31 send the object detection signal MT to the power supply modules M.

Figure 12:
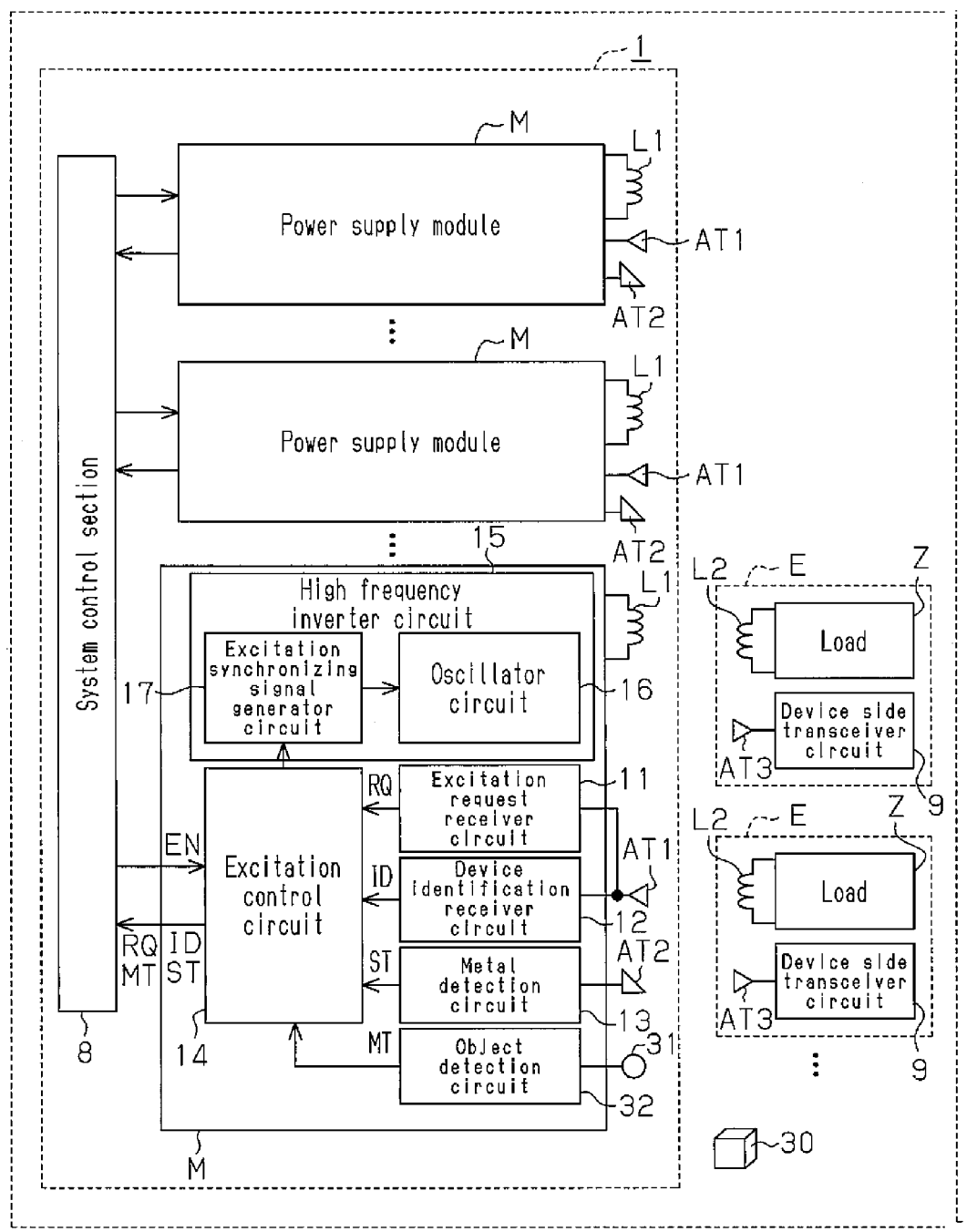
FIG. 12 is an electrical block circuitry diagram showing an electrical configuration of a power supply apparatus of the second embodiment.

FIG. 12 shows an electrical block circuitry diagram showing an electrical configuration of the power supply apparatus 1 of the present.

In FIG. 12, each power supply module M includes, in addition to an excitation request receiver circuit 11, a device identification receiver circuit 12, a metal detection circuit 13, an excitation control circuit 14, and a high frequency inverter circuit 15, an object detection circuit 32.

The object detection circuit 32 is connected to the object detection sensor 31, and receives the object detection signal MT sent from the corresponding object detection sensor 31. Further, the object detection circuit 32 sends this object detection signal MT to the excitation control circuit 14 as an indication that the object 30 is mounted on the mounting surface 6.

The excitation control circuit 14 sends, in addition to an excitation request signal RQ from the excitation request receiver circuit 11, a device identification signal ID from the device identification receiver circuit 12, and a metal detection signal ST from the metal detection circuit 13, the object detection signal MT from the object detection circuit 32 by appending a module identification signal for identifying its power supply module M to a system control section 8.

When only the object detection signal MT is received from the excitation control circuit 14, the system control section 8 sends the above-described first excitation synchronizing signal Vs1, second excitation synchronizing signal Vs2, and intermittent high signal Vst to the oscillator circuit 16 of the high frequency inverter circuit 15 of the aforementioned power supply module M.

That is, in the power supply apparatus 1 of the present embodiment, even if a power switch is turned on, all of the primary coils L1 are not activated, and are not being intermittently excited. Further, when the object 30 is detected, the power supply apparatus 1 intermittently excites only the primary coil L1 at a position where the object 30 is mounted, and does not excite the primary coils L1 at other positions and keeps them inactivated.

Accordingly, during when no object 30 including the device E is mounted, all of the primary coils L1 are not intermittently excited, and in the event where an object 30 that is not a device E is mounted, only the primary coil L1 at the mounted portion is intermittently excited; thus, the power supply apparatus 1 can significantly reduce power consumption during a standby state.

Figure 13:
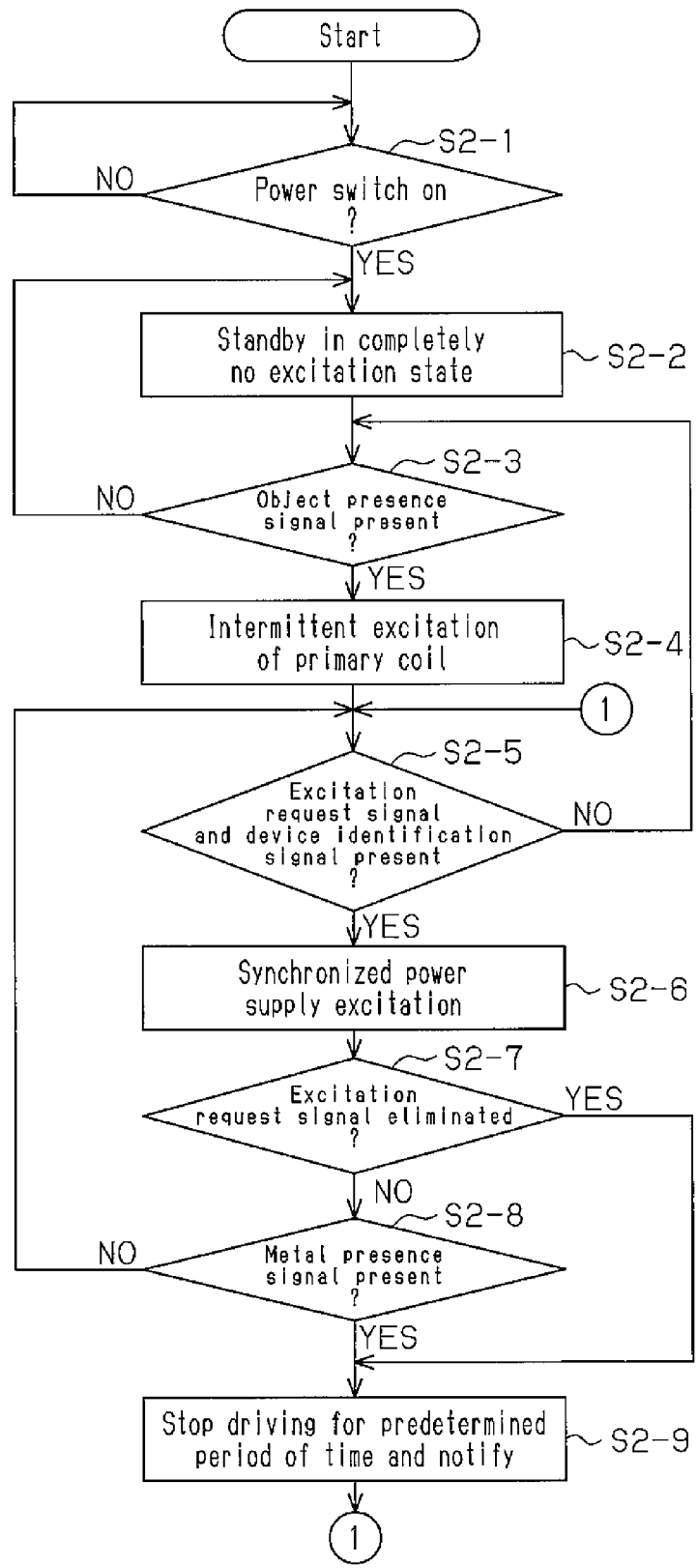
FIG. 13 is a flow chart for explaining an operation of the second embodiment.

Next, workings of the power supply apparatus 1 configured as above will be described with reference to a flow chart showing a processing operation of the system control section 8 shown in FIG. 13.

Notably, the present embodiment is characterized in that the system control section 8 selects a primary coil L1 that is to be an objet of control based on presence/absence of the object detection signal MT from the object detection sensors 31, and performs excitation control of the selected primary coil L1. Others of the present embodiment are basically the same as the first embodiment. Due to this, characteristic portions of the present embodiment will be described in detail, and portions common between the present embodiment and the first embodiment will be omitted for the sake of convenience of description.

Now, when a power switch not shown is turned on, and power is supplied to the power supply apparatus 1 (YES to step S2-1), the system control section 8 waits for the object detection signal MT from the respective power supply modules M (step S2-3) without sending the first excitation synchronizing signal Vs1, the second excitation synchronizing signal Vs2, and the intermittent high signal Vst to the high frequency inverter circuits 15 of the respective power supply modules M (step S2-2). That is, the system control section 8 waits for the object detection signal MT in a state of not performing intermittent excitation to all of the primary coils L1.

After that, when the object 30 is mounted at a certain position on the mounting surface 6, the object detection sensors 31 connected to the plurality of power supply modules M, which is positioned directly below the mounted object 30, detect the object 30 and send the object detection signal MT. Then, the excitation control circuit 14 of the respective power supply modules M, which receives the object detection signal MT from the object detection sensors 31, sends the object detection signal MT to the system control section 8.

When the system control section 8 receives the object detection signal MT from the respective power supply modules M (YES to step S2-3), it drives the primary coils L1 connected to the power supply modules M, which had sent the object detection signal MT to be excited intermittently (step S2-4).

That is, the system control section 8 sends the first excitation synchronizing signal Vs1, the second excitation synchronizing signal Vs2, and the intermittent high signal Vst for driving the primary coils L1 to be intermittently excited to the high frequency inverter circuits 15 of the plurality of power supply modules M, which is positioned directly below the mounted object 30. Due to this, only the primary coils L1 positioned directly below the mounted object 30 are exited intermittently.

Subsequently, the system control section 8 waits for the excitation request signal RQ and the device identification signal ID from the respective power supply modules M (step S2-5), and repeats step S2-3 to step S2-5 until the excitation request signal RQ and the device identification signal ID from the power supply modules M are received. That is, the excitation of the respective primary coils L1, which are positioned directly below the mounted object 30, is continued intermittently. Accordingly, if the object 30 is removed during the above period (NO to step S2-3), the system control section 8 proceeds to step S2-2, stops sending the first excitation synchronizing signal Vs1, the second excitation synchronizing signal Vs2, and the intermittent high signal Vst, and stops the intermittent excitation of the primary coils L1.

Then, if the mounted object 30 is a device E, this object 30, i.e. the device E, sends the device identification signal ID and the excitation request signal RQ to the signal receiver antennas AT1 of the power supply modules M, which is positioned directly below the device E.

Then, the excitation control circuits 14 of the aforementioned power supply modules M sends the excitation request signal RQ from the excitation request receiver circuits 11 and the device identification signal ID from the device identification receiver circuit 12 respectively to the system control section 8.

When the excitation request signal RQ and the device identification signal ID are received from the excitation control circuits 14 (YES to step S2-5), by determining that the device E to which power can be supplied and that requests power supply has been mounted directly above the aforementioned power supply modules M, the system control section 8 sends an enable signal EN to the excitation control circuits 14 of the aforementioned power supply modules M (step S2-6).

That is, the excitation control circuits 14 send a drive control signal CT to the high frequency inverter circuits 15 (excitation synchronizing signal generator circuits 17) in response to the enable signal EN. Due to this, the system control section 8 starts continuous excitation of the primary coils L1 at the position where the device E is mounted.

Subsequently, the system control section 8 determines whether the excitation request signal RQ has eliminated, and determines whether the metal detection signal ST has been sent (steps S2-7, S2-8). In a case where the excitation request signal RQ is not eliminated (NO to step S2-7) and the metal detection signal ST is not sent (NO to step S2-7), the system control section 8 returns to S2-5, and continues the continuous excitation to the primary coils L1 (step S2-5 to step S2-8). That is, the power supply to the device E is continued. Accordingly, the device E receives contactless power supply from the power supply apparatus 1, and drives a load Z by the supplied power.

Here, in step S2-7, when the device E is dismounted from the mounting surface 6, or when the excitation request signal RQ is eliminated, the system control section 8 determines that the excitation request signal RQ is eliminated (YES to step S2-7), proceeds to step S2-9, notifies a user of the elimination by driving a notification lamp or a notification buzzer not shown over a predetermined period of time, stops sending the enable signal EN to the power supply modules M, and proceeds to step S2-5.

After proceeding to step S2-5, the system control section 8 proceeds to step S2-3 because no new excitation request signal RQ and device identification signal ID are received from the aforementioned power supply modules M (NO to step S2-5). At this occasion, since the object detection signal MT is also eliminated (NO to step S2-3), the system control section 8 proceeds to step S2-2, and stops the excitation of the primary coils L1 that had been driven to be excited for supplying power to the device E until then by stopping the first excitation synchronizing signal Vs1, the second excitation synchronizing signal Vs2, and the intermittent high signal Vst that had been sent to the high frequency inverter circuits 15 of the power supply modules M.

Further, in step S2-8, when the metal detection signal ST is received from a power supply module M, the system control section 8 proceeds to step S2-9 in response to the metal detection signal ST being sent from the aforementioned power supply module M (YES to step S2-8).

Accordingly, in the case where the metal detection signal ST is sent, the system control section 8 notifies the user of the reception by driving the notification lamp or the notification buzzer not shown over a predetermined period of time, stops sending the enable signal EN to the aforementioned power supply modules M, and returns to step S2-5. Thereafter, the system control section 8 keeps driving the notification lamp or the notification buzzer by repeating the processes of step S2-5 to step S2-9 until when the metal detection signal ST is eliminated. Upon repeating the processes of step S2-5 to step S2-9, due to the processing time for the continuous excitation in step S2-6 being much shorter than the enable signal EN output stop time in step S2-9, the system control section 8 performs intermittent excitation of the primary coils L1 of the aforementioned power supply modules M.

Accordingly, in a case where the state in which the presence of a metal piece 7 is affirmatively determined is continued, the intermittent excitation of the primary coils L1 is continued, and the metal piece 7 is prevented from being heated by induction.

Accordingly, since the present embodiment is configured to stop excitation operation of all of the primary coils L1 in the event where nothing is mounted on the power supply apparatus 1, thus, reduction of power consumption can further be achieved.

Further, in the present embodiment, in the event where the object 30 (device E) is mounted, the excitation operation is performed only on the primary coils L1 that are at the mounted position, thus, the power consumption can further be reduced.

(Third Embodiment)

Next, the third embodiment will be described with reference to FIG. 14.

In the power supply apparatus 1 of the first embodiment, each of the first excitation synchronizing signal Vs1 and the second excitation synchronizing signal Vs2 was one type. However, the present embodiment is characterized in that a first excitation synchronizing signal Vs1 and a second excitation synchronizing signal Vs2 include two types with different frequencies of low frequency and high frequency first excitation synchronizing signals Vs1$a$, Vs1$b$, and low frequency and high frequency second excitation synchronizing signals Vs2$a$, Vs2$b$, and in that excitation synchronizing signals with different frequencies are sent according to a device E to be mounted or states of the device.

Note that, for the sake of description, parts that are common between the present embodiment and the first embodiment will be given the same reference signs as the first embodiment, and detailed descriptions thereof will be omitted.

Figure 14:
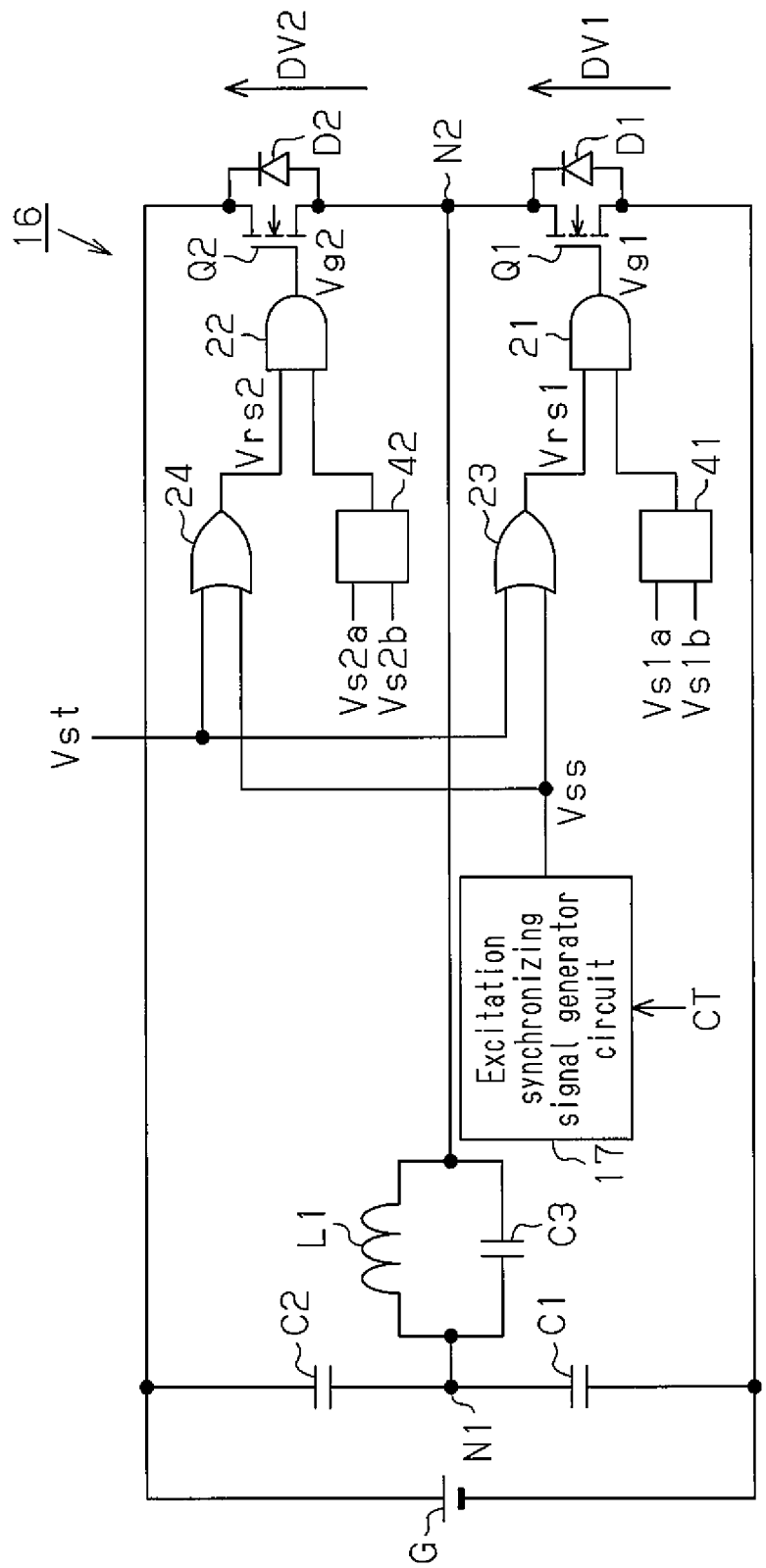
FIG. 14 is a high frequency inverter circuit of a power supply module of the third embodiment.

FIG. 14 shows an electric circuit showing a high frequency inverter circuit 15 of each power supply module M.

A first input terminal of a first AND circuit 21 is connected to a first switching circuit 41. One of the low frequency first excitation synchronizing signal Vs1$a$ and the high frequency first excitation synchronizing signal Vs1$b$ from the first switching circuit 41 is received at the first input terminal of the first AND circuit 21. Further, a second input terminal of the first AND circuit 21 is connected to the first OR circuit 23. A first output signal Vrs1 from the first OR circuit 23 is received at the second input terminal of the first AND circuit 21.

Figure 15:
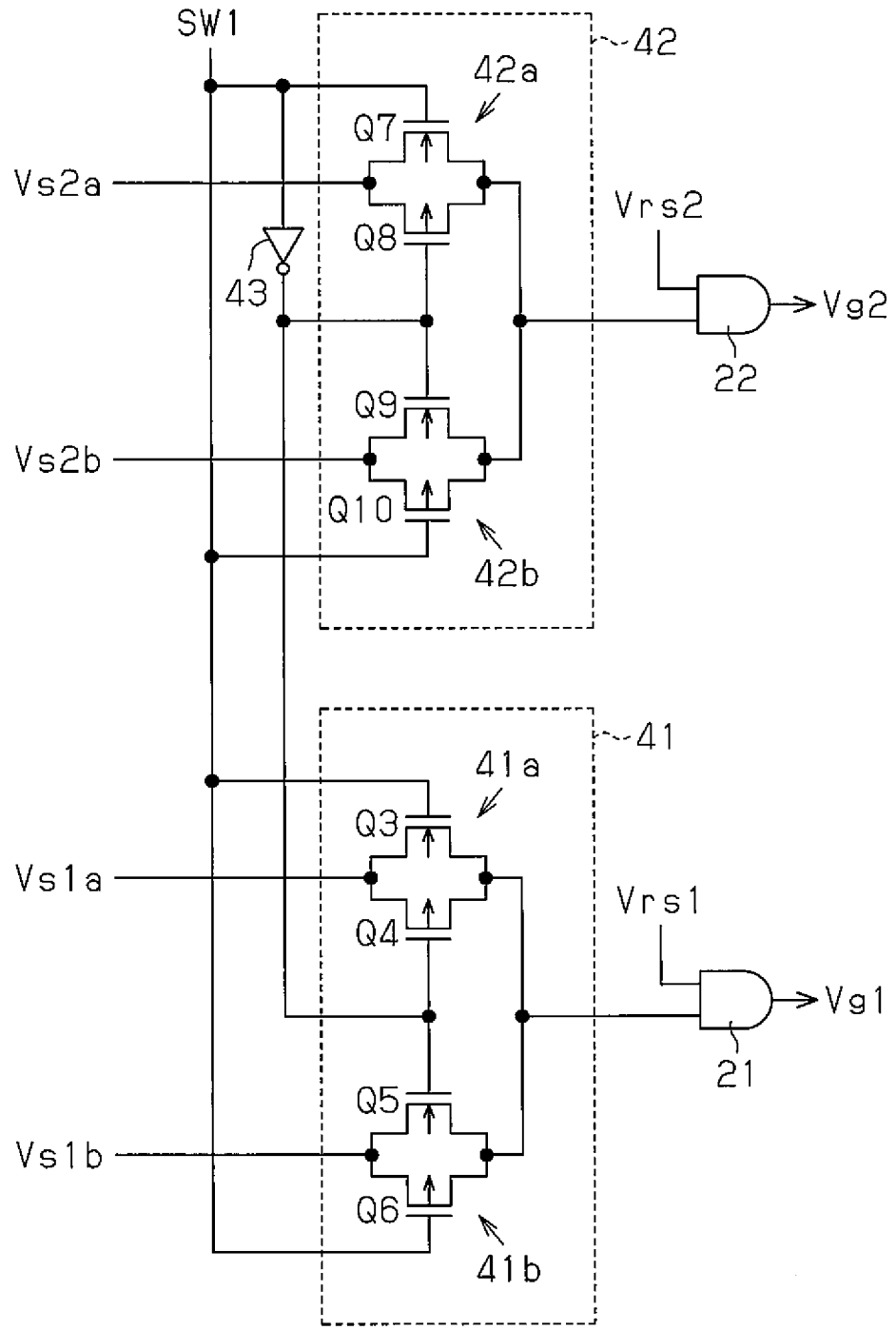
FIG. 15 is an electrical circuitry diagram of first and second switching circuits of the third embodiment.

As shown in FIG. 15, the first switching circuit 41 includes a first transmission gate 41$a$ that receives the low frequency first excitation synchronizing signal Vs1$a$ and a second transmission gate 41$b$ that receives the high frequency first excitation synchronizing signal Vs1$b$.

Figure 16:
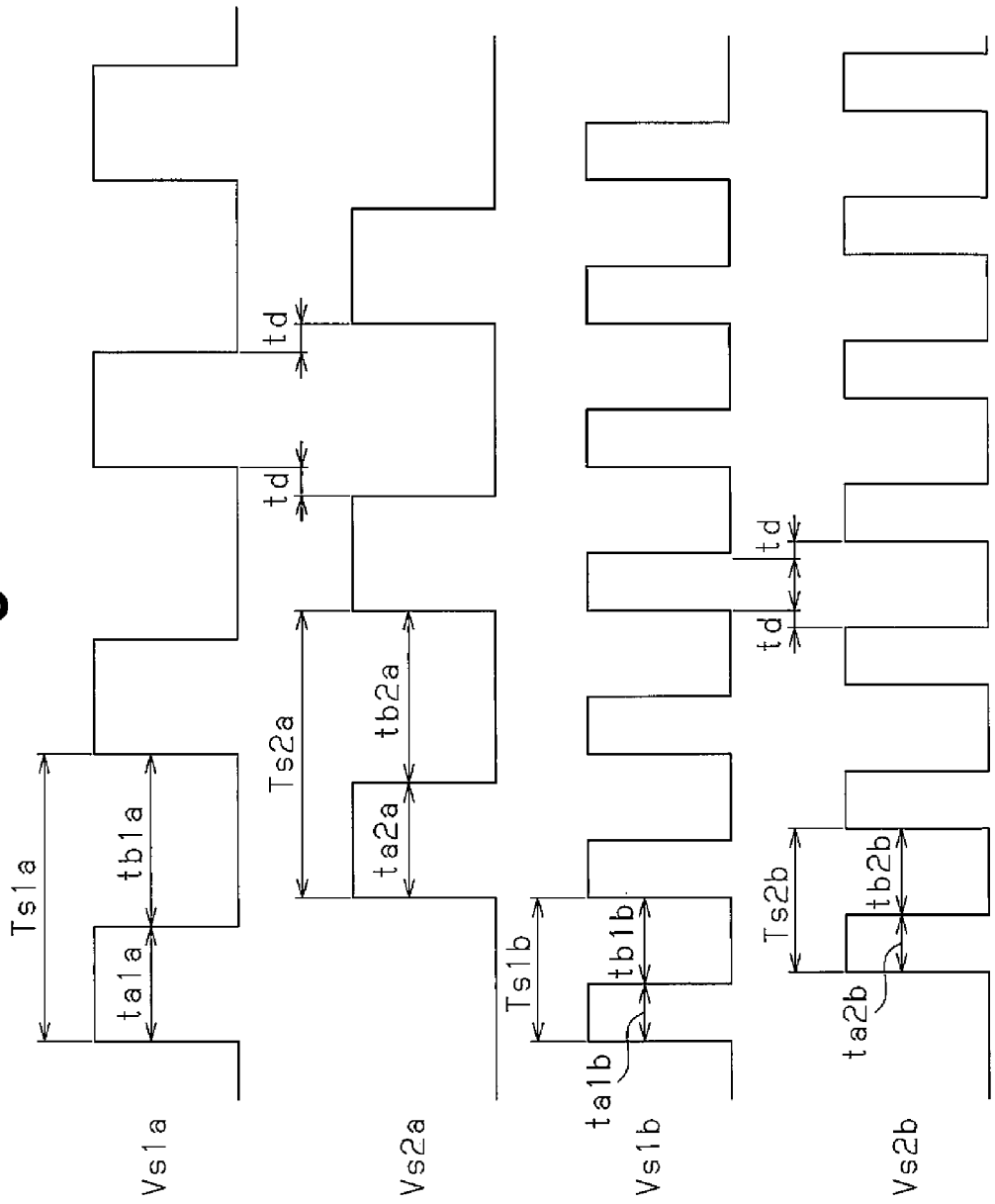
FIG. 16 is an output waveform chart of a low frequency excitation synchronizing signal and a high frequency excitation synchronizing signal of the third embodiment.

In the present embodiment, as shown in FIG. 16, a waveform of the low frequency first excitation synchronizing signal Vs1$a$ is of the same waveform as the first excitation synchronizing signal Vs1 of the first embodiment. That is, a cycle Ts1$a$, a high level time ta1$a$, and a low level time tb1$a$ of the low frequency first excitation synchronizing signal Vs1$a$ are set to be the same as the cycle Ts1, the high level time ta1, and the low level time tb1 of the first excitation synchronizing signal Vs1. Further, in the present embodiment, this low frequency first excitation synchronizing signal Vs1$a$ is sent from a signal generator circuit (not shown) provided in the system control section 8.

On the other hand, as shown in FIG. 16, a cycle Ts1$b$ of the high frequency first excitation synchronizing signal Vs1$b$ is set to be one-half of the cycle Ts1$a$ of the low frequency first excitation synchronizing signal Vs1$a$. Further, a high level time ta1$b$ and a low level time tb1$b$ of the high frequency first excitation synchronizing signal Vs1$b$ are respectively set to be one-half of the high level time ta1$a$ and the low level time tb1$a$ of the low frequency first excitation synchronizing signal Vs1$a$.

Further, in the present embodiment, this high frequency first excitation synchronizing signal Vs1$b$ is sent from the signal generator circuit (not shown) provided in the system control section 8.

Further, the low frequency first excitation synchronizing signal Vs1a is received at the first transmission gate 41a, and the first transmission gate 41a includes an N-channel MOS transistor Q3 and a P-channel MOS transistor Q4 that are connected in parallel to each other. Further, a first switching signal SW1 is received at a gate terminal of the N-channel MOS transistor Q3, and the first switching signal SW1 is received at a gate terminal of the P-channel MOS transistor Q4 via a first inverter circuit 43. Accordingly, when a high level first switching signal SW1 is received at the first transmission gate 41a, the first transmission gate 41a sends the low frequency first excitation synchronizing signal Vs1a to the first AND circuit 21.

Notably, in the present embodiment, this first switching signal SW1 is sent from the signal generator circuit (not shown) provided in the system control section 8.

On the other hand, the high frequency first excitation synchronizing signal Vs1b is sent to a second transmission gate 41b, and the second transmission gate 41b includes an N-channel MOS transistor Q5 and a P-channel MOS transistor Q6 that are connected parallel to each other. Further, the first switching signal SW1 is received at a gate terminal of the N-channel MOS transistor Q5 via the first inverter circuit 43, and the first switching signal SW1 is received at a gate terminal of the P-channel MOS transistor Q6. Accordingly, when a low level first switching signal SW1 is received at the second transmission gate 41b, the second transmission gate 41b sends the high frequency first excitation synchronizing signal Vs1b to the first AND circuit 21.

That is, when the high level first switching signal SW1 is received at the first switching circuit 41, the first switching circuit 41 sends the low frequency first excitation synchronizing signal Vs1a to the first AND circuit 21. Further, when the low level first switching signal SW1 is received at the first switching circuit 41, the first switching circuit 41 sends the high frequency first excitation synchronizing signal Vs1b to the first AND circuit 21.

A first input terminal of a second AND circuit 22 is connected to a second switching circuit 42. One of the low frequency second excitation synchronizing signal Vs2a and the high frequency second excitation synchronizing signal Vs2b from the second switching circuit 42 is received at the first input terminal of the second AND circuit 22. Further, a second input terminal of the second AND circuit 22 is connected to the second OR circuit 24. A second output signal Vrs2 from the second OR circuit 24 is received at the second input terminal of the second AND circuit 22.

As shown in FIG. 15, the second switching circuit 42 includes a third transmission gate 42a and a fourth transmission gate 42b. The low frequency second excitation synchronizing signal Vs2a is received at the third transmission gate 42a, and the high frequency second excitation synchronizing signal Vs2b is received at the fourth transmission gate 42b.

In the present embodiment, as shown in FIG. 16, a waveform of the low frequency second excitation synchronizing signal Vs2a is of the same waveform as the second excitation synchronizing signal Vs2 of the first embodiment. That is, a cycle Ts2a, a high level time ta2a, and a low level time tb2a of the low frequency second excitation synchronizing signal Vs2a are set to be the same as the cycle Ts2, the high level time ta2, and the low level time tb2 of the second excitation synchronizing signal Vs2. Further, in the present embodiment, this low frequency second excitation synchronizing signal Vs2a is sent from the signal generator circuit (not shown) provided in the system control section 8.

On the other hand, as shown in FIG. 16, a cycle Ts2b of the high frequency second excitation synchronizing signal Vs2b is set to be one-half of the cycle Isla of the low frequency second excitation synchronizing signal Vs2a. Further, a high level time ta2b and a low level time tb2b of the high frequency second excitation synchronizing signal Vs2b are respectively set to be one-half of the high level time ta2a and the low level time tb2a of the low frequency second excitation synchronizing signal Vs2a. Further, in the present embodiment, this high frequency second excitation synchronizing signal Vs2b is sent from the signal generator circuit (not shown) provided in the system control section 8.

Further, the low frequency second excitation synchronizing signal Vs2a is received at the third transmission gate 42a, and the third transmission gate 42a includes an N-channel MOS transistor Q7 and a P-channel MOS transistor Q8 that are connected in parallel to each other. Further, the first switching signal SW1 is received at a gate terminal of the N-channel MOS transistor Q7, and the first switching signal SW1 is received at a gate terminal of the P-channel MOS transistor Q8 via the first inverter circuit 43. Accordingly, when a high level first switching signal SW1 is received at the third transmission gate 42a, the third transmission gate 42a sends the low frequency second excitation synchronizing signal Vs2a to the second AND circuit 22.

On the other hand, the high frequency second excitation synchronizing signal Vs2b is received at the fourth transmission gate 42b, and the fourth transmission gate 42b includes an N-channel MOS transistor Q9 and a P-channel MOS transistor Q10 that are connected in parallel to each other. Further, the first switching signal SW1 is received at a gate terminal of the N-channel MOS transistor Q9 via the first inverter circuit 43, and the first switching signal SW1 is received at a gate terminal of the P-channel MOS transistor Q10. Accordingly, when a low level first switching signal SW1 is received at the fourth transmission gate 42b, the fourth transmission gate 42b sends the high frequency second excitation synchronizing signal Vs2b to the second AND circuit 22.

That is, when the high level first switching signal SW1 is received at the second switching circuit 42, the second switching circuit 42 sends the low frequency second excitation synchronizing signal Vs2a to the second AND circuit 22. Further, when the low level first switching signal SW1 is received at the second switching circuit 42, the second switching circuit 42 sends the high frequency second excitation synchronizing signal Vs2b to the second AND circuit 22.

Accordingly, when the high level first switching signal SW1 is received at the first and second switching circuits 41, 42, the low frequency first excitation synchronizing signal Vs1a is received at the first AND circuit 21, and the low frequency second excitation synchronizing signal Vs2a is received at the second AND circuit 22. To the contrary, when the low level first switching signal SW1 is received at the first and second switching circuits 41, 42, the high frequency first excitation synchronizing signal Vs1b is received at the first AND circuit 21, and the high frequency second excitation synchronizing signal Vs2b is received at the second AND circuit 22.

Further, (A) when the first switching signal SW1 is of the high level and the first and second output signals Vrs1, Vrs2 from the first and second OR circuits 23, 24 are respectively received at the first and second AND circuits 21, 22, the first and second AND circuits 21, 22 respectively sends first and second on/off signals Vg1, Vg2 having a same logic values as the logic values of the low frequency first and second excitation synchronizing signals Vs1a, Vs2a to the gates of the first and second power transistors Q1, Q2.

That is, due to the waveforms of the low frequency first excitation synchronizing signal Vs1a and the low frequency second excitation synchronizing signal Vs2a having an inverted relationship to each other, similar to the previous embodiment, the first power transistor Q1 and the second power transistor Q2 are turned on and off alternately. Further, by these first power transistor Q1 and second power transistor Q2 being turned on and off alternately, the primary coil L1 is driven to be excited continuously.

Figure 17:
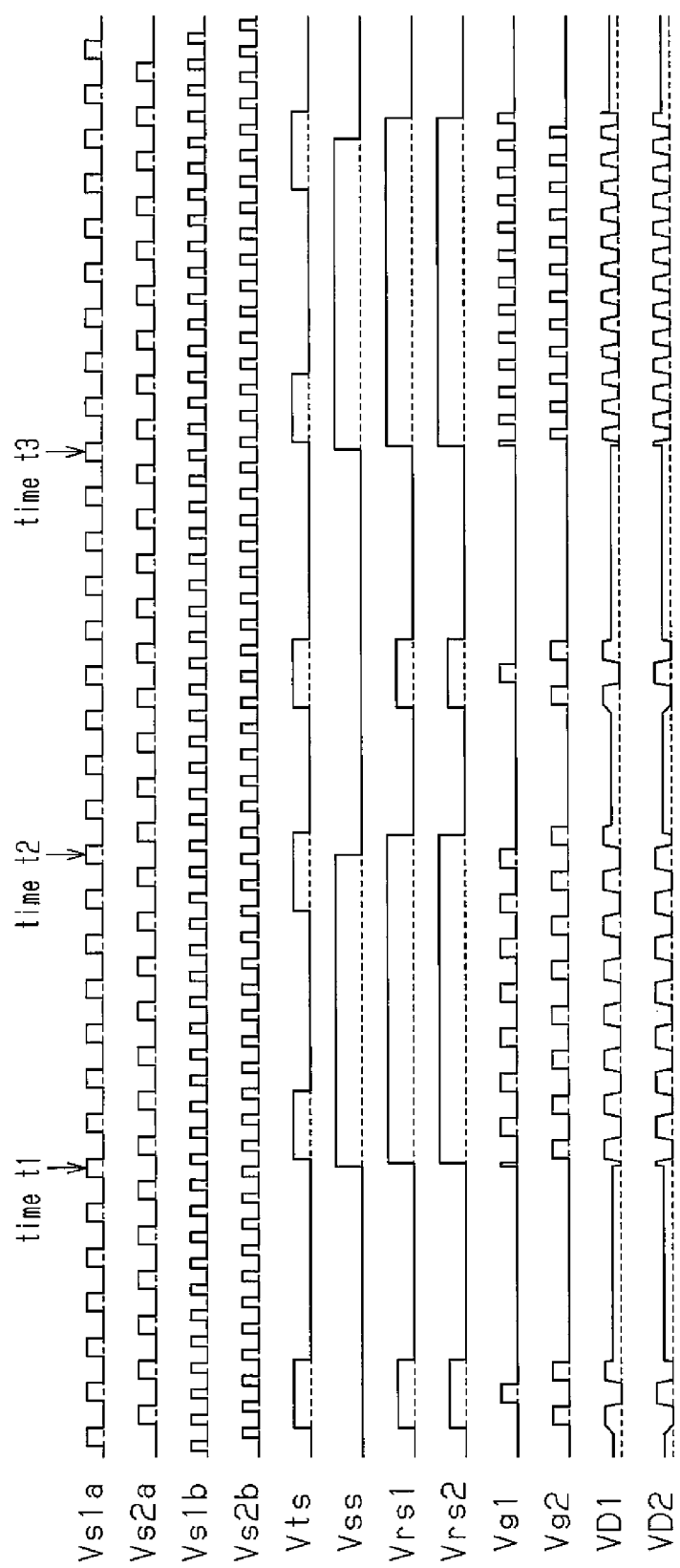
FIG. 17 is an output waveform chart of a high frequency inverter circuit of the third embodiment.

(B) Contrary to this, when the first switching signal SW1 is of the low level and the first and second output signals Vrs1, Vrs2 respectively having a same logic values as the logic value of the inverter control signal Vss from the first and second OR circuits 23, 24 are respectively received at the first and second AND circuits 21, 22, as shown in FIG. 17, the first and second AND circuits 21, 22 sends the first and second on/off signals Vg1, Vg2 having a same logic values as the logic values of the high frequency first and second excitation synchronizing signals Vs1b, Vs2b to the gates of the first and second power transistors Q1, Q2.

That is, in this case also, due to the waveforms of the high frequency first excitation synchronizing signal Vs1b and the high frequency second excitation synchronizing signal Vs2b having an inverted relationship to each other, similar to the previous embodiment, the first power transistor Q1 and the second power transistor Q2 alternately turn on and off continuously and at a high speed. Further, by these first power transistor Q1 and second power transistor Q2 turning on and off alternately, the primary coil L1 is driven to be excited continuously at a high frequency.

Incidentally, (C) when the first switching signal SW1 is of the high level and the first and second output signals Vrs1, Vrs2, which respectively have a same logic values as the logic value of the intermittent high signal Vst, from the first and second OR circuits 23, 24 are received at the first and second AND circuits 21, 22, as shown in FIG. 17, the first and second AND circuits 21, 22 respectively send the first and second on/off signals Vg1, Vg2, which respectively have a same logic value as the logic values of the low frequency first and second excitation synchronizing signals Vs1a, Vs2a, to the gates of the first and second power transistors Q1, Q2.

That is, during when the intermittent high signal Vst is being sent, the first power transistor Q1 and the second power transistor Q2 intermittently turn on and off alternately in response to the low frequency first excitation synchronizing signal Vs1a and the low frequency second excitation synchronizing signal Vs2a. Further, as these first power transistor Q1 and second power transistor Q2 turn on and off intermittently, the primary coil L1 is driven to be excited intermittently.

(D) To the contrary, when the first switching signal SW1 is of the low level and the first and second AND circuits 21, 22 receives the first and second output signals Vrs1, Vrs2 respectively, which have a same logic values as the logic value of the inverter control signal Vss, from the first and second OR circuits 23, 24, as shown in FIG. 17, the first and second AND circuits 21, 22 respectively sends the first and second on/off signals Vg1, Vg2, which have a same logic values as the logic values of the high frequency first and second excitation synchronizing signals Vs1b, Vs2b, to the gates of the first and second power transistors Q1, Q2.

That is, in this case also, due to the waveforms of the high frequency first excitation synchronizing signal Vs1b and the high frequency second excitation synchronizing signal Vs2b having the inverted relationship to each other, the first power transistor Q1 and the second power transistor Q2 alternately turn on and off intermittently and at a high speed during when the intermittent high signal Vst is being sent. Further, by these first power transistor Q1 and second power transistor Q2 intermittently turning on and off alternately, the primary coil L1 is driven to be excited intermittently at a high frequency.

The power supply apparatus 1 configured as above is effective in a case where a mounted device E requests excitation at two different frequencies depending on the states. In this case, when the device side transceiver circuit 9 generates and sends the excitation request signal RQ, the device E sends a classification signal regarding whether a power supply by low frequency excitation of the secondary coil L2 is requested or a power supply by high frequency excitation of the secondary coil L2 is requested, in addition to the excitation request signal RQ.

For example, if the device E has a sleep function, when the sleep state in which a load Z is not driven is assumed from a state of driving the load Z by receiving the power supply, a power consumption reduction becomes possible by changing the primary coil L1 from the high frequency excitation drive to the low frequency excitation drive.

Further, by changing the primary coil L1 from the high frequency excitation drive to the low frequency excitation drive when the device E is almost fully charged, such as in a charger, a yet more efficient control becomes possible.

Of course, the device E may send a classification signal that requests constant excitation at one of the frequencies.

Further, when the excitation request signal RQ and the classification signal are received at the excitation request receiver circuit 11, the excitation control circuit 14 sends those excitation request signal RQ and classification signal to the system control section 8. The system control section 8 sends the high level first switching signal SW1 to the first and second switching circuits 41, 42 provided in the oscillator circuit 16 of the high frequency inverter circuit 15 in the case where the mounted device E is requesting the low frequency excitation based on the classification signal.

Due to this, the low frequency first excitation synchronizing signal Vs1a is received at the first AND circuit 21, and the low frequency second excitation synchronizing signal Vs2a is received at the second AND circuit 22. As a result, the primary coil L1 is intermittently excited or continuously excited based on the low frequency first and second excitation synchronizing signals Vs1a, Vs2a of the low frequency. Further, the low frequency according to the request of the mounted device E is excited in the primary coil L1.

On the other hand, in the case where the mounted device E is requesting the high frequency excitation, the system control section 8 sends the low level first switching signal SW1 to the first and second switching circuits 41, 42. Due to this, the high frequency first excitation synchronizing signal Vs1b is received at the first AND circuit 21, and the high frequency second excitation synchronizing signal Vs2b is received at the second AND circuit 22. As a result, the primary coil L1 is intermittently excited or continuously excited based on the high frequency first and second excitation synchronizing signals Vs1b, Vs2b of the high frequency. Further, the high frequency according to the request of the mounted device E is excited in the primary coil L1.

Further, similar to the first embodiment, in the intermittent excitation in which the device E is not mounted, the high level first switching signal SW1 is sent to the first and second switching circuits 41, 42. Due to this, upon the intermittent excitation, the reduction of power consumption can be achieved by performing the excitation operation at the low frequency.

Next, operations of the power supply apparatus 1 configured as above will be described with reference to FIG. 17.

Now, at time t1, when the device E is mounted, and the excitation request signal RQ, the device identification signal ID, and the classification signal requesting excitation at the low frequency are sent from this device E, the system control section 8 immediately sends the high level first switching signal SW1, the first switching circuit 41 sets a state of selecting the low frequency first excitation synchronizing signal Vs1a, and the second switching circuit 42 sets a state of selecting the low frequency second excitation synchronizing signal Vs2a. Then, the primary coil L1 is continuously excited by the first and second power transistors Q1, Q2 being turned on and off alternately by the low frequency first and second excitation synchronizing signals Vs1a, Vs2a.

Accordingly, power is supplied to the mounted device E by the continuous excitation at the low frequency.

Then, at time t2, when the device E is taken off, the excitation request signal RQ, the device identification signal ID, and the classification signal requesting excitation at the low frequency from the device E are eliminated. The system control section 8 immediately shifts to the intermittent excitation, similar to the first embodiment.

At this occasion, the system control section 8 keeps sending the high level first switching signal SW1. Due to this, the first switching circuit 41 maintains the state of selecting the low frequency first excitation synchronizing signal Vs1a, and the second switching circuit 42 maintains the state of selecting the low frequency second excitation synchronizing signal Vs2a. Further, during when the intermittent high signal Vst is being sent, the primary coil L1 is intermittently excited by the first and second power transistors Q1, Q2 being turned on and off alternately by the low frequency first and second excitation synchronizing signals Vs1a, Vs2a.

Then, at time t3, when a new device E is mounted, and the excitation request signal RQ, the device identification signal ID, and the classification signal requesting excitation at the high frequency are sent from this device E, the system control section 8 immediately sends the low level first switching signal SW1. Due to this, the first switching circuit 41 sets a state of selecting the high frequency first excitation synchronizing signal Vs1b, and the second switching circuit 42 sets a state of selecting the high frequency second excitation synchronizing signal Vs2b. Then, the primary coil L1 is continuously excited by the first and second power transistors Q1, Q2 being turned on and off alternately by the high frequency first and second excitation synchronizing signals Vs1b, Vs2b.

Accordingly, power is supplied to the mounted device E by the continuous excitation at the high frequency.

Accordingly, in addition to the effects of the first embodiment, the present embodiment is capable of the excitation operation at the low frequency during the intermittent excitation where no device E is mounted, and the reduction of the power consumption can be achieved.

Further, the present embodiment is capable of power supply at two different types of frequency excitations according to the states of the mounted devices E, so a highly accurate and highly efficient control can be performed.

(Fourth Embodiment)

Next, the fourth embodiment will be described with reference to FIG. 18.

In the power supply apparatus 1 of the first embodiment, the first excitation synchronizing signal Vs1 and the second excitation synchronizing signal Vs2 were respectively logic signals that are sent consecutively. The present embodiment is characterized in having an excitation synchronizing signal that is sent when it is necessary.

Note that, for the sake of description, parts that are common between the present embodiment and the first embodiment will be given the same reference signs as the first embodiment, and detailed descriptions thereof will be omitted.

Figure 18:
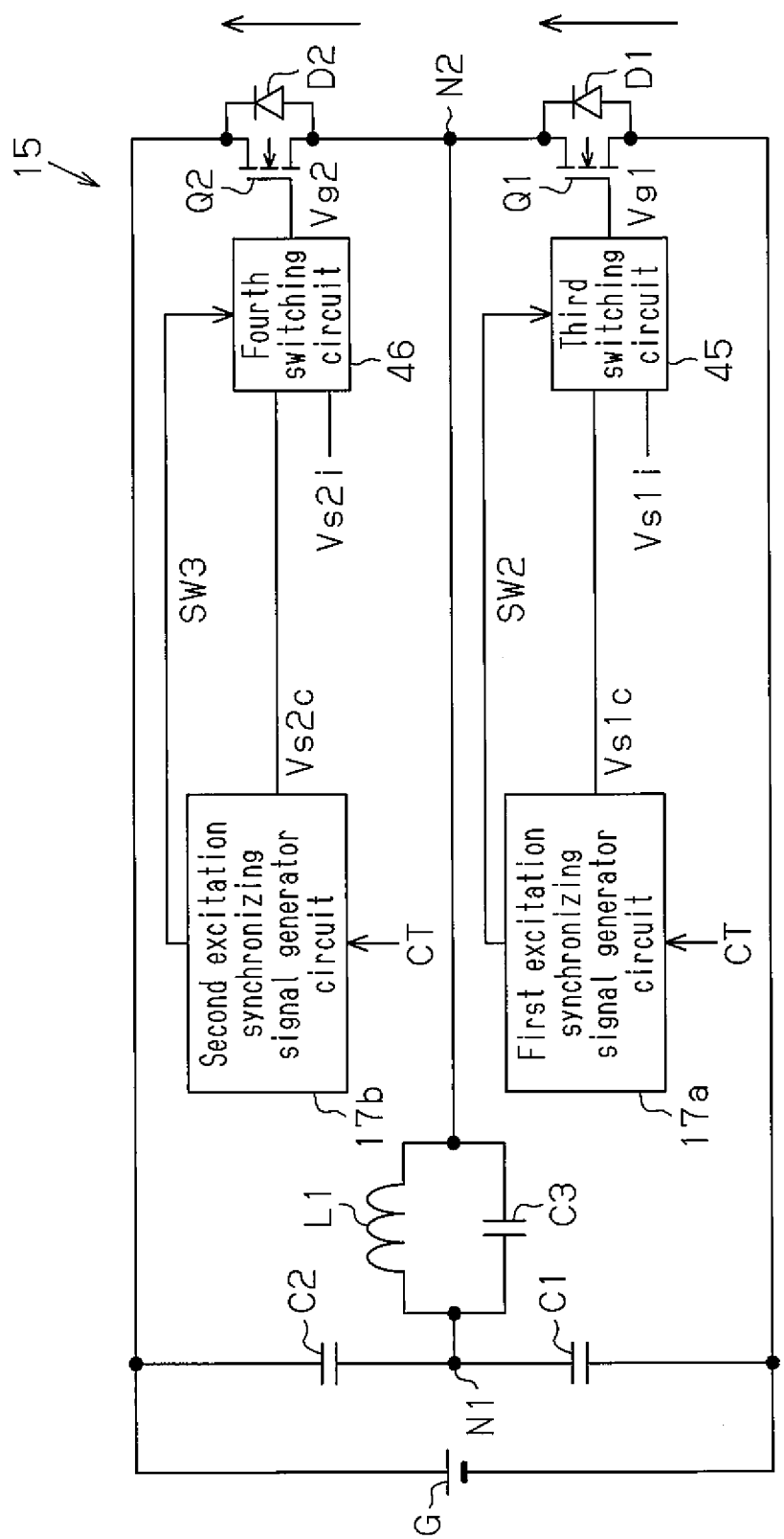
FIG. 18 is a high frequency inverter circuit of a power supply module of the fourth embodiment.

FIG. 18 shows an electric circuit showing a high frequency inverter circuit 15 of respective power supply module M.

In FIG. 18, a third switching circuit 45 is connected to a gate terminal of a first power transistor Q1, and a fourth switching circuit 46 is connected to a second power transistor Q2.

An intermittent first excitation synchronizing signal Vs1i from a system control section 8, and a continuous first excitation synchronizing signal Vs1c from a first excitation synchronizing signal generator circuit 17a are received at the third switching circuit 45. The third switching circuit 45 selects one of the intermittent first excitation synchronizing signal Vs1i and the continuous first excitation synchronizing signal Vs1c, and sends a first on/off signal Vg1 having a same logic value as the logic value of the selected signal to the gate terminal of the first power transistor Q1. An intermittent second excitation synchronizing signal Vs2i from the system control section 8 and a continuous second excitation synchronizing signal Vs2c from a second excitation synchronizing signal generator circuit 17b are received at the fourth switching circuit 46. The fourth switching circuit 46 selects one of the intermittent second excitation synchronizing signal Vs2i and the continuous second excitation synchronizing signal Vs2c, and sends a second on/off signal Vg2 having a same logic value as the logic value of the selected signal to the gate terminal of the second power transistor Q2.

As shown in FIG. 19, the third switching circuit 45 includes a fifth transmission gate 45a and a sixth transmission gate 45b. Further, an output terminal of the fifth transmission gate 45a is connected to the gate terminal of the first power transistor Q1, and the intermittent first excitation synchronizing signal Vs1i from the system control section 8 is received at an input terminal of the fifth transmission gate 45a. An output terminal of the sixth transmission gate 45b is connected to the gate terminal of the first power transistor Q1, and the continuous first excitation synchronizing signal Vs1c from the first excitation synchronizing signal generator circuit 17a is received at an input terminal of the sixth transmission gate 45b.

The fifth transmission gate 45a includes an N-channel MOS transistor Q11 and a P-channel MOS transistor Q12 that are connected in parallel to each other. Further, a second switching signal SW2 is received at a gate terminal of the N-channel MOS transistor Q11, and the second switching signal SW2 is received at a gate terminal of the P-channel MOS transistor Q12 via a second inverter circuit 47.

Accordingly, when a high level second switching signal SW2 is received at the fifth transmission gate 45a, the fifth transmission gate 45a sends the intermittent first excitation synchronizing signal Vs1i from the system control section 8 to the gate terminal of the first power transistor Q1.

To the contrary, when the low level second switching signal SW2 is received at the fifth transmission gate 45a, the fifth transmission gate 45a does not send the intermittent first excitation synchronizing signal Vs1i from the system control section 8 to the gate terminal of the first power transistor Q1.

On the other hand, the sixth transmission gate 45b includes an N-channel MOS transistor Q13 and a P-channel MOS transistor Q14 that are connected in parallel to each other. Further, the second switching signal SW2 is received at a gate terminal of the N-channel MOS transistor Q13 via the second inverter circuit 47, and the second switching signal SW2 is received at the gate terminal of the P-channel MOS transistor Q14.

Accordingly, when the low level second switching signal SW2 is received at the sixth transmission gate 45b, the sixth transmission gate 45b sends the continuous first excitation synchronizing signal Vs1c from the first excitation synchronizing signal generator circuit 17a to the gate terminal of the first power transistor Q1.

To the contrary, when the high level second switching signal SW2 is received at the sixth transmission gate 45b, the sixth transmission gate 45b does not send the continuous first excitation synchronizing signal Vs1c from the first excitation synchronizing signal generator circuit 17a to the gate terminal of the first power transistor Q1.

That is, when the high level second switching signal SW2 is received at the third switching circuit 45, the third switching circuit 45 sends a first on/off signal Vg1, which has a same logic value as the logic value of the intermittent first excitation synchronizing signal Vs1i, to the gate terminal of the first power transistor Q1. To the contrary, when the low level second switching signal SW2 is received at the third switching circuit 45, the third switching circuit 45 sends a first on/off signal Vg1, which has a same logic value as the logic value of the continuous first excitation synchronizing signal Vs1c, to the gate terminal of the first power transistor Q1.

The fourth switching circuit 46 includes a seventh transmission gate 46a and an eighth transmission gate 46b. Further, an output terminal of the seventh transmission gate 46a is connected to the gate terminal of the second power transistor Q2, and the intermittent second excitation synchronizing signal Vs2i from the system control section 8 is received at an input terminal of the seventh transmission gate 46a. An output terminal of the eighth transmission gate 46b is connected to the gate terminal of the second power transistor Q2, and the continuous second excitation synchronizing signal Vs2c from the second excitation synchronizing signal generator circuit 17b is received at an input terminal of the eighth transmission gate 46b.

The seventh transmission gate 46a includes an N-channel MOS transistor Q15 and a P-channel MOS transistor Q16 that are connected in parallel to each other. Further, a third switching signal SW3 is received at a gate terminal of the N-channel MOS transistor Q15, and the third switching signal SW3 is received at a gate terminal of the P-channel MOS transistor Q16 via a third inverter circuit 48.

Accordingly, when the high level third switching signal SW3 is received at the seventh transmission gate 46a, the seventh transmission gate 46a sends an intermittent second excitation synchronizing signal Vs2i from the system control section 8 to the gate terminal of the second power transistor Q2.

To the contrary, when the low level third switching signal SW3 is received at the seventh transmission gate 46a, the seventh transmission gate 46a does not send the intermittent second excitation synchronizing signal Vs2i from the system control section 8 to the gate terminal of the second power transistor Q2.

On the other hand, the eighth transmission gate 46b includes an N-channel MOS transistor Q17 and a P-channel MOS transistor Q18 that are connected in parallel to each other. Further, the third switching signal SW3 is received at a gate terminal of the N-channel MOS transistor Q17 via the third inverter circuit 48, and the third switching signal SW3 is received at a gate terminal of the P-channel MOS transistor Q18.

Accordingly, when the low level third switching signal SW3 is received at the eighth transmission gate 46b, the eighth transmission gate 46b sends the continuous second excitation synchronizing signal Vs2c from the second excitation synchronizing signal generator circuit 17b to the gate terminal of the second power transistor Q2.

To the contrary, when the high level third switching signal SW3 is received at the eighth transmission gate 46b, the eighth transmission gate 46b does not send the continuous second excitation synchronizing signal Vs2c from the second excitation synchronizing signal generator circuit 17b to the gate terminal of the second power transistor Q2.

That is, when the high level third switching signal SW3 is received at the fourth switching circuit 46, the fourth switching circuit 46 sends a second on/off signal Vg2 having a same logic value as the logic value of the intermittent second excitation synchronizing signal Vs2i to the gate terminal of the second power transistor Q2. To the contrary, when the low level third switching signal SW3 is received at the fourth switching circuit 46, the fourth switching circuit 46 sends the second on/off signal Vg2 having a same logic value as the logic value of the continuous second excitation synchronizing signal Vs2c to the gate terminal of the second power transistor Q2.

A drive control signal CT from the excitation control circuit 14 is received at the first excitation synchronizing signal generator circuit 17a in response to an enable signal EN from the system control section 8.

Figure 20:
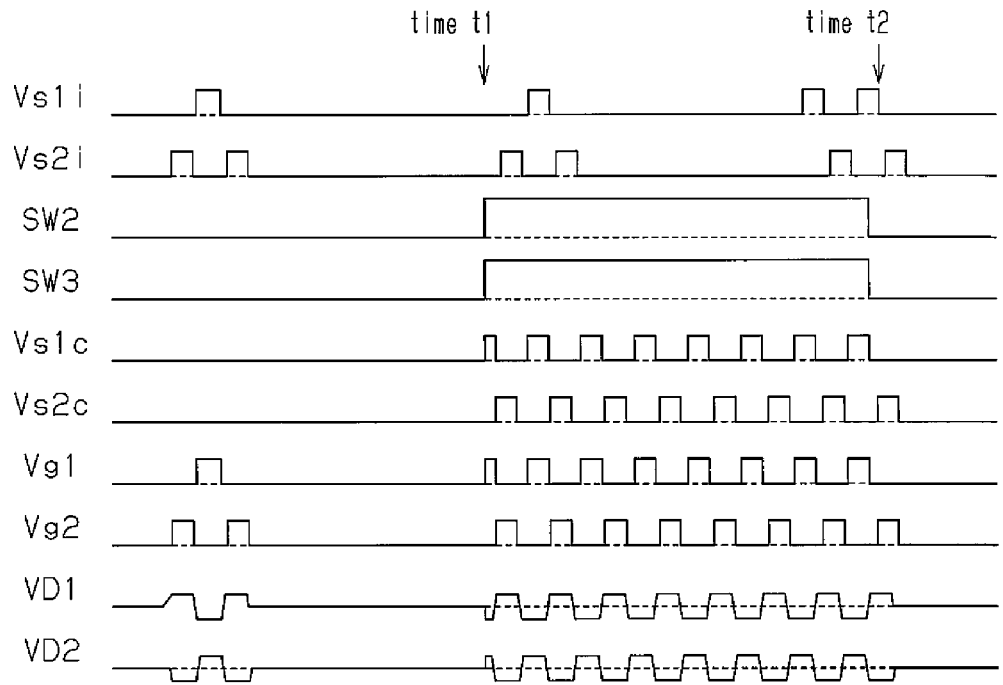
FIG. 20 is an output waveform chart of a high frequency inverter circuit of the fourth embodiment.

As shown in FIG. 20, the first excitation synchronizing signal generator circuit 17a sends the low level second switching signal SW2 and the continuous first excitation synchronizing signal Vs1c to the third switching circuit 45 in response to the drive control signal CT. Accordingly, when the enable signal EN is sent, the third switching circuit 45 sends the continuous first excitation synchronizing signal Vs1c to the first power transistor Q1. Incidentally, when the enable signal EN is not being sent, the third switching circuit 45 sends the intermittent first excitation synchronizing signal Vs1i to the first power transistor Q1.

On the other hand, a drive control signal CT from the excitation control circuit 14 is received at the second excitation synchronizing signal generator circuit 17b in response to the enable signal EN from the system control section 8.

As shown in FIG. 20, the second excitation synchronizing signal generator circuit 17b sends the low level third switching signal SW3 and the continuous second excitation synchronizing signal Vs2c to the fourth switching circuit 46 in response to the drive control signal CT. Accordingly, when the enable signal EN is sent, the fourth switching circuit 46 sends the continuous second excitation synchronizing signal Vs2c to the second power transistor Q2. Incidentally, when the enable signal EN is not being sent, the fourth switching circuit 46 sends the intermittent second excitation synchronizing signal Vs2i to the first power transistor Q1.

Here, the intermittent first and second excitation synchronizing signals Vs1i, Vs2i and the continuous first and second excitation synchronizing signals Vs1c, Vs2c will be described.

Firstly, the intermittent first excitation synchronizing signal Vs1i and the intermittent second excitation synchronizing signal Vs2i are made corresponding respectively to the first on/off signal Vg1 and the second on/off signal Vg2 during the intermittent excitation in the first embodiment. That is, the waveform of the intermittent first excitation synchronizing signal Vs1i is the same as the waveform of the first excitation synchronizing signal Vs1 having a same logic value as the logic value of the first on/off signal Vg1 that is sent during when the intermittent high signal Vst is being sent. Further, the waveform of the intermittent second excitation synchronizing signal Vs2i is the same as the waveform of the second excitation synchronizing signal Vs2 having a same logic value as the logic value of the second on/off signal Vg2 that is sent during when the intermittent high signal Vst is being sent.

Next, the continuous first excitation synchronizing signal Vs1c and the continuous second excitation synchronizing signal Vs2c are made corresponding respectively to the first on/off signal Vg1 and the second on/off signal Vg2 during the continuous excitation in the first embodiment. That is, the waveform of the continuous first excitation synchronizing signal Vs1c is the same as the waveform of the first excitation synchronizing signal Vs1 having a same logic value as the logic value of the first on/off signal Vg1 that is sent during when the high level inverter control signal Vss is being sent. Further, the waveform of the continuous second excitation synchronizing signal Vs2c is the same as the waveform of the second excitation synchronizing signal Vs2 having a same logic value as the logic value of the second on/off signal Vg2 that is sent during when the high level inverter control signal Vss is being sent.

Accordingly, the present embodiment can perform synchronized intermittent excitation similar to the first embodiment. Further, when a device E is mounted, the present embodiment can perform synchronized continuous excitation on the corresponding primary coil L1.

Notably, in regards to this intermittent excitation, not all of the primary coils need to be intermittently excited in synchronization with each other; only respective primary coils in a group, which is grouped by several primary coils, may be in synchronized excitation, and the excitation may be performed in a time sharing manner in units of this group.

(Fifth Embodiment)

Next, the fifth embodiment will be described with reference to FIG. 21.

In the power supply apparatus 1 of the above fourth embodiment, the continuous first and second excitation synchronizing signals Vs1c, Vs2c were generated respectively at the first and second excitation synchronizing signal generator circuits 17a, 17b of the power supply apparatus 1. The present embodiment is characterized in that continuous first and second excitation synchronizing signals Vs1c, Vs2c are generated at first and second excitation synchronizing signal generator circuits 17a, 17b in response to a signal from a device E.

Note that, for the sake of description, parts that are common between the present embodiment and the fourth embodiment will be given the same reference signs as the fourth embodiment, and detailed descriptions thereof will be omitted.

Figure 21:
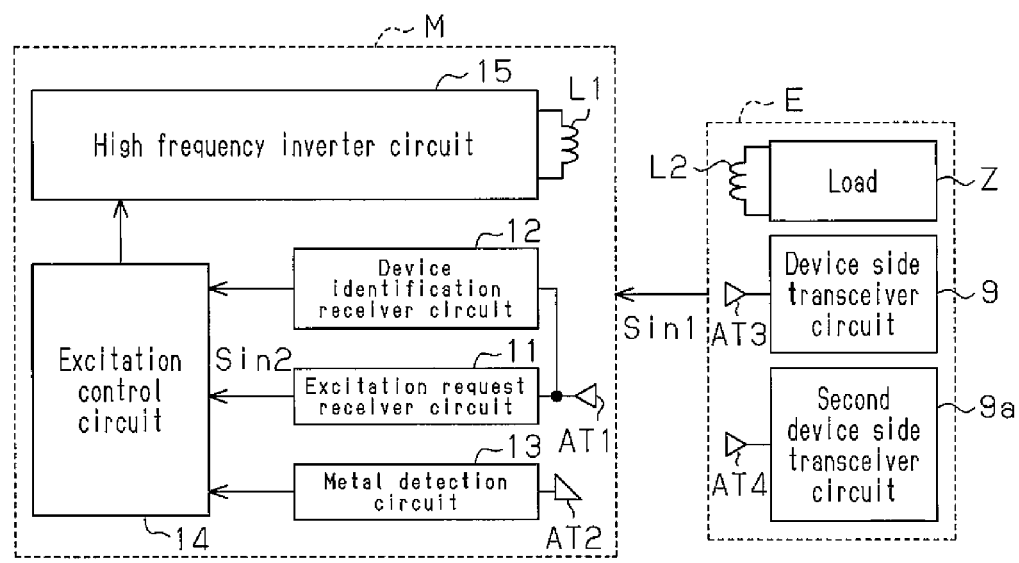
FIG. 21 is an electrical block circuitry diagram of a power supply module of the fifth embodiment.

FIG. 21 shows an electrical circuitry diagram of each power supply module M of the fifth embodiment.

Figure 22:
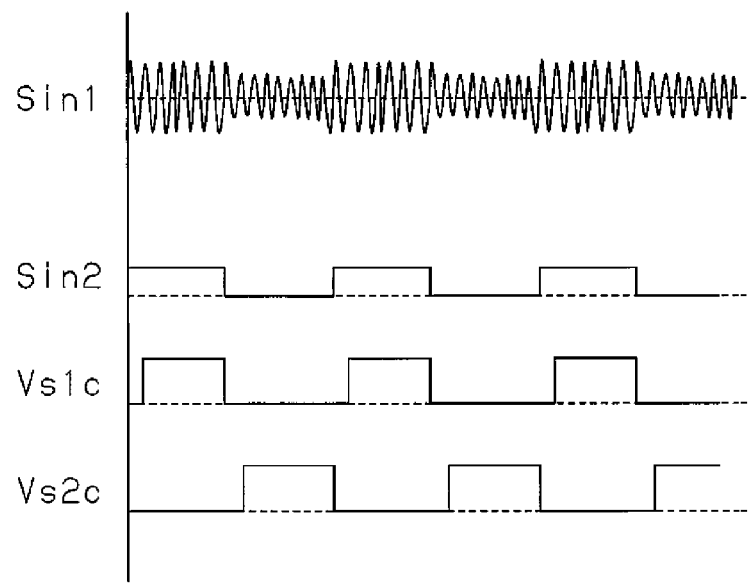
FIG. 22 is an output waveform chart of respective signals of the fifth embodiment.

The device E includes, in addition to a device side transceiver circuit 9, a second device side transceiver circuit 9a. The second device side transceiver circuit 9a generates an amplitude-modulated modulation signal Sin1 that determines an excitation cycle by which its secondary coil L2 is excited for power supply, and sends the generated modulation signal Sin1 to the power supply module M positioned directly below via an antenna AT4. As shown in FIG. 22, the modulation signal Sin1 has a large amplitude value and a small amplitude value that are repeated at a predetermined periods.

An excitation request receiver circuit 11 of the power supply module M receives the modulation signal Sin1 from the second device side transceiver circuit 9a. The excitation request receiver circuit 11 detects and demodulates the modulation signal Sin1. As shown in FIG. 22, the excitation request receiver circuit 11 performs waveform shaping on the modulation signal Sin1 to convert to a high level logic signal Sin2 during a period when an amplitude value is large, and performs waveform shaping on the modulation signal Sin1 to convert to a low level logic signal Sin2 during a period when the amplitude value is small. Further, the excitation request receiver circuit 11 sends the logic signal Sin2 to the excitation control circuit 14.

Then, the excitation control circuit 14 sends this logic signal Sin2 to the first and second excitation synchronizing signal generator circuits 17a, 17b provided in the high frequency inverter circuit 15 of the fourth embodiment as shown in FIG. 18.

The first excitation synchronizing signal generator circuit 17a generates a continuous first excitation synchronizing signal Vs1c as shown in FIG. 22 based on the logic signal Sin2. To describe in more detail, the continuous first excitation synchronizing signal Vs1c rises to a high level after when the logic signal Sin2 rises to the high level, and falls to a low level before the logic signal Sin2 falls to the low level.

On the other hand, the second excitation synchronizing signal generator circuit 17b generates a continuous second excitation synchronizing signal Vs2c as shown in FIG. 22 based on the logic signal Sin2. To describe in more detail, the continuous second excitation synchronizing signal Vs2c rises to the high level after when the logic signal Sin2 falls to the low level, and falls to the low level before the logic signal Sin2 rises to the high level.

Accordingly, the continuous first excitation synchronizing signal Vs1c and the continuous second excitation synchronizing signal Vs2c both are set with a dead time td during which both of these signals are at the low level.

Accordingly, in the present embodiment, since the power supply by excitation is performed at an excitation frequency as requested by the device E, a highly accurate and highly efficient power supply control in accordance with the device E becomes possible.

Figure 23:
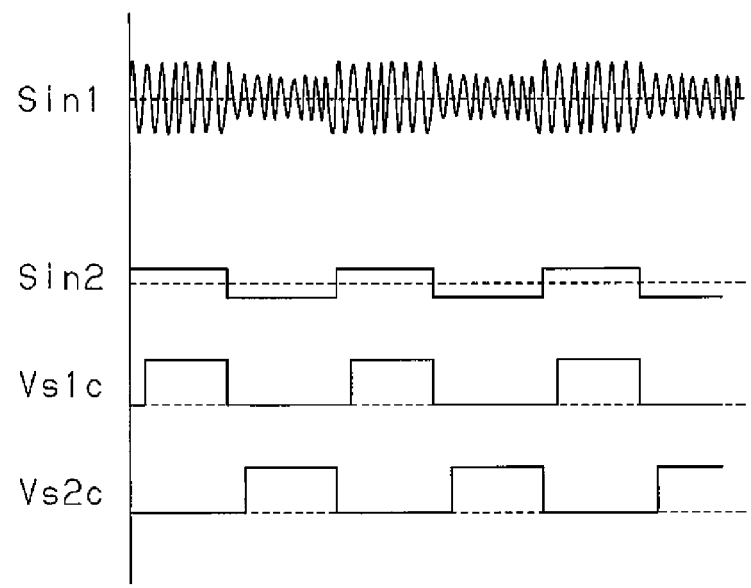
FIG. 23 is an output waveform chart of respective signals for explaining another example of the fifth embodiment.

Note that, in the present embodiment, the excitation request receiver circuit 11 generated the logic signal Sin2 by detecting and demodulating the modulation signal Sin1. In an alternative embodiment, as shown in FIG. 23, the excitation request receiver circuit 11 may perform waveform shaping on a modulation signal Sin1 to convert to a logic signal Sin2 with a positive potential during a period when the amplitude value is large, and may perform waveform shaping to convert to a logic signal Sin2 with a negative potential during a period when the amplitude value is small. Further, the continuous first excitation synchronizing signal Vs1c and the continuous second excitation synchronizing signal Vs2c may be generated based on this logic signal Sin2.

(Sixth Embodiment)

Next, the sixth embodiment will be described with reference to FIG. 24.

In the first embodiment, an excitation request signal RQ from a device E is received at a signal receiver antenna AT1 of a power supply module M, and the received excitation request signal RQ is sent to an excitation request receiver circuit 11. The present embodiment is characterized in that the excitation request signal RQ from the device E is received at a primary coil L1 of the power supply module M.

Note that, for the sake of description, parts that are common between the present embodiment and the first embodiment will be given the same reference signs as the first embodiment, and detailed descriptions thereof will be omitted.

Figure 24:
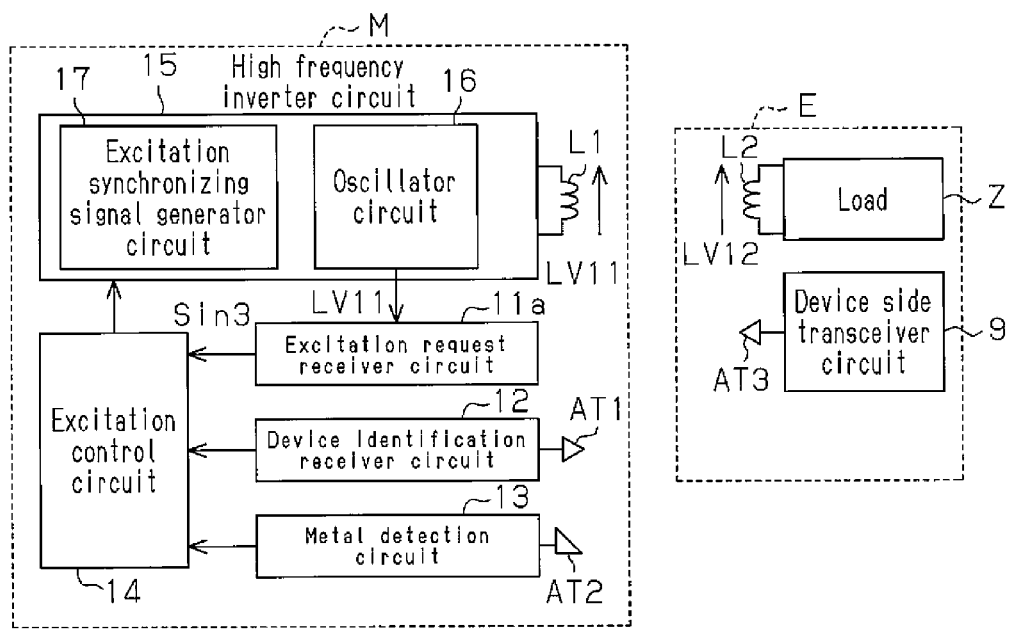
FIG. 24 is an electrical block circuit of a power supply module and a device of the sixth embodiment.

FIG. 24 shows an electrical circuitry diagram of the power supply module M and the device E of the sixth embodiment.

In FIG. 24, a load Z of the device E sends a device side excitation request modulated signal VL12 to the primary coil L1 via a secondary coil L2.

Figure 25:
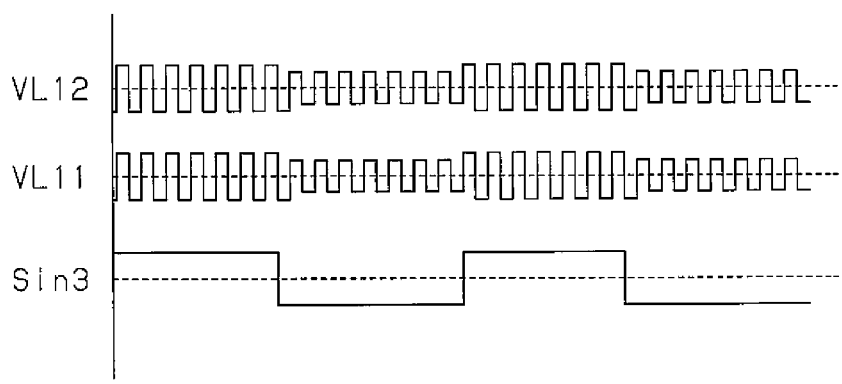
FIG. 25 is an output waveform chart of respective signals for explaining an operation of the sixth embodiment.

As shown in FIG. 25, the device side excitation request modulated signal VL12 is generated by performing an amplitude modulation on a voltage waveform or a current waveform generated at the secondary coil L2 based on the continuous excitation of the primary coil L1 by the load Z of the device E using an excitation request signal. The load Z of the device E performs the modulation. Further, in present embodiment, as shown in FIG. 25, the device side excitation request modulated signal VL12 has a large amplitude value and a small amplitude value that are alternately repeated at a predetermined periods.

Note that, a device identification signal ID is generated by a device side transceiver circuit 9, similar to the first embodiment.

The primary coil L1 of the power supply module M receives a power supply side excitation request modulated signal VL11 having a voltage level proportionate to a voltage level of the device side excitation request modulated signal VL12. Further, the received power supply side excitation request modulated signal VL11 is sent from the primary coil L1 to an excitation request receiver circuit 11a.

The excitation request receiver circuit 11a detects this power supply side excitation request modulated signal VL11. Due to this, as shown in FIG. 25, the excitation request receiver circuit 11a performs waveform shaping on the power supply side excitation request modulated signal VL11 to convert to a logic signal Sin3 with a positive potential during a period when the amplitude value is large, and performs waveform shaping on the power supply side excitation request modulated signal VL11 to convert to a logic signal Sin3 with a negative potential during a period when the amplitude value is small. Then, the excitation request receiver circuit 11a sends the logic signal Sin3 to an excitation control circuit 14. The excitation control circuit 14 sends this logic signal Sin3 to the excitation synchronizing signal generator circuit 17 shown in FIG. 4 provided in the high frequency inverter circuit 15 of the first embodiment.

Then, the excitation synchronizing signal generator circuit 17 sends an inverter control signal Vss, which has a same logic value as the logic value of this logic signal Sin3, to first and second OR circuits 23, 24 of an oscillator circuit 16.

Accordingly, the present embodiment is of continuous excitation, and the continuous excitation is not performed in the period with the logic signal Sin3 having the negative potential.

Accordingly, in the present embodiment, since the first and second excitation synchronizing signals Vs1, Vs2 are provided in the power supply apparatus 1, and a plurality of primary coils L1 is excited by being synchronous to each other in accordance with the device side excitation request modulated signal VL12 from the device E, circuitry of the device E can be simplified.

Further, in the present embodiment, since first and second power transistors Q1, Q2 of the oscillator circuit 16 of the high frequency inverter circuit 15 are turned on and off based on the device side excitation request modulated signal VL12 of the device E, control for oscillations at different frequencies and patterned oscillations in accordance with the device E is possible.

Further, in the present embodiment, since the device side excitation request modulated signal VL12 can be sent via a signal path that is independent of the device E, reliability of the device side excitation request modulated signal VL12 can be increased.

Yet further, in the present embodiment, since the primary coil L1 and the secondary coil L2 for electrically transmitting the device side excitation request modulated signal VL12 from the device E can be served by one component, a circuitry configuration for power transmission can be simplified.

(Seventh Embodiment)

Next, the seventh embodiment will be described with reference to FIG. 26.

The present embodiment is characterized in that each power supply module M can send and receive information to and from a device E, and can supply microelectric power to the device E.

Note that, since the present embodiment is implemented in a power supply apparatus 1 including an object detection circuit 32 shown in FIG. 12 and described in the second embodiment, for the sake of description, characteristic parts will be described in detail, and parts that are common between the present embodiment and the second embodiment will be omitted.

Figure 26:
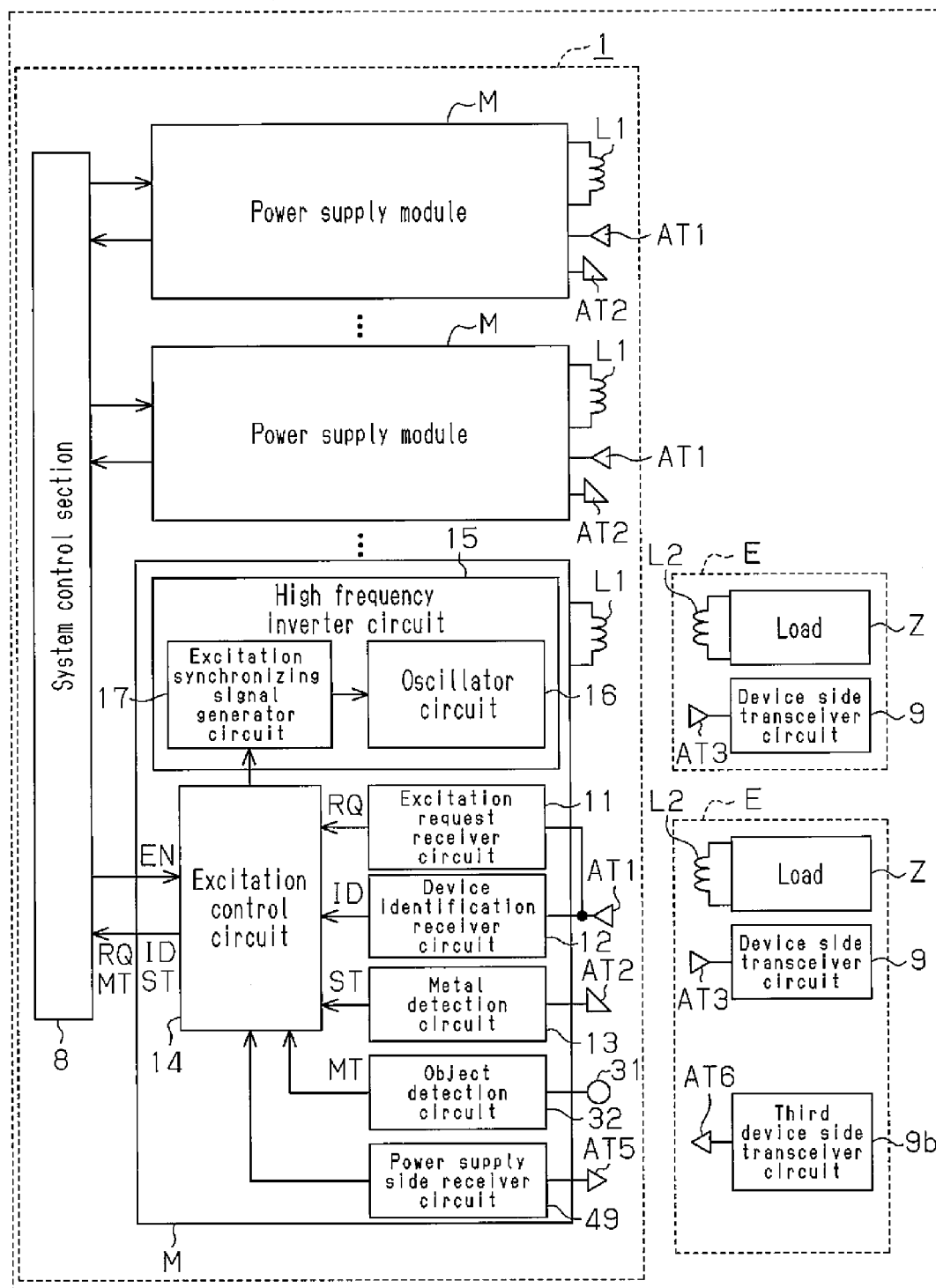
FIG. 26 is an electrical block circuit of a power supply modules and a device of the seventh embodiment.

FIG. 26 shows an electrical block circuit of the power supply modules M and the device E of the present embodiment.

In FIG. 26, a power supply side transceiver circuit 49 is added in each power supply module M. The power supply side transceiver circuit 49 sends various signals toward the mounted device E via a power supply side antenna AT5. Further, the power supply side transceiver circuit 49 receives various signals sent from the device E other than an excitation request signal RQ and a device identification signal ID via this power supply side antenna AT5. Further, the power supply side transceiver circuit 49 supplies microelectric power to the device E by exciting the power supply side antenna AT5.

In addition to the device side transceiver circuit 9, the device E includes a third device side transceiver circuit 9b. The third device side transceiver circuit 9b is connected to a device side antenna AT6, receives various signals sent from the power supply side transceiver circuit 49, and sends various signals toward the power supply module M that is directly below via this device side antenna AT6. Further, microelectric secondary power supplying force is generated at the third device side transceiver circuit 9b by the device side antenna AT6 by the power supply side antenna AT5 being excited for supplying the microelectric power.

Due to this, according to the present embodiment, a more detailed interactive data communication between the power supply apparatus 1 and the device E becomes possible. Further, since a microelectric power transmitting function to the device E is added, the microelectric power, which is at the necessity minimum for generating the device identification signal ID, the excitation request signal RQ, and other signals, can be supplied to the device E.

Further, when the device E does not have a power source, due to having a power supply side transceiving function that can perform microelectric power supply independently instead of intermittent excitation of the primary coil L1, thus a further reduction of power consumption is possible.

Note that, although the power supply side antenna AT5 and the device side antenna AT6 are used for sending and receiving signals and microelectric power supply, the power supply side antenna AT5 and the device side antenna AT6 may be substituted by the primary coil L1, the secondary coil L2, the signal receiver antenna AT1, and the transceiver antenna AT3 and the like.

Further, the device side transceiver circuit 9, which generates the excitation request signal RQ and the device identification signal ID, may serve also as the third device side transceiver circuit 9b newly provided in the device E.

(Eighth Embodiment)

Next, the eighth embodiment will be described with reference to FIG. 27.

The present embodiment is characterized in that each time when continuous excitation is performed over a predetermined certain amount of driving time, excitation of a primary coil L1 is stopped for a certain time that is sufficiently shorter than the predetermined certain driving time, instead of performing the continuous excitation during when a device E is mounted.

Note that, since the present embodiment is implemented in a power supply apparatus 1 shown in FIG. 3 and FIG. 4 and described in the first embodiment, for the sake of description, characteristic parts will be described in detail, and parts that are common between the present embodiment and the first embodiment will be omitted.

In a high frequency inverter circuit 15 of the present embodiment (see FIG. 4), a first transfer gate composed of a MOS transistor is connected between an output terminal of a first AND circuit 21 and a gate terminal of a first power transistor Q1. Further, a second transfer gate composed of a MOS transistor is connected between an output terminal of a second AND circuit 22 and a gate terminal of a second power transistor Q2.

Further, when a cutoff signal is received at the first and second transfer gates, first and second on/off signals Vg1, Vg2 (first and second excitation synchronizing signals Vs1, Vs2), which is sent from the first and second AND circuits 21, 22 to the first and second power transistors Q1, Q2, are cut off.

In the present embodiment, this cutoff signal is generated in a system control section 8. The system control section 8 counts an embedded timer from when an enable signal EN has been sent by the device E being mounted, and each time when a predetermined driving time ty elapses, the cutoff signal is sent for a predetermined stop time tz that is sufficiently short compared to the driving time ty. Accordingly, by the device E being mounted, during when the enable signal EN is being sent, the cutoff signal is sent only for the stop time tz each time the driving time ty elapses.

Figure 27:
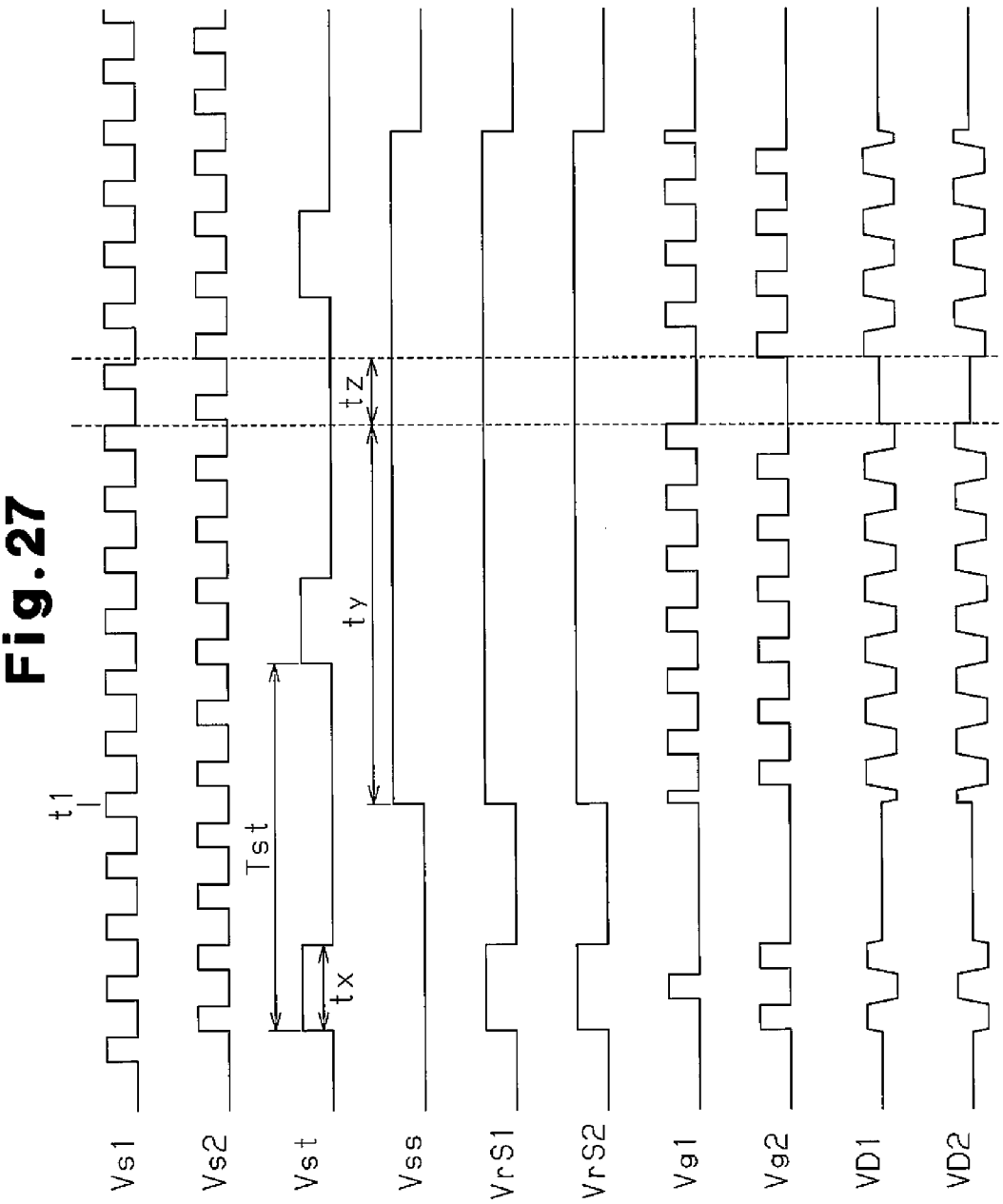
FIG. 27 is an output waveform chart of a high frequency inverter circuit of the eighth embodiment.

As shown in FIG. 27, in a case where the device E is mounted at time t1 and the continuous excitation is started, and when the driving time ty elapses from the time t1, the cutoff signal is sent only for the time tz, whereby the first and second on/off signals Vg1, Vg2, which are sent from the first and second AND circuits 21, 22 to the first and second power transistors Q1, Q2, are eliminated.

As a result, during the stop time tz, the first and second power transistors Q1, Q2 are not turned on and off, and the continuous excitation is stopped.

Note that, during this stop time tz, the first and second transfer gates are only cutting off the first and second on/off signals Vg1, Vg2 based on the cutoff signal. Due to this, similar to the first embodiment, the power supply apparatus 1 continuously performs the processing operation shown in FIG. 10.

Accordingly, in the present embodiment, since reception determination and signal transmission can be performed by the device identification signal ID and the excitation request signal RQ during the stop time tz when the continuous excitation of the primary coil L1 stops, power supply with an even a higher reliability can be obtained.

(Ninth Embodiment)

Next, the ninth embodiment will be explained with reference to FIG. 28.

The present embodiment is characterized in that a plurality of primary coils L1 provided in a power supply apparatus 1 is grouped into a plurality of sets, intermittent excitation is performed for each of the grouped sets, and an excitation pattern indicating an order of sets to be intermittently excited is changed as time elapses.

Figure 28:
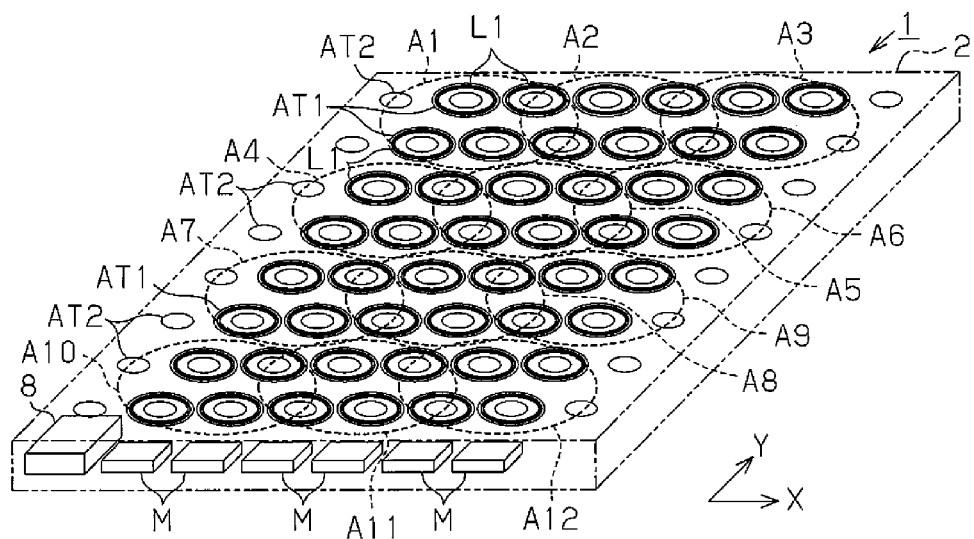
FIG. 28 is an explanatory diagram showing an arrangement condition of primary coils of a power supply apparatus of the ninth embodiment.

FIG. 28 shows an arrangement condition of the primary coils of the power supply apparatus 1 of the ninth embodiment.

As shown in FIG. 28 with broken lines, a mounting surface 6 is divided into three in an X direction, and four in a Y direction. Due to this, twelve pieces of first to twelfth divided areas A1 to A12 are defined. Further, in each of the first to twelfth divided areas A1 to A12, four pieces of primary coils L1 are included therein.

Furthermore, in the present embodiment, each of timings, at which the primary coils L1 are intermittently excited among the first to twelfth divided areas A1 to A12, differs.

For example, the primary coils L1 of the first to twelfth divided areas A1 to A12 are intermittently excited in an order of the primary coils L1 are intermittently excited from the first divided area A1, the second divided area A2, . . . , . . . , the eleventh divided area A11, and the twelfth divided area A12. Then, when the intermittent excitation of the twelfth divided area A12 ends, the intermittent excitation is performed again from the first divided area A1, and this order is repeated.

Further, an intermittent excitation timing pattern of the first to twelfth divided areas A1 to A12 is controlled by a system control section 8. That is, in the first embodiment, when a power switch is turned on, the system control section 8 sent a first excitation synchronizing signal Vs1, a second excitation synchronizing signal Vs2, and an intermittent high signal Vst simultaneously to power supply modules M of respective primary coils L1. In the present embodiment in regards to this, the system control section 8 sends the first excitation synchronizing signal Vs1, the second excitation synchronizing signal Vs2, and the intermittent high signal Vst at certain timings to the four pieces of primary coils L1 belonging to each of the first to second divided areas A1 to A12 in this order.

Further, when a certain period of time elapses, the system control section 8 changes the intermittent excitation timing pattern of the respective first to second divided areas A1 to A12 that had previously been used.

For example, the above described intermittent excitation pattern in the order of the first divided area A1, the second divided area A2, . . . , . . . , and the twelfth divided area A12 is changed to an opposite intermittent excitation pattern of the twelfth divided area A12, the eleventh divided area A11, . . . , . . . , the second divided area A2, and the first divided area A1. Here, the system control section 8 performs an intermittent excitation pattern that is different from the previously-performed intermittent excitation pattern each time when the predetermined time elapses.

Data of such different intermittent excitation patterns is prepared in the system control section 8. The system control section 8 changes the intermittent excitation pattern of the respective first to twelfth divided areas A1 to A12 by using the data of the intermittent excitation patterns.

Since the present embodiment intermittently excites the primary coils L1 when the device E is not mounted, or the primary coils L1 at positions other than where the device E is mounted during a standby state in a time sharing manner in units of the divided areas, standby time can be shortened, and the power consumption in the standby state can be reduced.

Further, since not all of the primary coils L1 are excited at one time at the same timing, a noise emitting level can be reduced.

(Tenth Embodiment)

Next, the tenth embodiment will be described with reference to FIG. 29 and FIG. 30.

The present embodiment is characterized in that a power supply apparatus 1 is arranged on at least one of floor, walls, and ceiling of a room so as not to be directly visible.

Figure 29:
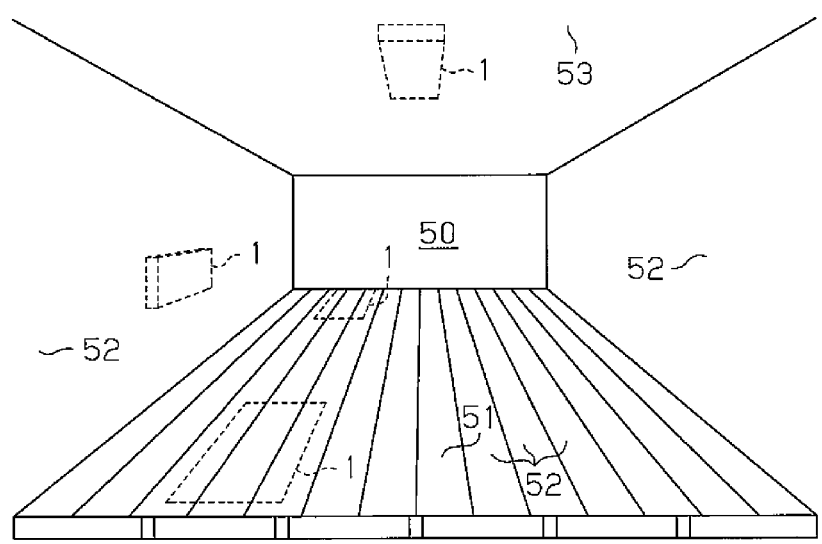
FIG. 29 is an explanatory diagram showing a room in which a power supply apparatus of the tenth embodiment is arranged.

As shown in FIG. 29, the power supply apparatuses 1 are arranged under the floor 51, inside the wall 52, and above the ceiling 53 of the room 50.

Figure 30:
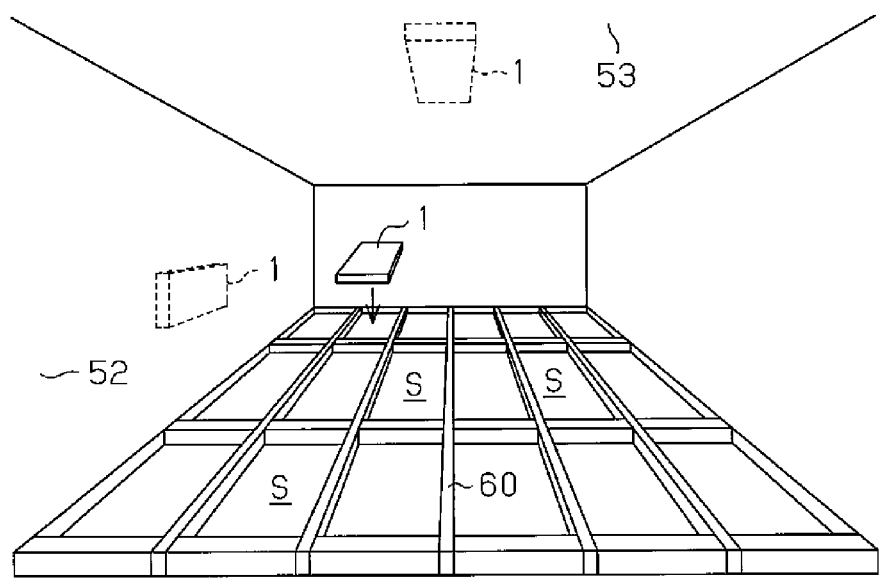
FIG. 30 is an explanatory diagram showing a power supply apparatus of the tenth embodiment housed under a floor.

As shown in FIG. 30, the power supply apparatuses 1 arranged under the floor 51 are configured to be placed under the floor 51, and are housed in spaces S surrounded by frame bodies 60 composed of lattice-shaped wooden frames. After the power supply apparatuses 1 are housed in the suitable spaces S, the power supply apparatuses 1 is arranged under the floor 51 where they are not visible because floorboards 52 are floored.

Similarly, the power supply apparatuses 1, which is arranged in the wall 52 and the ceiling 53, are respectively configured inside the wall 52 and above the ceiling 53, housed in spaces surrounded by lattice-shaped frames, and arranged in the wall 51 and above the ceiling 53 so as not to be visible.

Note that, the power supply apparatuses 1, which is arranged respectively under the floor 51, inside the wall 52, and above the ceiling 53, are connected to power receptacles and plugs of the power supply apparatuses, which are provided respectively under the floor 51, inside the wall 52, and above the ceiling 53.

Figure 31:
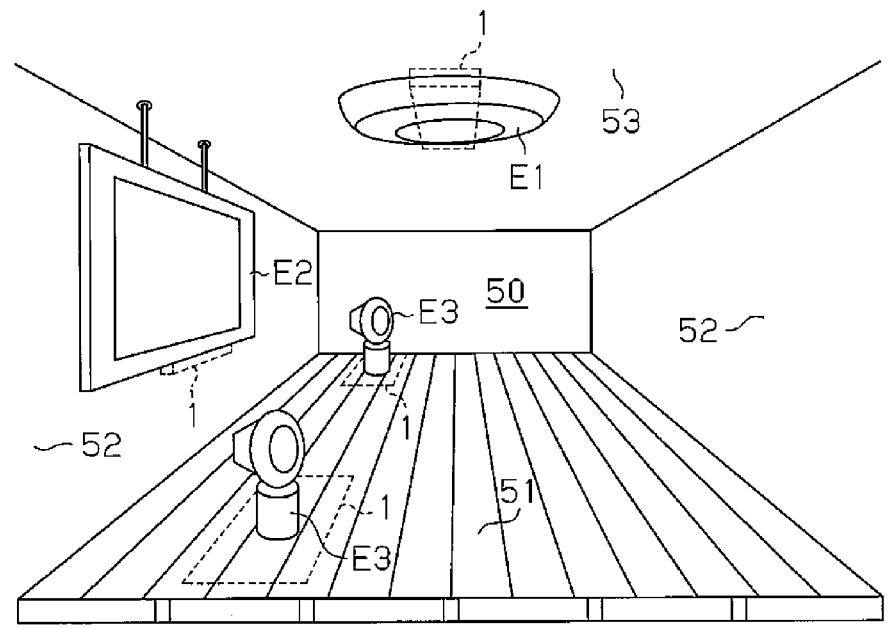
FIG. 31 is an explanatory diagram showing a room in which devices for receiving power supply of the tenth embodiment are arranged.

Further, as shown in FIG. 31, a lighting device E1 is arranged at a position opposing the power supply apparatus 1 provided above the ceiling 53. Further, the lighting device E1 is turned on by receiving contactless power supply from the power supply apparatus 1 provided above the ceiling 53.

Further, a TV device E2 is arranged at a position opposing the power supply apparatus 1 provided in the wall 52. Further, the TV device E2 displays television broadcast by receiving contactless power supply from the power supply apparatus 1 provided in the wall 52.

Yet further, speaker devices E3 are arranged at positions opposing the power supply apparatuses 1 provided under the floor 51. Further, the speaker devices E3 outputs music by receiving contactless power supply from the power supply apparatuses 1 provided under the floor 51.

Figure 32:
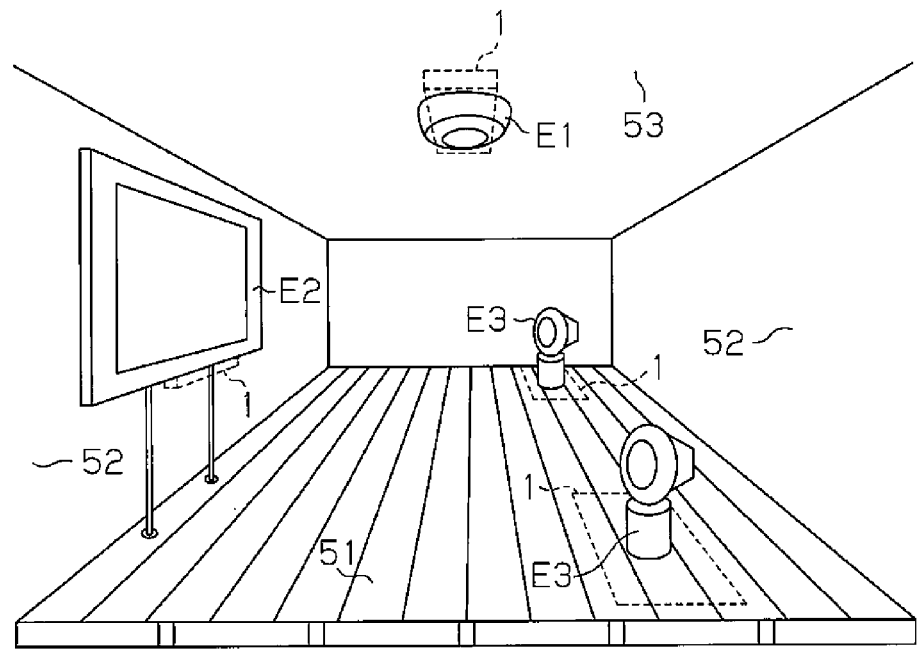
FIG. 32 is an explanatory diagram showing a room in which devices for receiving a power supply of the tenth embodiment are arranged with modification

Further, since the power supply apparatuses 1 can easily be attached to and detached from the spaces S surrounded by the frames 60, arrangements of the power supply apparatuses 1 can be changed. Accordingly, as shown in FIG. 32, layouts of the speaker devices E3 in the room 50 can freely be changed simply by suitably changing the arranged positions of the power supply apparatuses 1 provided under the floor 51 in accordance with the arranged positions of the speaker devices E3.

In addition, in a case of a configuration in which a user can freely take the floorboard 52 apart, the user can change the arrangements of the power supply apparatuses 1 at any time at however one desires to.

Of course, suitable positions for the arrangements of the power supply apparatuses 1 under the floor 51, inside the wall 52, and above the ceiling 53 may be selected in advance upon installation and may be embedded therein, so that the user cannot freely change the arrangements.

Accordingly, in the present embodiment, since the respective devices E1, E2, E3 provided at the floor 51, the wall 52, and the ceiling 53 of the room 50 can receive power supply contactlessly from the corresponding power supply apparatuses 1, cords for supplying power as in a conventional manner are eliminated. As a result, the problems of a large number of cords connecting the devices, the freedom of arrangement of the devices being restricted, aesthetic view being deteriorated, dust being likely to accumulate, and cleaning thereof being difficult can be resolved.

Figure 34:
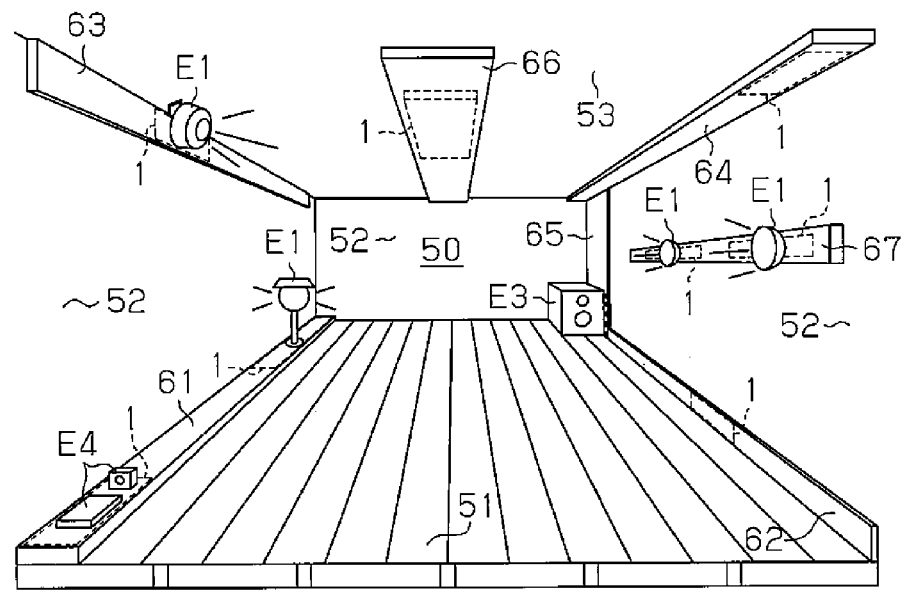
FIG. 34 is an explanatory diagram for explaining another example of the tenth embodiment showing a room in which respective devices for receiving a power supply are arranged.

Further, as shown in FIG. 34, power supply apparatuses 1 may be arranged within skirting boards 61, 62 provided along the lowermost ends of the walls 52, skirting boards 63, 64 provided along the uppermost ends of the walls 52, a skirting board 65 that is provided at an intersection of walls 52 and provided along an up and down direction, and a skirting board 66 provided at a center of the ceiling 53. Further, a power supply apparatus 1 may be arranged within a skirting board 67, which is provided at a center of a wall 52 along a left and right direction and has a duct-shape.

Figure 33:
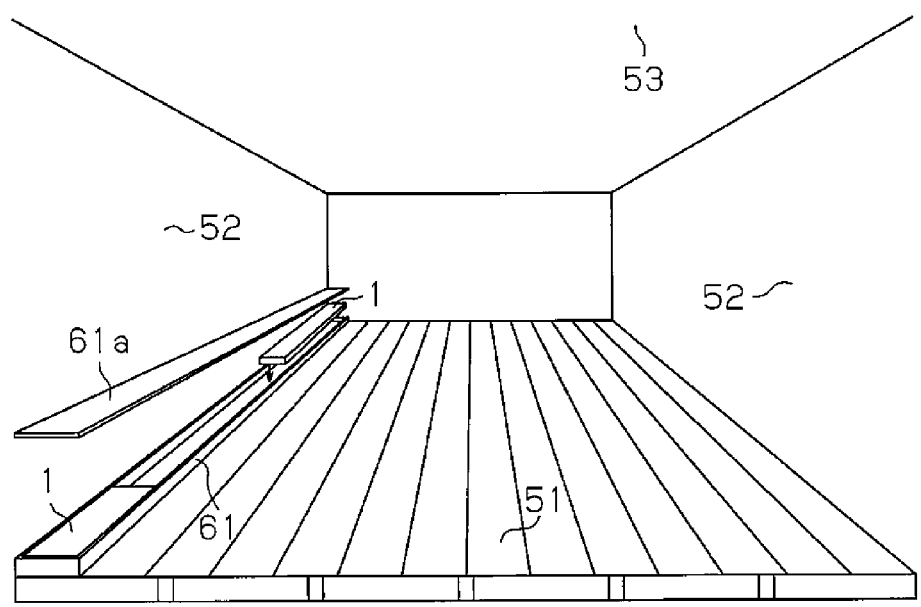
FIG. 33 is an explanatory diagram for explaining another example of the tenth embodiment showing a power supply apparatus housed in a skirting board.

As shown in FIG. 33, the power supply apparatuses 1, which is arranged in the skirting board 61 provided along the lowermost end of the wall 52, are housed at predetermined positions within the skirting board 61. After having been housed in the predetermined space, the power supply apparatuses 1 are arranged inside the skirting board 61 so as not to be visible by a top plate 61a being boarded thereover.

Further, as shown in FIG. 34, a plurality of mobile devices E4 and a lighting device E1 are arranged at positions opposing the power supply apparatuses 1 provided in the skirting board 61. Further, the lighting device E1 turns on by receiving contactless power supply from the aforementioned power supply apparatus 1.

In this case, since the top plate 61a of the skirting board 61 can freely be taken off, the power supply apparatuses 1 can freely be moved and arranged along a longitudinal direction within the skirting board 61. Due to this, depending on lifestyles, the arranged positions of the mobile devices E4 and the lighting device E1 can freely be changed.

Further, the power supply apparatus 1, which is housed in the skirting board 63 provided along the uppermost end of the wall 52, can be housed using a similar method. Further, a spot-type lighting device E1 is arranged at a position opposing the aforementioned power supply apparatus 1. Further, the spot-type lighting device E1 turns on by receiving contactless power supply from the aforementioned power supply apparatus 1.

Further, the skirting board 65, which is provided at the intersection of the walls 52 and provided along the up and down direction, can house using the similar method. Further, a speaker device E3 is arranged at a position opposing the power supply apparatus 1. Further, the speaker device E3 can be driven by receiving contactless power supply from the aforementioned power supply apparatus 1.

Yet further, as shown in FIG. 34, the power supply apparatuses 1 may be provided in the skirting board 67, which is provided at the center of the wall 52 along the left and right direction and has the duct-shape. Further, lighting devices E1 are arranged at positions opposing the aforementioned power supply apparatuses 1 provided in the duct-shaped skirting board 67. The lighting devices E1 turn on by receiving contactless power supply from the aforementioned power supply apparatuses 1. In this case, the power supply apparatuses 1 provided in the duct-shaped skirting board 67 can freely be moved and arranged in the longitudinal direction. Due to this, depending on the lifestyles, the arranged positions of the lighting devices E1 can freely be changed.

Accordingly, the present embodiment enables to completely eliminate the cords for the respective devices E1 to E4 in the room 50, and can provide safety in no longer tripping over the cords. Further, due to the absence of the cords, cleaning of the room 50 becomes easy.

Further, the positions of the respective devices E1 to E4 can be changed as desired depending on one's own style. Moreover, since the power supply apparatus 1 can be arranged at positions where a person can easily touch or where dust is likely to accumulate, the power supply apparatus 1 is safe and highly reliable.

Note that, although a case in which the power supply apparatus 1 of the respective embodiments is used independently has been explained, a power supply apparatus, which has a mounting surface with one large area, may be configured by providing a plurality of power supply apparatuses 1 on all directions, or a power supply apparatus, which has one long mounting surface, may be configured by providing a plurality of power supply apparatuses 1 in a band shape along one direction. In this case, the system control section 8 of each power supply apparatus 1 needs to be connected so as to be capable of receiving and sending data to each other.

Due to this, a larger number of devices can simultaneously be supplied with power contactlessly, and flexible implementation in accordance with numbers of used devices and using environment can be performed.

(Eleventh Embodiment)

Next, the eleventh embodiment will be described with reference to FIG. 35.

In each of the above described embodiments, the power supply apparatus 1 provided the plurality of primary coils L1 in a planar manner. The present embodiment is characterized in arranging a plurality of primary coils L1 in one direction in a linear manner.

Figure 35:
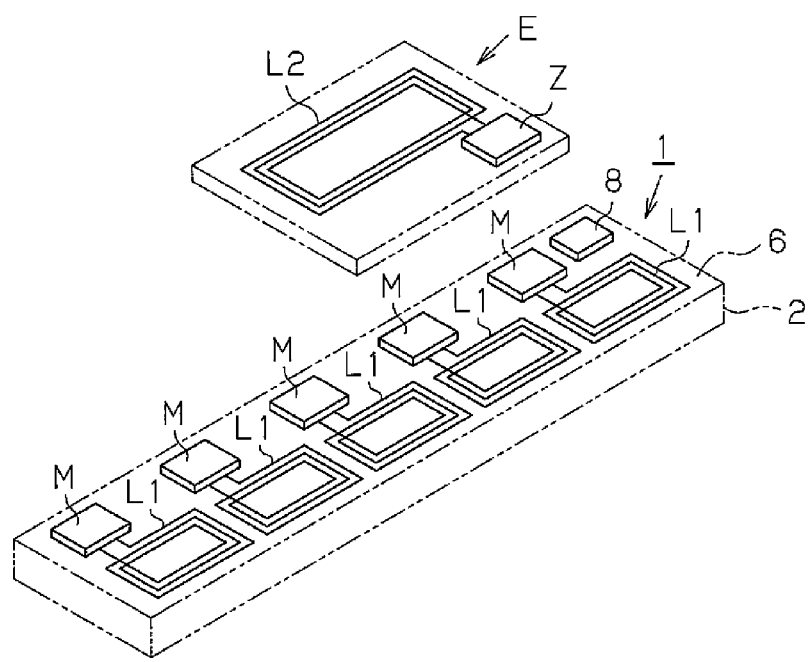
FIG. 35 is an explanatory diagram showing an arrangement condition of primary coils of power supply apparatuses of the eleventh embodiment.

As shown in FIG. 35, in a housing 2 of a power supply apparatus 1, a plurality of primary coils L1 is arranged in one line, that is, in a linear manner, and a power supply module M is provided for each primary coil L1. A portion positioned on an upper side of the plurality of primary coil L1 arranged in the linear manner comes to be a band-shaped mounting surface 6 that extends linearly, and a device E is mounted on the band-shaped mounting surface 6. Further, when the device E is mounted on this band-shaped mounting surface 6, one or a plurality of primary coils L1 positioned directly below the device E is excited, and the device E is thereby supplied with power.

Further, the power supply apparatus 1 in which the plurality of primary coils L1 is arranged in one line, that is, in the linear manner is arranged along a ceiling or a wall. Further, if a plurality of spot-type lighting devices E1 is provided linearly onto the power supply apparatus 1 elongatedly extending along the ceiling or the wall, the plurality of spot-type lighting devices E1 is turned on by being supplied with power from the power supply apparatus 1.

Figure 36:
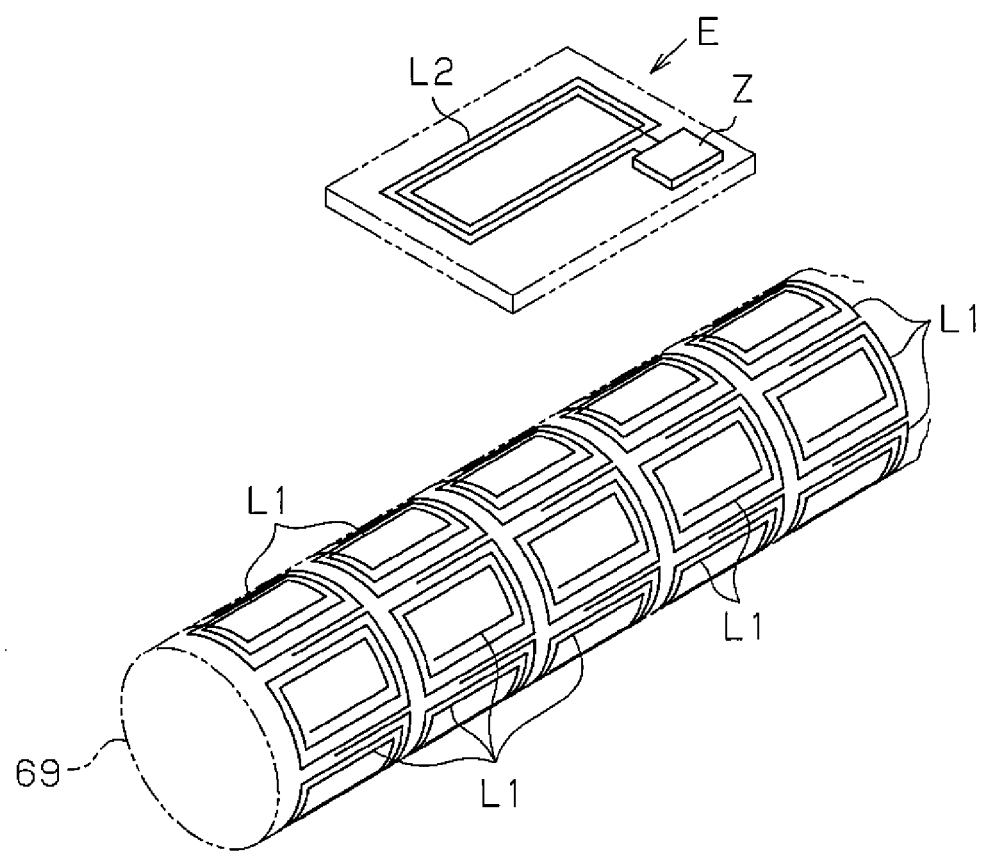
FIG. 36 is an explanatory diagram for explaining another example of the tenth embodiment showing a power supply apparatus housed in a handrail.

Further, for example, as shown in FIG. 36, a plurality of primary coils L1 may be arranged on a surface of a columnar handrail 69 (in a shape of a columnar surface).

(Twelfth Embodiment)

Next, the twelfth embodiment will be described with reference to FIG. 37.

The present embodiment is characterized in that a resonance circuit is provided in a secondary coil L2 of a device E.

Figure 37:
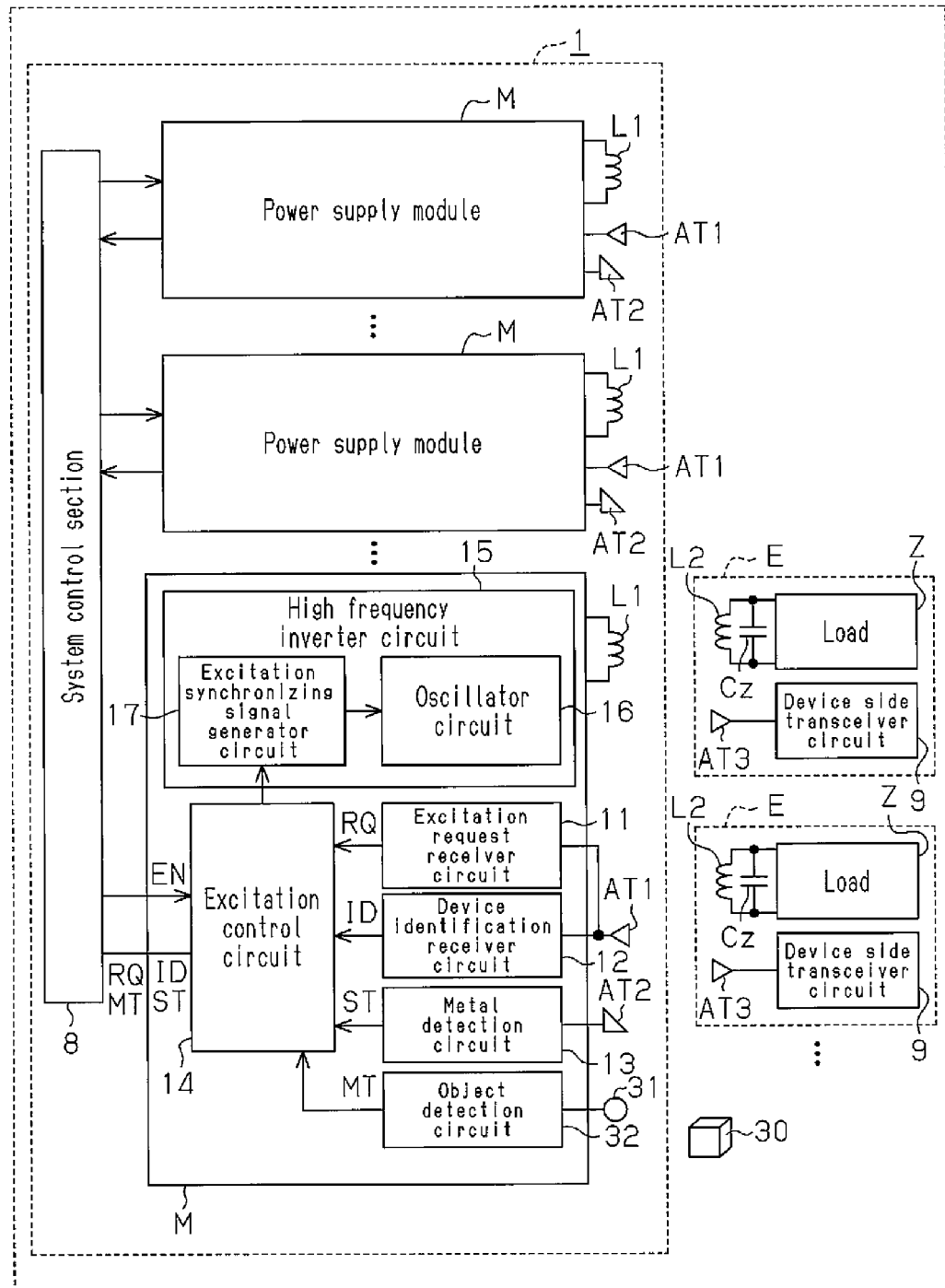
FIG. 37 is an electrical block circuit of power supply modules and devices of the twelfth embodiment.

As shown in FIG. 37, the secondary coil L2 provided in the device E is connected to a capacitor Cz in parallel, and resonates at a driving frequency of a power supply module M (primary coil L1). Due to this, a conformity (matching) with a load Z can easily be obtained, where the secondary coil L2 resonates, and a safe, secure, energy-saving, and highly efficient contactless power supply system can easily be realized. Note that, the secondary coil L2 may be connected serially with the capacitor Cz so as to resonate at the driving frequency of the power supply module M.

(Thirteenth Embodiment)

Next, the thirteenth embodiment will be described with reference to FIG. 38 to FIG. 40.

In each of the above described embodiments, power was supplied to the device E in the state where the device E is mounted on the mounting surface 6 of the power supply apparatus 1, or in the state of having the device E positioned close to the power supply apparatus 1 as in the tenth embodiment. The present embodiment is characterized in that power is supplied to a device E by having the device E positioned distant from a power supply apparatus 1 at a certain distance.

Figure 38:
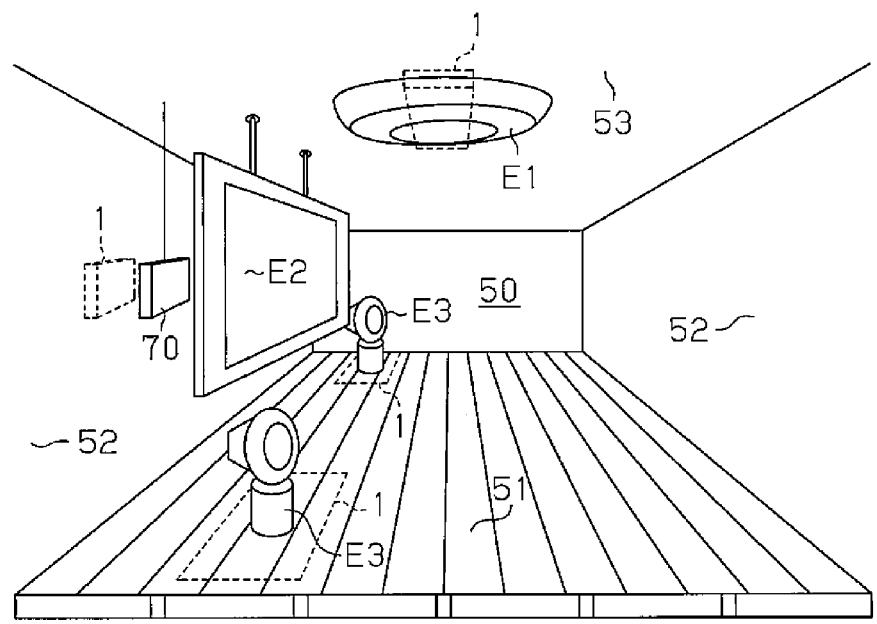
FIG. 38 is an explanatory diagram showing a room in which a relay is arranged of the thirteenth embodiment.
Figure 39:
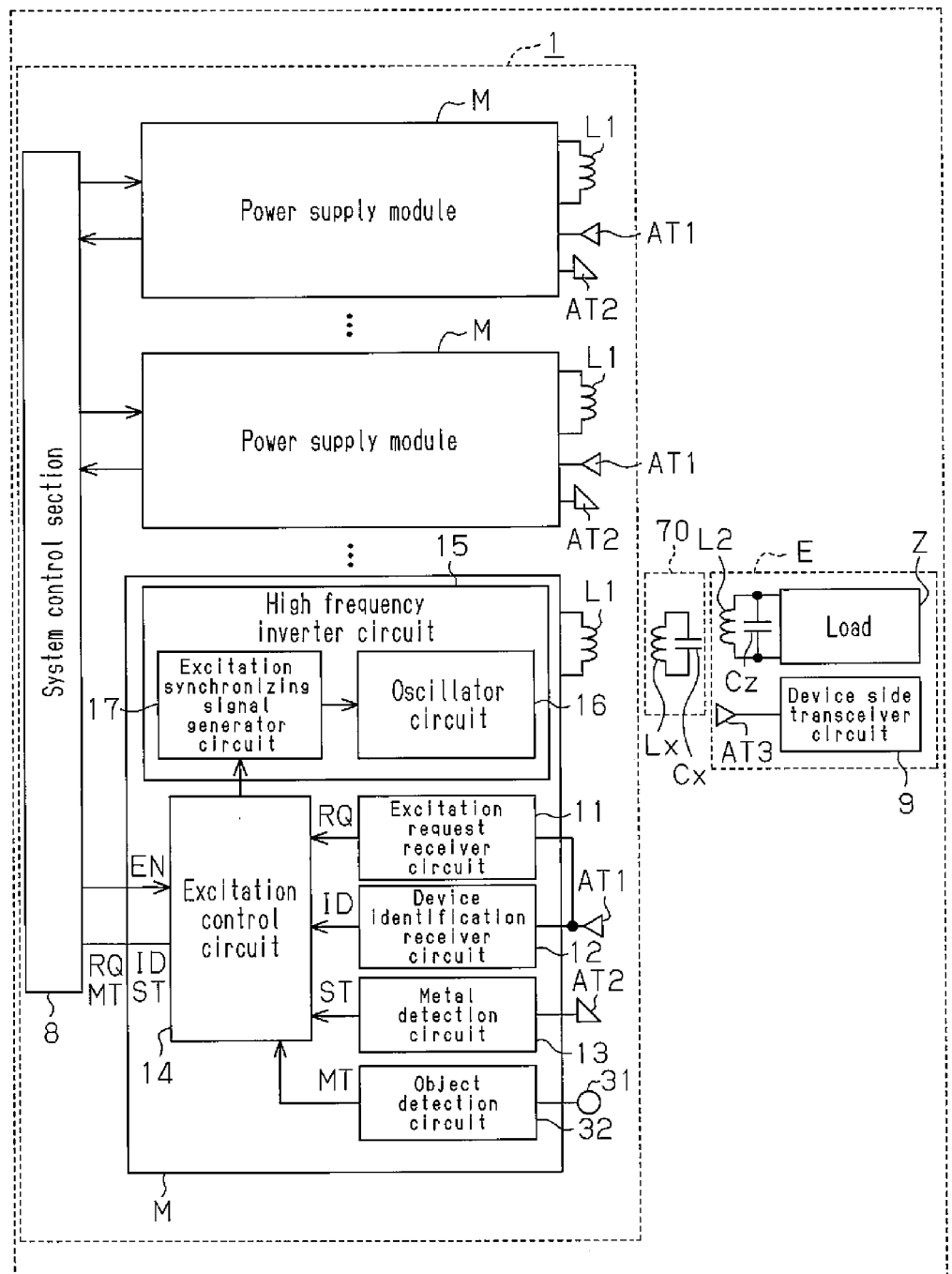
FIG. 39 is an electrical block circuit for explaining a relay of the thirteenth embodiment.

As shown in FIG. 38, a relay 70 is provided between the power supply apparatus 1 provided inside a wall 52 and a TV device E2 arranged to oppose the power supply apparatus 1 and being distant from the wall 52. The relay 70 is a resonance circuit as shown in an electric circuit shown in FIG. 39 that resonates at a driving frequency of a primary coil L1. The relay 70 is composed of a capacitor Cx and an intermediate coil Lx that are connected in parallel to each other.

That is, the primary coil L1 causes the resonance circuit of the relay 70 having the intermediate coil Lx to magnetically resonate, and power is supplied to the TV device E2 by causing a secondary coil L2 to be excited by the resonated intermediate coil Lx.

Due to this, a safe, secure, energy-saving, and convenient contactless power supply system can be realized while expanding power transmitting distance and a power supply area.

Figure 40:
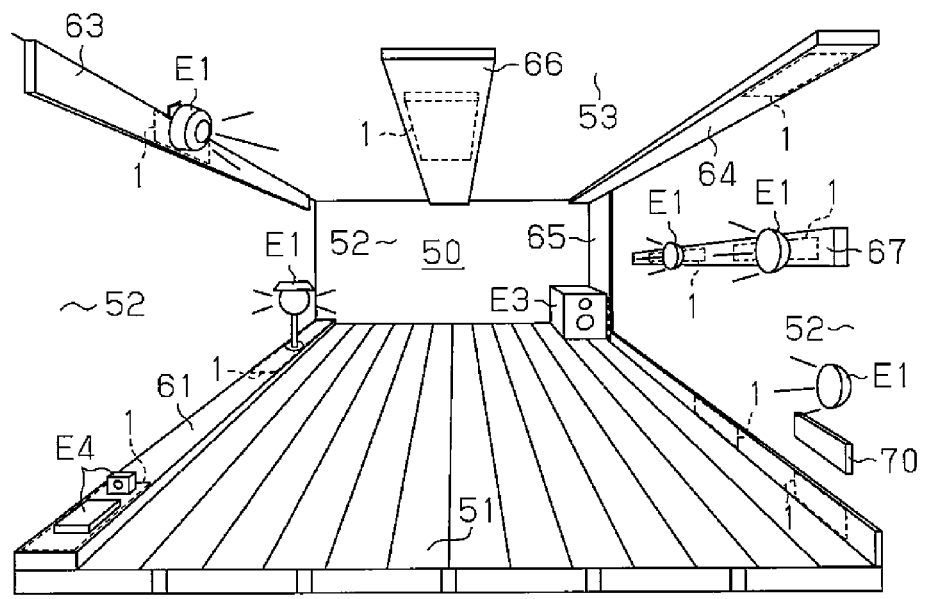
FIG. 40 is an explanatory diagram for explaining another example of the tenth embodiment showing a room in which a relay is arranged.

Note that, as shown in FIG. 40, the relay 70 is provided at the wall 52 positioned above a power supply apparatus 1, this power supply apparatus 1 being housed in a skirting board 62 provided along the lowermost end of the wall 52. Further, a spot-type lighting device E1 arranged at the relay 70 on the upper side wall 52 may be configured to supply power from the power supply apparatus 1 via the relay 70.

Note that, although one relay 70 is provided between the power supply apparatus 1 and the TV device E2 in FIG. 38 and between the power supply apparatus 1 and the spot-type lighting device E1 in FIG. 40, no limitation is made hereof, and a plurality of relays 70 may be arranged.

Note that, although each of the above described embodiments described an example of planar coils, they may be configured to include those of C-type, or E-type including cores.

The invention claimed is:

1. A contactless power supply system comprising:
a device; and
a power supply apparatus that supplies power contactlessly to the device,
wherein the power supply apparatus includes:
a plurality of primary coils provided in a planar or linear manner;
a plurality of power supply modules respectively corresponding to the plurality of primary coils, each of the power supply modules configured to receive an excitation request signal for requesting excitation of the primary coil and excite the primary coil based on the excitation request signal; and
a system control section configured to integratedly control the plurality of power supply modules,
the device includes:
a secondary coil; and
a transmitter circuit that sends the excitation request signal to the power supply apparatus,
when the device is mounted on the power supply apparatus, the contactless power supply system excites primary coils corresponding to one or more power supply modules, generates secondary power in the secondary coil of the device by electromagnetic induction, and supplies the secondary power to a load of the device, and when the excitation request signal from the device mounted on the power supply apparatus is received at the one or more power supply modules, the system control section sends an enable signal for exciting the primary coils to the one or more power supply modules that received the excitation request signal.

2. The contactless power supply system according to claim 1, wherein each of the plurality of power supply modules includes:
a high frequency inverter circuit that excites the primary coil;
a receiver circuit that receives the excitation request signal from the device and identifies the excitation request signal; and
an excitation control circuit that generates a drive control signal for driving the high frequency inverter circuit when the receiver circuit receives the excitation request signal.

3. The contactless power supply system according to claim 1, wherein each of the plurality of power supply modules includes a signal receiver antenna that receives the excitation request signal from the device,
the device includes a transceiver antenna connected to the transmitter circuit, and sends the excitation request signal,
respective ones of the plurality of signal receiver antennas are arranged along the corresponding primary coils,
the transceiver antenna is arranged along the secondary coil, and
the secondary coil of the device corresponds to one or more primary coils directly below the secondary coil.

4. The contactless power supply system according to claim 2, wherein when the receiver circuit receives the excitation request signal, each of the plurality of excitation control circuits sends the drive control signal to the high frequency inverter circuit in response to the enable signal from the system control section, after having sent a signal, which indicates that the excitation request signal has been received, to the system control section.

5. The contactless power supply system according to claim 2, wherein each of the plurality of high frequency inverter circuits includes:
an oscillator circuit that excites the primary coil; and
a synchronizing signal generator circuit that drives the oscillator circuit in response to the drive control signal from the excitation control circuit.

6. The contactless power supply system according to claim 2, wherein the receiver circuit of each of the plurality of power supply modules includes:
an excitation request receiver circuit that receives the excitation request signal from the transmitter circuit of the device; and
a device identification receiver circuit that receives a device identification signal from the transmitter circuit of the device,
the transmitter circuit of the device generates the excitation request signal and the device identification signal that identifies its device, and sends the device identification signal and the excitation request signal, and the system control section sends the enable signal to one or more excitation control circuits when the receiver circuit receives the excitation request signal and the device identification signal, and stops sending the enable signal to the one or more excitation control circuits when one of the excitation request signal and the device identification signal is eliminated.

7. The contactless power supply system according to claim 2, wherein each of the plurality of power supply modules includes:
a metal detection sensor provided in the vicinity of the primary coil, the metal detection sensor configured to detect metal and generate a metal detection signal; and
a metal detection circuit that determines presence/absence of the metal by receiving the metal detection signal from the metal detection sensor, and
each of the plurality of metal detection circuits sends the metal detection signal to the corresponding excitation control circuit when the metal detection signal is received from the corresponding metal detection sensor, so as to eliminate the drive control signal.

8. The contactless power supply system according to claim 1 wherein each of the plurality of power supply modules causes the primary coil to be in standby by intermittently exciting the primary coil during a standby state before the device is mounted.

9. The contactless power supply system according to claim 8, wherein each of the plurality of power supply modules includes:
an object detection sensor provided in the vicinity of the corresponding primary coil, the object detection sensor configured to detect an object and generate an object detection signal; and
an object detection circuit configured to receive the object detection signal from the corresponding object detection sensor, and determine presence/absence of the object based on the object detection signal, and
each of the plurality of object detection circuits causes the primary coil to be in standby by intermittently exciting the corresponding primary coil when the object detection signal is received from the corresponding object detection sensor.

10. The contactless power supply system according to claim 9, wherein each of the plurality of object detection sensors is configured to emit an electromagnetic wave including light, and detect the object by presence/absence of a reflected wave of the emitted electromagnetic wave.

11. The contactless power supply system according to claim 8, wherein the plurality of primary coils provided in the power supply apparatus is divided into a plurality of sets, is intermittently excited orderly in units of the divided sets, and an excitation pattern indicating the order of the sets to be intermittently excited is made to differ each time when a period of time elapses.

12. The contactless power supply system according to claim 1 wherein in the event of starting excitation of a corresponding primary coil for supplying power, each of the plurality of power supply modules stands by setting a predetermined period of excitation stop time for each period of time.

13. The contactless power supply system according to claim 5 wherein each of the plurality of high frequency inverter circuits includes first and second power transistors, and first and second AND circuits, control terminals of the first and second power transistors are respectively connected to output terminals of the first and second AND circuits, complementary first and second excitation synchronizing signals for causing the first and second power transistors to turn on and off alternately are respectively received at first input terminals of the first and second AND circuits, and inverter control signals that determine whether respective one of the first and second excitation synchronizing signals is valid or invalid are respectively received at second input terminals of the first and second AND circuits.

14. The contactless power supply system according to claim 13, wherein output terminals of first and second switching circuits are respectively connected to the first input terminals of the first and second AND circuits, complementary low frequency first and second excitation synchronizing signals for causing the first and second power transistors to turn on and off alternately at a low frequency are respectively received at first input terminals of the first and second switching circuits, complementary high frequency first and second excitation synchronizing signals for causing the first and second power transistors to turn on and off alternately at a high frequency are respectively received at second input terminals of the first and second switching circuits, and the first and second switching circuits switch the first and second excitation synchronizing signals to be sent to the first and second AND circuits to one of the low frequency and the high frequency based on switching information from the device.

15. The contactless power supply system according to claim 5 wherein the high frequency inverter circuit of each of the plurality of power supply modules includes first and second power transistors, and third and fourth switching circuits, control terminals of the first and second power transistors are respectively connected to output terminals of the third and fourth switching circuits, complementary intermittent first and second excitation synchronizing signals for causing the pair of first and second power transistors to turn on and off alternately in an intermittent manner are respectively received at first input terminals of the third and fourth switching circuits, complementary continuous first and second excitation synchronizing signals for causing the pair of first and second power transistors to turn on and off alternately in a continuous manner are respectively received at second input terminals of the third and fourth switching circuits, and the third and fourth switching circuits switch the first and second excitation synchronizing signals to be sent to the control terminals of the first and second power transistor to one of the intermittent manner and the continuous manner based on presence/absence of mounting of the device.

16. The contactless power supply system according to claim 15, wherein the transmitter circuit of the device sends an excitation request modulated signal that determines an excitation cycle for its secondary coil L2 to be excited for power supply, the excitation request modulated signal being obtained by performing amplitude modulation on the excitation request signal, each of the excitation request receiver circuits of the plurality of power supply modules performs waveform shaping on an excitation modulation request signal to convert to a high level logic signal during a period when an amplitude value of the excitation modulation request signal is large by receiving the excitation modulation request signal from the device, and detect and demodulate the excitation modulation request signal, each of the excitation request receiver circuits of the plurality of power supply modules performs waveform shaping on the excitation modulation request signal to convert to a low level logic signal during a period when the amplitude value of the excitation modulation request signal is small, and the high frequency inverter circuit of each of the plurality of power supply modules generates the continuous first and second excitation synchronizing signals based on the logic signal.

17. The contactless power supply system according to claim 13, wherein the excitation request signal from the device is a device-side excitation request modulated signal generated by performing amplitude modulation of a voltage waveform or a current waveform generated at the secondary coil by this excitation request signal, the device-side excitation request modulated signal configured to be received at the primary coil, an excitation request receiver circuit of the power supply module performs, by receiving the device-side excitation request modulated signal received at the primary coil, and detecting and demodulating the device-side excitation request modulated signal:

waveform shaping on the device-side excitation request modulated signal to convert to a high level logic signal during a period when an amplitude value of the device-side excitation request modulated signal is large; and waveform shaping on the device-side excitation request modulated signal to convert to a low level logic signal during a period when the amplitude value of the device-side excitation request modulated signal is small, and the inverter control signal having a same logic value as the logic value of the logic signal is sent to second input terminals of first and second AND circuits of the high frequency inverter circuit.

18. The contactless power supply system according to claim 1, wherein each of the plurality of power supply modules includes a power supply-side transceiver circuit that sends and receives various signals to and from the device via a power supply-side transceiver antenna, and supplies microelectric power to a device-side transceiver antenna of the device, and the device further includes a device side transceiver circuit that sends and receives the various signals to and from the one or more power supply modules, and receives the microelectric power generated at the device-side transceiver antenna by excitation of the power supply-side transceiver antenna by the power supply-side transceiver circuit.

19. The contactless power supply system according to claim 1, wherein the excitation request signal is modulated to a frequency different from an excitation frequency of the primary coils.

20. The contactless power supply system according to claim 1, wherein
the plurality of power supply modules excites the plurality of primary coils at the same phase upon driving the plurality of primary coil to be excited.

21. The contactless power supply system according to claim 1, wherein
a single power supply system is configured by connecting the power supply apparatuses.

22. The contactless power supply system according to claim 1, wherein
the power supply apparatus is configured to be detachably arranged at least at one of a floor, a wall, and a ceiling, and is capable of having its arranged position changed.

23. The contactless power supply system according to claim 22, wherein
the floor, the wall, or the ceiling where the power supply apparatus is arranged includes a wood frame with which a user can freely arrange the power supply apparatus, and
one or a plurality of the power supply apparatuses may be arranged within the wood frame.

24. The contactless power supply system according to claim 22, wherein
the power supply apparatus is arranged in a skirting board provided on the floor, the wall, or the ceiling.

25. The contactless power supply system according to claim 24, wherein
the skirting board has a duct-shape, and
one or more devices are capable of freely sliding on the skirting board.

26. The contactless power supply system according to claim 1, wherein
the device includes a capacitor connected with the secondary coil in parallel or in series, and
the secondary coil and the capacitor resonate at a driving frequency of the power supply module.

27. The contactless power supply system according to claim 1, further comprising:
one or more relays arranged between the power supply apparatus and the device,
wherein the relay includes a capacitor and an intermediate coil that are connected in parallel to each other, and
the capacitor and the intermediate coil are set to resonate at a driving frequency of the power supply module.

* * * * *